United States Patent
Kimura et al.

(10) Patent No.: US 11,735,736 B2
(45) Date of Patent: *Aug. 22, 2023

(54) ELECTRODE, POWER STORAGE DEVICE, AND ELECTRONIC DEVICE

(71) Applicant: SEMICONDUCTOR ENERGY LABORATORY CO., LTD., Atsugi (JP)

(72) Inventors: Kai Kimura, Kanagawa (JP); Kazutaka Kuriki, Kanagawa (JP); Teppei Oguni, Kanagawa (JP); Aya Uchida, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,462

(22) Filed: Oct. 14, 2021

(65) Prior Publication Data

US 2022/0037666 A1 Feb. 3, 2022

Related U.S. Application Data

(63) Continuation of application No. 16/728,135, filed on Dec. 27, 2019, now Pat. No. 11,152,622, which is a (Continued)

(30) Foreign Application Priority Data

Jan. 23, 2014 (JP) .................. 2014-010689

(51) Int. Cl.
*H01M 4/62* (2006.01)
*H01G 11/28* (2013.01)
(Continued)

(52) U.S. Cl.
CPC ............ *H01M 4/622* (2013.01); *H01G 11/24* (2013.01); *H01G 11/26* (2013.01); *H01G 11/28* (2013.01);
(Continued)

(58) Field of Classification Search
None
See application file for complete search history.

(56) References Cited

U.S. PATENT DOCUMENTS 6,998,192 B1    2/2006  Yumoto et al.
7,060,392 B2    6/2006  Kim
(Continued)

FOREIGN PATENT DOCUMENTS

EP    2043182 A    4/2009
EP    2660902 A    11/2013
(Continued)

OTHER PUBLICATIONS

Megahed.S et al., "Lithium-ion rechargeable batteries", Journal of Power Sources, 1994, vol. 51, pp. 79-104, Elsevier.
(Continued)

*Primary Examiner* — Lucas J. O'Donnell
(74) *Attorney, Agent, or Firm* — Nixon Peabody LLP; Jeffrey L. Costellia

(57) ABSTRACT

A power storage device with high capacity or high energy density is provided. A highly reliable power storage device is provided. A long-life power storage device is provided. An electrode includes an active material, a first binder, and a second binder. The specific surface area of the active material is S [m²/g]. The weight of the active material, the weight of the first binder, and the weight of the second binder are a, b, and c, respectively. The solution of $\{(b+c)/(a+b+c)\} \times 100 \div S$ is 0.3 or more. The electrode includes a first film in contact with the active material. The first film preferably
(Continued)

includes a region in contact with the active material. The first film preferably includes a region with a thickness of 2 nm or more and 20 nm or less. The first film contains a water-soluble polymer.

12 Claims, 42 Drawing Sheets

Related U.S. Application Data continuation of application No. 15/668,743, filed on Aug. 4, 2017, now Pat. No. 10,529,990, which is a continuation of application No. 14/598,344, filed on Jan. 16, 2015, now Pat. No. 9,735,430.

(51) Int. Cl.
| | |
|---|---|
| *H01G 11/24* | (2013.01) |
| *H01G 11/26* | (2013.01) |
| *H01G 11/38* | (2013.01) |
| *H01M 4/13* | (2010.01) |
| *H01M 4/133* | (2010.01) |
| *H01M 10/0525* | (2010.01) |
| *H01M 10/0566* | (2010.01) |
| *H01M 10/44* | (2006.01) |
| *H01M 4/02* | (2006.01) |
| *H01M 10/42* | (2006.01) |

(52) U.S. Cl.
CPC ............. *H01G 11/38* (2013.01); *H01M 4/13* (2013.01); *H01M 4/133* (2013.01); *H01M 4/62* (2013.01); *H01M 10/0525* (2013.01); *H01M 10/0566* (2013.01); *H01M 10/446* (2013.01); *H01M 2004/021* (2013.01); *H01M 2010/4292* (2013.01); *H01M 2220/20* (2013.01); *H01M 2220/30* (2013.01); *Y02E 60/10* (2013.01); *Y02E 60/13* (2013.01); *Y02T 10/70* (2013.01)

(56) References Cited

U.S. PATENT DOCUMENTS

| | | | |
|---|---|---|---|
| 8,388,922 B2 | 3/2013 | Sotowa et al. | |
| 8,597,830 B2 | 12/2013 | Kawakami et al. | |
| 9,384,904 B2 | 7/2016 | Inoue et al. | |
| 9,490,499 B2 | 11/2016 | Kawai et al. | |
| 9,685,653 B2 | 6/2017 | Inoue et al. | |
| 9,793,539 B2 | 10/2017 | Sheem et al. | |
| 9,899,660 B2 | 2/2018 | Inoue et al. | |
| 10,263,243 B2 | 4/2019 | Inoue et al. | |
| 10,283,775 B2 | 5/2019 | Kawai et al. | |
| 11,056,678 B2 | 7/2021 | Inoue et al. | |
| 11,152,622 B2 * | 10/2021 | Kimura | H01G 11/38 |
| 11,276,858 B2 | 3/2022 | Kawai et al. | |
| 2003/0054243 A1 | 3/2003 | Suzuki et al. | |
| 2003/0073000 A1 | 4/2003 | Lee et al. | |
| 2005/0106464 A1 | 5/2005 | Yoshida et al. | |
| 2005/0266305 A1 | 12/2005 | Ohata et al. | |
| 2007/0037049 A1 | 2/2007 | Iijima et al. | |
| 2007/0275302 A1 | 11/2007 | Sotowa et al. | |
| 2009/0181309 A1 | 7/2009 | Kwon et al. | |
| 2009/0214954 A1 | 8/2009 | Onishi et al. | |
| 2011/0135982 A1 | 6/2011 | Muraoka et al. | |
| 2011/0281163 A1 | 11/2011 | Kasamatsu et al. | |
| 2013/0143090 A1 | 6/2013 | Hosoya et al. | |
| 2013/0224562 A1 | 8/2013 | Momo | |
| 2013/0273405 A1 | 10/2013 | Takahashi et al. | |
| 2014/0023927 A1 | 1/2014 | Park et al. | |
| 2015/0064554 A1 | 3/2015 | Sasaki | |
| 2015/0111097 A1 | 4/2015 | Park et al. | |
| 2021/0408516 A1 | 12/2021 | Inoue et al. | |

FOREIGN PATENT DOCUMENTS

| | | |
|---|---|---|
| JP | 11-111267 A | 4/1999 |
| JP | 2003-157849 A | 5/2003 |
| JP | 2007-048662 A | 2/2007 |
| JP | 2009-004304 A | 1/2009 |
| JP | 2010-010080 A | 1/2010 |
| JP | 2011-198710 A | 10/2011 |
| JP | 2012-009418 A | 1/2012 |
| JP | 2012-221951 A | 11/2012 |
| JP | 2013-012394 A | 1/2013 |
| JP | 2013-065577 A | 4/2013 |
| JP | 2013-232403 A | 11/2013 |
| KR | 2005-0004929 A | 1/2005 |
| KR | 2006-0103277 A | 9/2006 |
| KR | 2013-0122469 A | 11/2013 |
| WO | WO-2005/067081 | 7/2005 |
| WO | WO-2013/146766 | 10/2013 |
| WO | WO-2013/151110 | 10/2013 |

OTHER PUBLICATIONS

Ouatani.L et al., "Surface film formation on a carbonaceous electrode: Influence of the binder chemistry", Journal of Power Sources, Apr. 1, 2009, vol. 189, No. 1, pp. 72-80, Elsevier.

Verma.P et al., "A review of the features and analyses of the solid electrolyte interphase in Li-ion batteries", Electrochimica Acta, Sep. 1, 2010, vol. 55, No. 22, pp. 6332-6341.

Buqa.H et al., "Study of styrene butadiene rubber and sodium methyl cellulose as binder for negative electrodes in lithium-ion batteries", Journal of Power Sources, Oct. 20, 2006, vol. 161, No. 1, pp. 617-622, Elsevier.

* cited by examiner

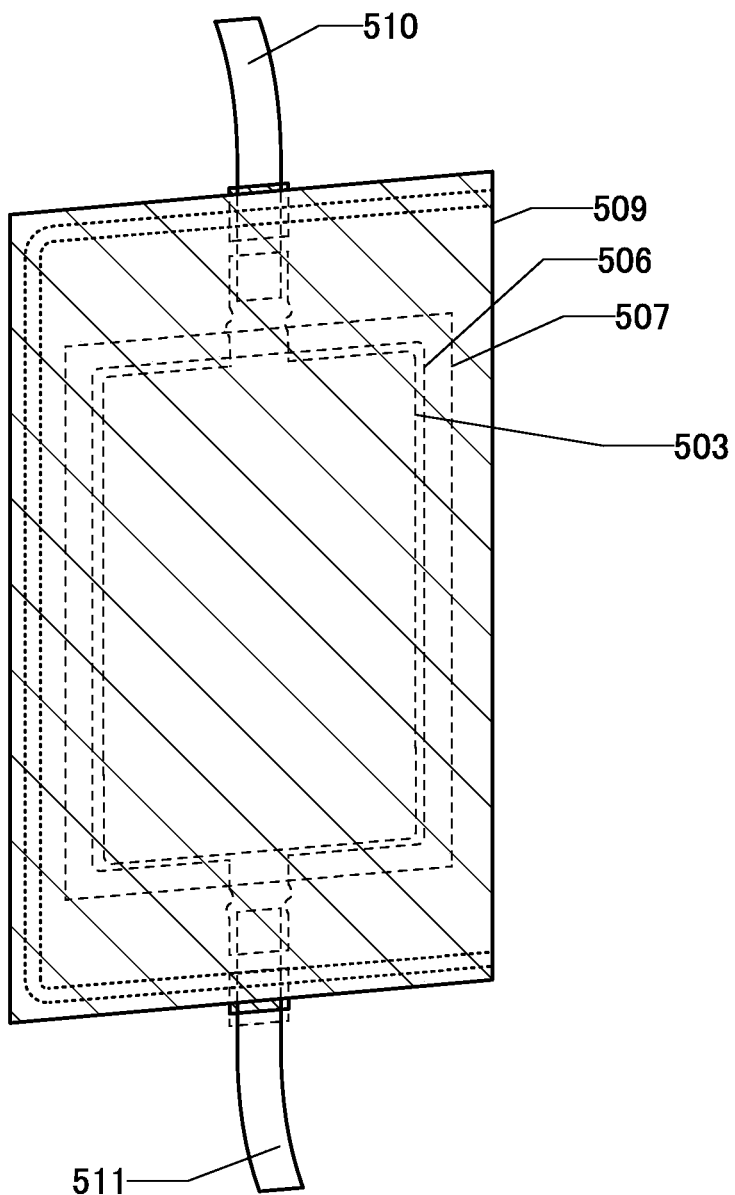

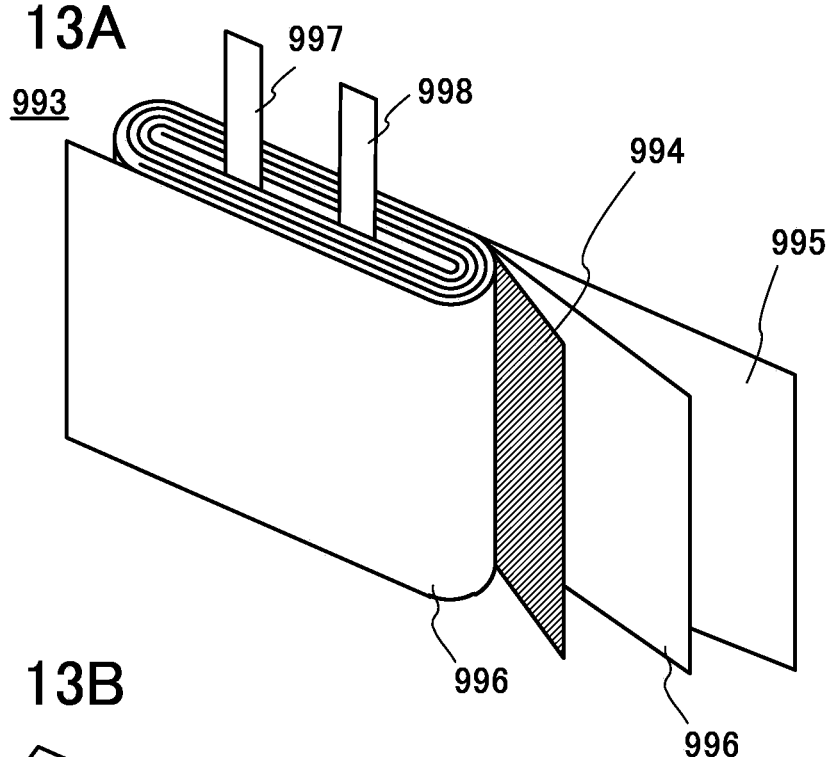
FIG. 13A
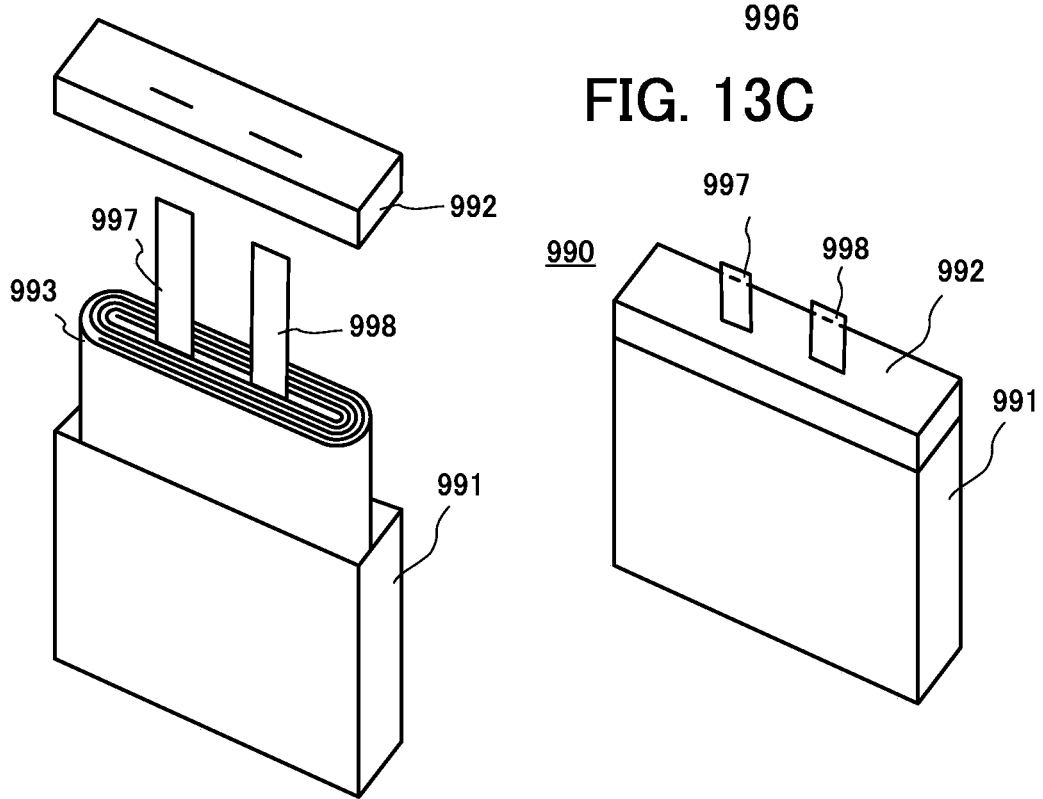
FIG. 13B
FIG. 13C

FIG. 15A1
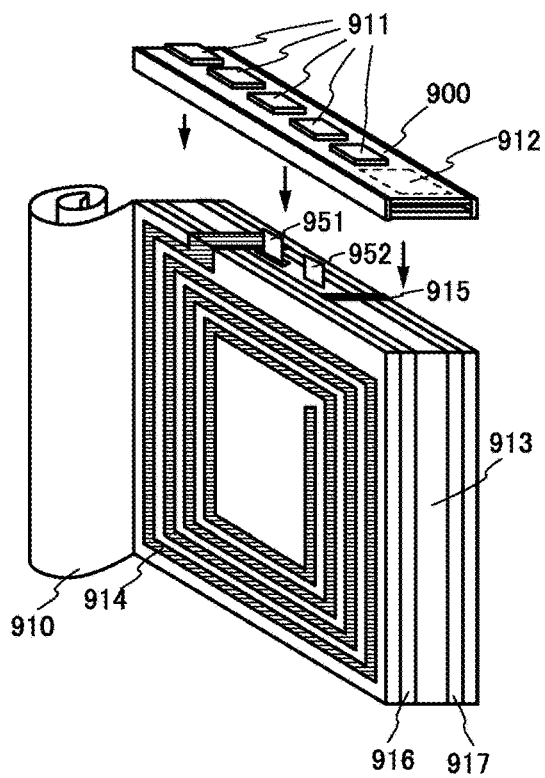
FIG. 15A2
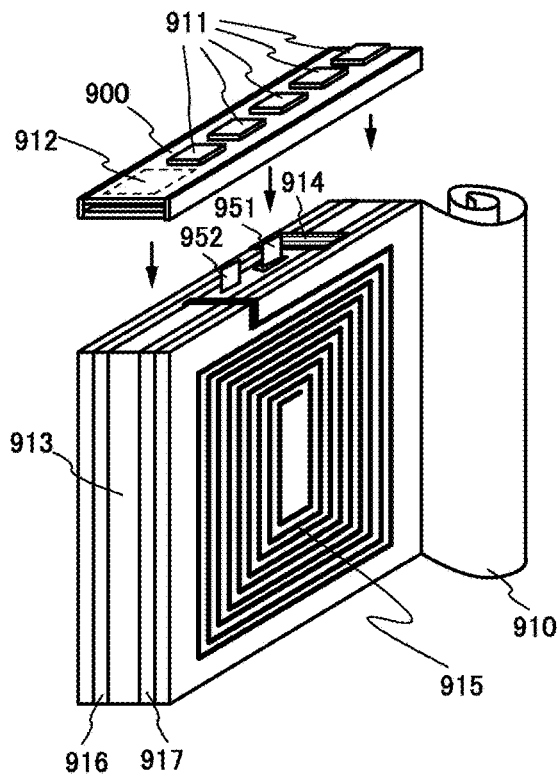
FIG. 15B1
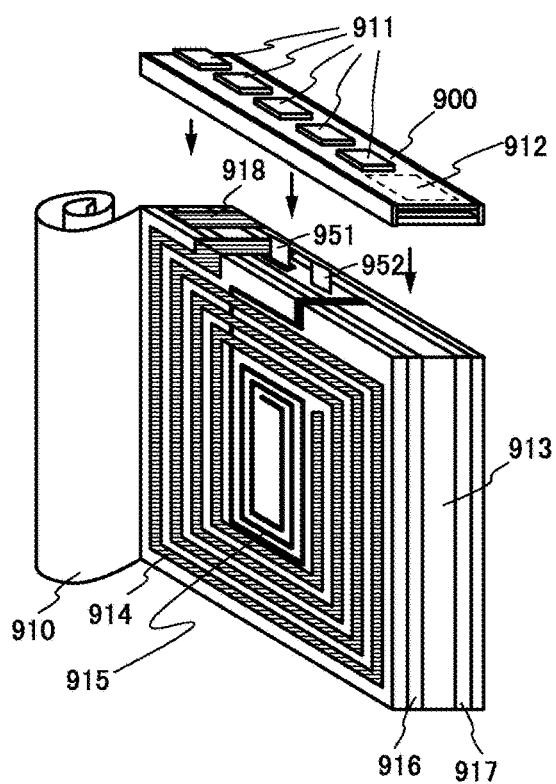
FIG. 15B2
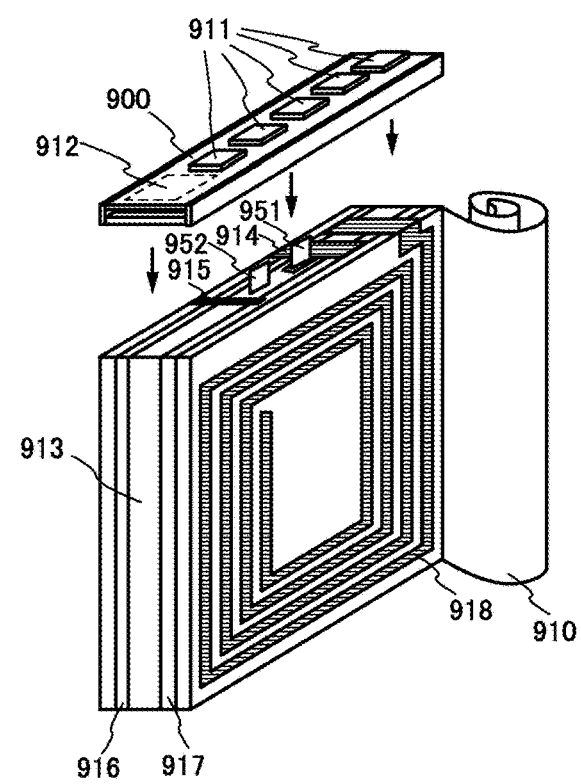

200nm

500nm

100nm

FIG. 25A1
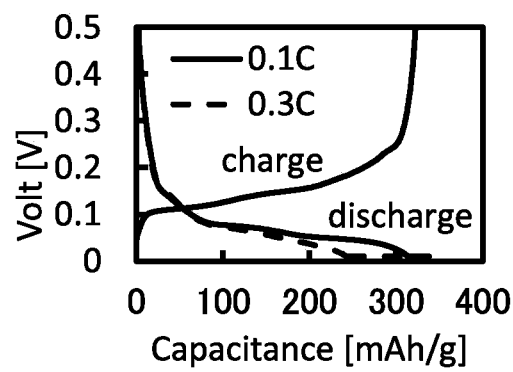
FIG. 25A2
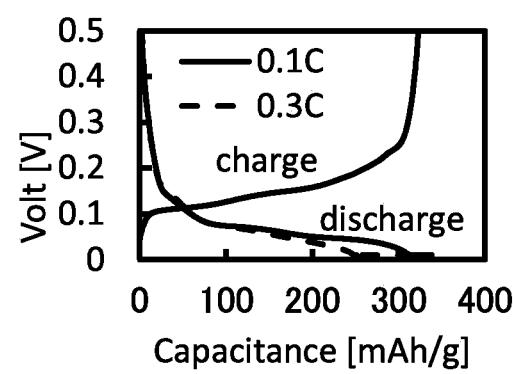
FIG. 25B1
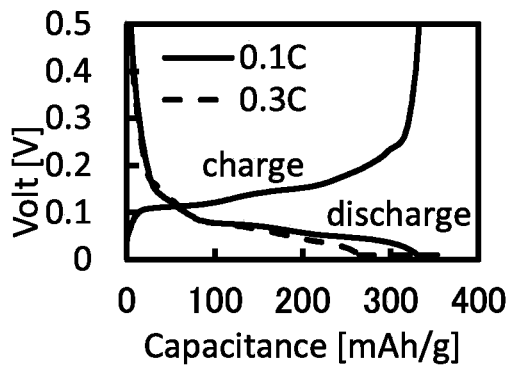
FIG. 25B2
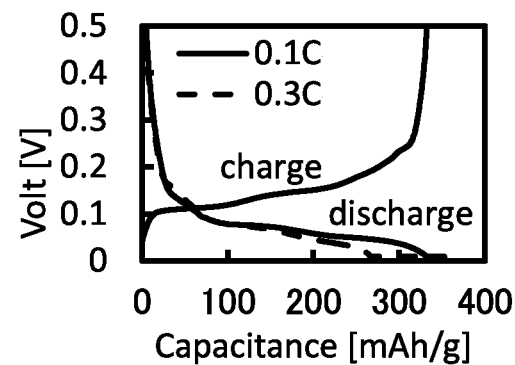
FIG. 25C1
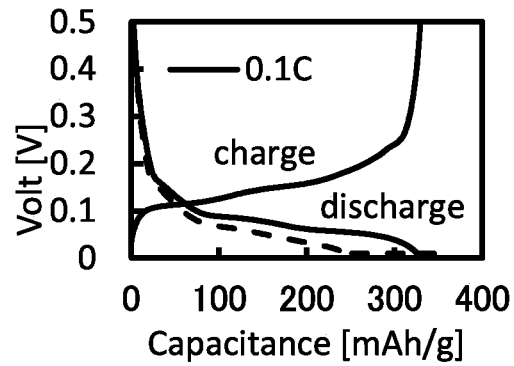
FIG. 25C2
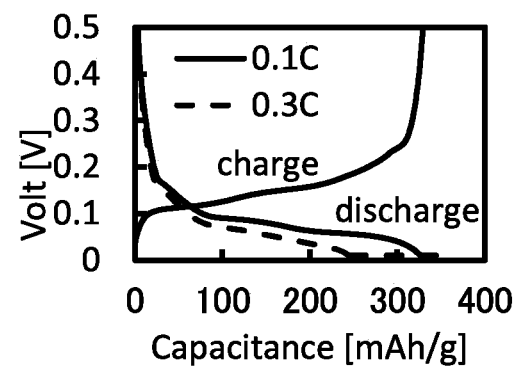

FIG. 41
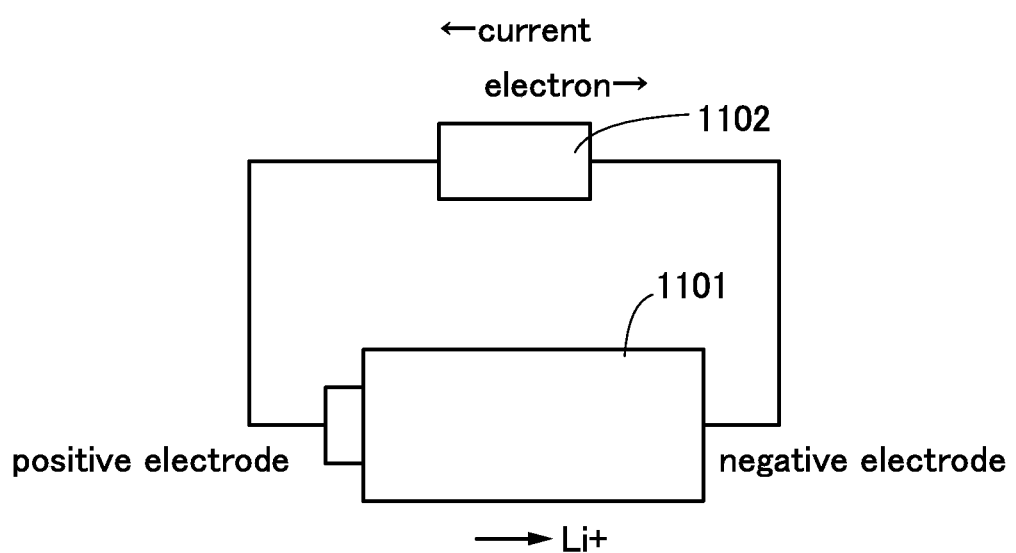

FIG. 42
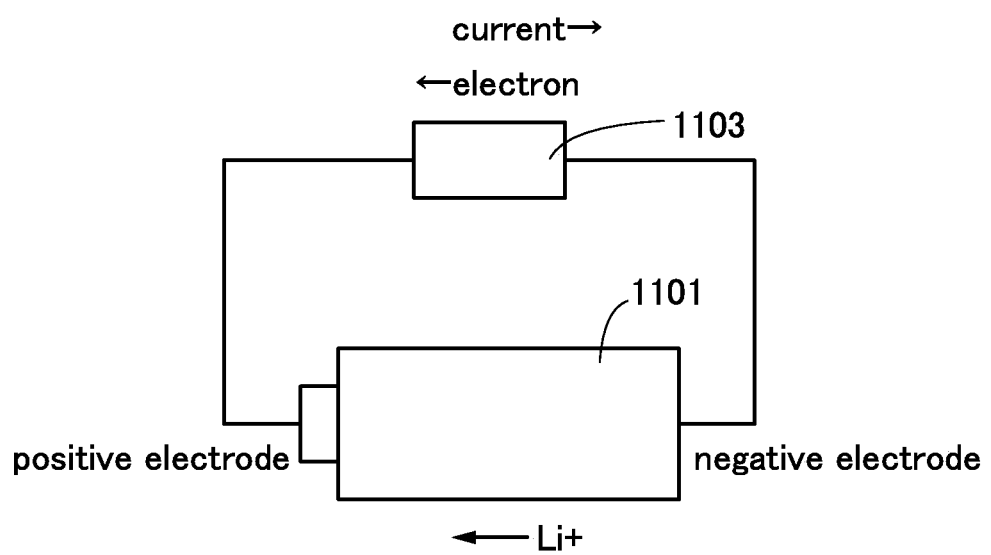
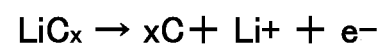
$x \geqq 6$

ELECTRODE, POWER STORAGE DEVICE, AND ELECTRONIC DEVICE

BACKGROUND OF THE INVENTION

1. Field of the Invention

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a power storage device and a manufacturing method thereof.

Note that a power storage device in this specification refers to every element and/or device having a function of storing electric power.

2. Description of the Related Art

In recent years, a variety of power storage devices, for example, secondary batteries such as lithium-ion secondary batteries, lithium-ion capacitors, and air cells have been actively developed. In particular, demand for lithium-ion secondary batteries with high output and high energy density has rapidly grown with the development of the semiconductor industry, for electronic devices, for example, portable information terminals such as mobile phones, smartphones, and laptop computers, portable music players, and digital cameras; medical equipment; next-generation dean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

An example of a lithium-ion battery includes at least a positive electrode, a negative electrode, and an electrolytic solution (Patent Document 1).

REFERENCE

[Patent Document 1] Japanese Published Patent Application No. 2012-009418

SUMMARY OF THE INVENTION

An object of one embodiment of the present invention is to provide a power storage device with high capacity. Another object of one embodiment of the present invention is to provide a power storage device with high energy density. Another object of one embodiment of the present invention is to provide a highly reliable power storage device. Another object of one embodiment of the present invention is to provide a long-life power storage device.

Another object of one embodiment of the present invention is to provide a power storage device with reduced irreversible capacity. Another object of one embodiment of the present invention is to provide a power storage device in which the decomposition reaction of an electrolytic solution is inhibited and a decrease in capacity with increasing number of charge and discharge cycles is prevented. Another object of one embodiment of the present invention is to reduce or inhibit the decomposition reaction of an electrolytic solution, which speeds up at high temperature and prevent a decrease in charge and discharge capacity by charge and discharge at high temperature, in order to extend the operating temperature range of a power storage device.

Another object of one embodiment of the present invention is to increase an yield of a power storage device. Another object of one embodiment of the present invention is to provide a novel power storage device, a novel electrode, or the like.

Note that the description of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is sn electrode including a current collector and an active material layer. The active material layer includes an active material and a first film. The first film includes a region in contact with the active material. The first film includes a region with a thickness of 2 nm or more and 20 nm or less. The first film contains a water-soluble polymer.

In the above structure, the active material is in the form of particles, and the specific surface area of the active material is preferably greater than or equal to 0.2 $m^2/g$ and less than or equal to 7.0 $m^2/g$. In the above structure, the water-soluble polymer preferably contains carboxymethyl cellulose, methyl cellulose, ethyl cellulose, hydroxypropyl cellulose, or diacetyl cellulose. In the above structure, the first film preferably contains a stylene monomer or a butadiene monomer. In the above structure, the active material preferably contains graphite.

Another embodiment of the present invention is an electrode including a current collector, an active material, a first binder, and a second binder. A variable A defined by Mathematical Formula 1 where S is the specific surface area of the active material [$m^2/g$], and a, b, and c are the weight of the active material, the weight of the first binder, and the weight of the second binder, respectively, is 0.3 or more. In the above structure, the electrode preferably includes a first film in contact with the active material. The first film preferably includes a region in contact with the active material. The first film preferably includes a region with a thickness of 2 nm or more and 20 nm or less. The first film preferably contains a water-soluble polymer.

$$A = \frac{b+c}{a+b+c} \times 100 \div S \qquad \text{[Mathematical Formula 1]}$$

In the above structure, the active material is in the form of particles, and the specific surface area S of the active material is preferably greater than or equal to 0.2 $m^2/g$ and less than or equal to 7.0 $m^2/g$. In the above structure, the first binder preferably contains carboxymethyl cellulose, methyl cellulose, ethyl cellulose, hydroxypropyl cellulose, or diacetyl cellulose. In the above structure, the second binder preferably contains a stylene monomer or a butadiene monomer. In the above structure, the active material preferably contains graphite.

Another embodiment of the present invention is a power storage device including the electrode described above and a second electrode. The electrode described above has a function of operating as one of a positive electrode and a negative electrode. The second electrode has a function of operating as the other of the positive electrode and the negative electrode.

Another embodiment of the present invention is a power storage device including a first electrode and an electrolytic solution. The first electrode includes a current collector and an active material layer. The active material layer includes an active material, a first film, and a second film. The first film includes a region in contact with the active material. The second film includes a region in contact with the first film. The first film contains a water-soluble polymer. The second film contains lithium, fluorine, oxygen, and carbon. The electrolytic solution contains lithium, fluorine, oxygen, and carbon.

In the above structure, the active material is in the form of particles, and the specific surface area of the active material is preferably greater than or equal to 0.2 m$^2$/g and less than or equal to 7.0 m$^2$/g. In the above structure, the water-soluble polymer preferably contains carboxymethyl cellulose, methyl cellulose, ethyl cellulose, hydroxypropyl cellulose, or diacetyl cellulose. In the above structure, the first film preferably contains a styrene monomer or a butadiene monomer. In the above structure, the active material preferably contains graphite.

In the above structure, the power storage device preferably includes a second electrode, the first electrode preferably has a function of operating as a negative electrode, the second electrode preferably has a function of operating as a positive electrode, and R defined by Mathematical Formula 2 is preferably 20 or more and 90 or less.

[Mathematical Formula 2]
$$R = \frac{\text{Positive electrode capacity}}{\text{Negative electrode capacity}} \times 100 \ [\%]$$

Another embodiment of the present invention is an electronic device including the power storage device described above and a display device.

According to one embodiment of the present invention, a power storage device with high capacity can be provided. According to another embodiment of the present invention, a power storage device with high energy density can be provided. According to one embodiment of the present invention, a highly reliable power storage device can be provided. According to one embodiment of the present invention, a power storage device with a long lifetime can be provided.

One embodiment of the present invention can provide a power storage device with reduced irreversible capacity. One embodiment of the present invention can provide a power storage device in which a decomposition reaction of an electrolytic solution is inhibited and a decrease in capacity with increasing number of charge and discharge cycles is prevented. One embodiment of the present invention makes it possible to reduce or inhibit the decomposition reaction of an electrolytic solution, which speeds up at high temperature, and to prevent a decrease in charge and discharge capacity in charge and discharge at high temperature, in order to extend the operating temperature range of a power storage device.

According to one embodiment of the present invention, an yield of a power storage device can be increased. According to one embodiment of the present invention, a novel power storage device, a novel electrode, or the like can be provided.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:
FIGS. 3A and 5B illustrate a thin storage battery;
FIG. 7 illustrates a thin storage battery;
FIGS. 13A to 13C illustrate an example of a power storage device;
FIGS. 15A1, 15A2, 15B1, and 15B2 illustrate examples of power storage devices;
FIGS. 25A1, 25A2, 25B1, 25B2, 25C1, and 25C2 are graphs each showing charge and discharge curves.

FIG. 41 illustrates an operation example of a power storage device; and

FIG. 42 illustrates an operation example of a power storage device.

DETAILED DESCRIPTION OF THE INVENTION

Figure 1A:
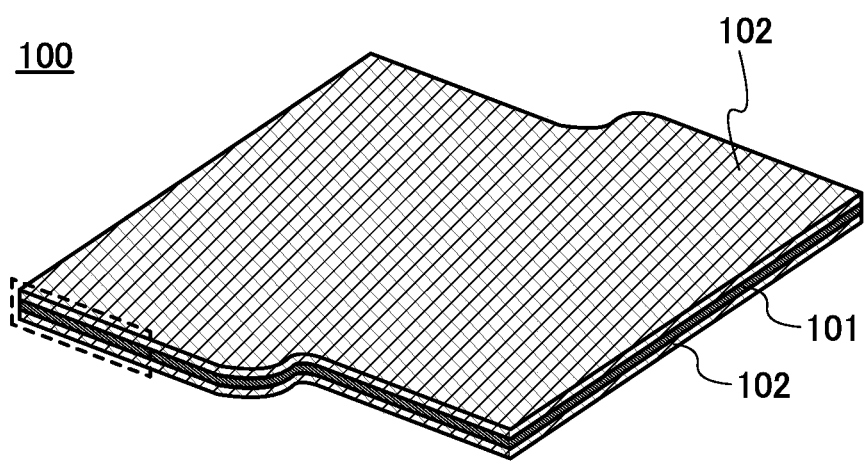
FIGS. 1A and 1B are an overhead view and a cross-sectional view of an electrode, respectively.

Hereinafter, embodiments and examples of the present invention will be described in detail with reference to the accompanying drawings. However, the present invention is not limited to the description of the embodiments and examples and it is easily understood by those skilled in the art that the mode and details can be changed variously. Accordingly, the present invention should not be interpreted as being limited to the description of the embodiments below.

Note that in drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as a power storage device electrode; in this case, the power storage device electrode refers to at least one of the positive electrode and the negative electrode for the power storage device.

Here, a charge rate and a discharge rate will be described. For example, in the case of charging a secondary battery with a certain capacity [Ah] at a constant current, a charge rate of 1 C means the current value I [A] with which charging is terminated in exactly 1 h, and a charge rate of 0.2 C means I/5 [A] (i.e., the current value with which charging is terminated in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

Embodiment 1

In this embodiment, an electrode of one embodiment of the present invention and a method for manufacturing the electrode will be described.

[Structure of Electrode]

Figure 1B:
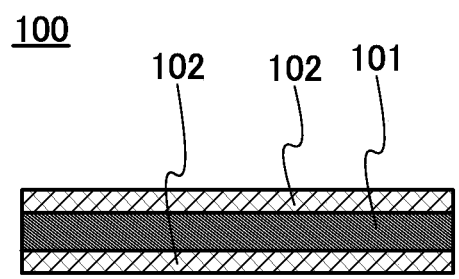

FIG. 1A is an overhead view of an electrode 100, and FIG. 1B is a cross-sectional view of a portion surrounded by a broken line in FIG. 1A. The electrode 100 has a structure in which an active material layer 102 is provided over a current collector 101. Although the active material layers 102 are provided such that the current collector 101 is sandwiched therebetween, the active material layer 102 may be formed over only one surface of the current collector 101. The active material layer 102 includes an active material.

There is no particular limitation on the current collector 101 as long as it has high conductivity without causing a significant chemical change in a power storage device. For example, the current collector 101 can be formed using a metal such as gold, platinum, zinc, iron, nickel, copper, aluminum, titanium, tantalum, or manganese, an alloy thereof (e.g., stainless steel), sintered carbon, or the like. Alternatively, copper or stainless steel that is coated with carbon, nickel, titanium, or the like can be used to form the current collector 101. Alternatively, the current collector 101 can be formed using an aluminum alloy to which an element that improves heat resistance, such as silicon, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector 101 can have any of various shapes including a foil-like shape, a plate-like shape (sheet-like shape), a net-like shape, a cylindrical shape, a coil shape, a punching-metal shape, a porous shape, and a shape of non-woven fabric as appropriate. Alternatively, the current collector 101 can have an expanded-metal shape as a net-like shape, for example. The current collector 101 may be formed to have micro irregularities on the surface thereof in order to enhance adhesion to the active material layer, for example. The current collector 101 preferably has a thickness of 5 μm to 30 μm inclusive.

The positive electrode active material layer 102 includes the active material. An active material refers only to a material that relates to insertion and extraction of ions that carriers. In this specification and the like, a material that is actually an "active material" and the material including a conductive additive, a binder, and the like are collectively referred to as an active material layer.

In the case where the active material is a negative electrode active material, for example, a carbon-based material, an alloy-based material, or the like can be used.

Examples of the carbon-based material include graphite, graphitizing carbon (soft carbon), non-graphitizing carbon (hard carbon), a carbon nanotube, graphene, and carbon black.

Examples of graphite include artificial graphite such as meso-carbon microbeads (MCMB), coke-based artificial graphite, and pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and higher level of safety than that of a lithium metal.

For the negative electrode active material, a material which enables charge-discharge reactions by an alloying reaction and a dealloying reaction with lithium can be used. A material containing at least one of Ga, Si, Al, Si, Ge, Sn, Pb, Sb, Bi, Ag, Au, Zn, Cd, In, and the like can be used, for example. Such elements have higher capacity than carbon. In particular, silicon has a significantly high theoretical capacity of 4200 mAh/g. For this reason, silicon is preferably used as the negative electrode active material. Examples of an alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, the alloy-based material refers to a material that enables charge-discharge reactions by an alloying reaction and a dealloying reaction with lithium, a material that enables charge-discharge reactions by forming a bond with lithium, or the like.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoSn_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The reaction potential of the negative electrode active material is preferably as low as possible, in which case the voltage of the power storage device can be high. On the other hand, when the potential is low, power of reducing an electrolytic solution is increased, so that an organic solvent or the like in an electrolytic solution might be subjected to reductive decomposition. The range of potentials in which the electrolysis of an electrolytic solution does not occur is referred to as a potential window. The electrode potential of the negative electrode needs to be within a potential window of an electrolytic solution; however, the potentials of many active materials used for negative electrodes of lithium-ion secondary batteries and lithium-ion capacitors are out of the potential windows of almost all electrolytic solutions. Specifically, materials with low reaction potentials such as graphite and silicon can increase the voltage of storage batteries but are likely to cause the reductive decomposition of electrolytic solutions.

Meanwhile, a positive electrode active material currently used for a positive electrode of a lithium-ion secondary battery might cause the decomposition of an electrolytic solution at high temperature and at high voltage.

In the case where the active material is a positive electrode active material, a material into and from which lithium ions can be intercalated and deintercalated can be used; for example, a material having an olivine crystal structure, a layered rock-salt crystal structure, a spinel crystal structure, or a NASICON crystal structure, or the like can be used.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used.

Alternatively, lithium-containing complex phosphate with an olivine crystal structure ($LiMPO_4$ (general formula) (M is one or more of Fe(II), Mn(II), Co(II), and Ni(II))) can be used. Typical examples are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_eNi_dCo_fPO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, lithium-containing complex silicate such as $Li_{(2-j)}MSiO_4$ (general formula) (M is one or more of Fe(II), Mn(II), Co(II), and Ni(II); 0≤j≤2) may be used. Typical examples are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula) (A=Li, Na, or Mg, M=Fe, Mn, Ti, V, Nb, or Al, X=S, P, Mo, W, As, or Si) can be used for the active material. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, a material with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The average particle size of the positive electrode active material is preferably, for example, greater than or equal to 5 nm and less than or equal to 50 µm.

For example, lithium-containing complex phosphate having an olivine crystal structure used for the positive electrode active material has a one-dimensional lithium diffusion path, so that lithium diffusion is slow. The size of a primary particle of foe active material is thus preferably reduced to increase the charge and discharge rate. Furthermore, the specific surface area of the active material is preferably increased. The average size of primary particles is preferably, for example, greater than or equal to nm and less than or equal to 1 µm. The specific surface area is preferably, for example, greater than or equal to 10 $m^2/g$ and less than or equal to 50 $m^2/g$.

A positive electrode active material having an olivine crystal structure is much less likely to be changed in the crystal structure by charge and discharge and has a more stable crystal structure than, for example, an active material having a layered rock-salt crystal structure. Thus, a positive electrode active material having an olivine crystal structure is stable toward operation such as overcharge. The use of such a positive electrode active material allows fabrication of a highly safe power storage device.

The active material layer 102 may include a conductive additive. Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (acetylene black (AB)) and graphene. Alternatively, metal powder or metal fiber of copper, nickel, aluminum, silver, gold, or the like, a conductive ceramic material, or the like can be used.

Flaky graphene has an excellent electrical characteristics of high conductivity and excellent physical properties of high flexibility and high mechanical strength. For this reason, the use of graphene as the conductive additive can increase the points and the area where the negative electrode active materials are in contact with each other.

Note that graphene in this specification includes single-layer graphene and multilayer graphene including two to hundred layers. Single-layer graphene refers to a one-atom-thick sheet of carbon molecules having n bonds. Graphene oxide refers to a compound formed by oxidation of such graphene. When graphene oxide is reduced to form graphene, oxygen contained in the graphene oxide is not entirely released and part of the oxygen remains in graphene. When graphene contains oxygen, the proportion of oxygen, which is measured by X-ray photoelectron spectroscopy (XPS), is higher than or equal to 2 at % and lower than or equal to 20 at %, preferably higher than or equal to 3 at % and lower than or equal to 15 at %.

The active material layer 102 preferably includes a binder, more preferably a binder that contains water-soluble polymers. The active material layer 102 may include a plurality of kinds of binders. A binder that can be included in the active material layer 102 will be described below.

The binder preferably contains water-soluble polymers. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

Here, water-soluble polymers can be dissolved in water and thus can adjust and stabilize the viscosity of slurry for an electrode when the slurry is formed. Furthermore, water-soluble polymers facilitate dispersion of other materials, here, the active material and other materials such as a binder and a conductive additive, in the slurry. The slurry is finally applied and then dried, so that an electrode is obtained. Note that "something can be dissolved in water" means that a functional group of a polymer can be ionized in water, for example, here.

Here, water-soluble polymers do not necessarily dissolve only in water, and polymers that dissolve in a solvent other than water may be used. For example, polymers are dissolved in a polar solvent and an active material and other materials are dispersed in the mixture to form slurry. Alternatively, polymers that can be dissolved only in a solvent other than water may be used.

As the binder, a rubber material such as styrene-butadiene rubber (SBR), styrene-isoprene-styrene rubber, acrylonitrile-butadiene rubber, butadiene rubber, or ethylene-propylene-diene copolymer is preferably used. Any of these rubber materials is more preferably used in combination with the aforementioned water-soluble polymers. Since these rubber materials have rubber elasticity and easily expand and contract, it is possible to obtain a highly reliable electrode that is resistant to stress due to expansion and contraction of an active material by charge and discharge, bending of the electrode, or the like. On the other hand, the rubber materials have a hydrophobic group and thus are unlikely to be soluble in water in some cases. In such a case, particles are dispersed in an aqueous solution without being dissolved in water and, so that increasing the viscosity of slurry up to the viscosity suitable for application to form the electrode might be difficult. Water-soluble polymers having an excellent function of adjusting viscosity, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

As the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVDF), or polyacrylonitrile (PAN) can be used.

A single binder may be used or plural kinds of binders may be used in combination.

For example, a binder having high adhesion or high elasticity and a binder having a significant viscosity modifying effect may be used in combination. As the binder having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and a second binder such as styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolytic solution. Here, the passivation film refers to a film without electric conductivity or a film with extremely low electric conductivity, and can inhibit the decomposition of an electrolytic solution at a potential at which a battery reaction occurs in the case where the passivation film is formed on the active material surface, for example. It is preferred that the passivation film can conduct lithium ions while suppressing electric conduction.

In a specific example described here, a cellulose derivative having an excellent viscosity modifying property is used as the binder. As the cellulose derivative, sodium carboxymethyl cellulose (hereinafter abbreviated to CMC-Na) is used. It is highly probable that CMC-Na covering the active material surface can serve as the passivation film. The passivation film prevents decomposition or the like due to a reaction of an electrolytic solution at the active material surface. Now, suppose that a material having rubber elasticity, such as styrene-butadiene rubber (hereinafter abbreviated to SBR), is used as another binder. Since a polymer containing a styrene monomer unit or a butadiene monomer unit, such as SBR, has rubber elasticity and easily expands and contracts, a highly reliable electrode that is resistant to stress due to expansion and contraction of an active material by charge and discharge, bending of the electrode, or the like can be obtained. On the other hand, SBR has a hydrophobic group and thus might be slightly soluble in water. Thus, particles are dispersed in an aqueous solution without being dissolved in water, so that increasing the viscosity of slurry up to the viscosity suitable for application to form the electrode might be difficult. Meanwhile, when CMC-Na, which has an excellent viscosity modifying property, is used, the viscosity of a solution can be increased moderately. By mixing CMC-Na with the active material and SBR in a solution, they are uniformly dispersed, so that a favorable electrode having high uniformity, specifically, an electrode having high uniformity in electrode thickness or electrode resistance can be obtained. By being uniformly dispersed, SBR as well as CMC-Na might cover or be in contact with a surface of the active material. In this case, SBR may also contribute to a function as a passivation film.

When the active material is a negative electrode active material, the reaction potential is low and thus an electrolytic solution might be reductively decomposed as described above. The battery reaction potentials of graphite, silicon, and the like are very close to the redox potential of lithium, so that graphite, silicon, and the like particularly significantly cause the decomposition of an electrolytic solution in many cases. Thus, a binder covering the active material surface preferably forms a film or a film-like binder is preferably in contact with the active material surface to serve as a passivation film so that the decomposition of an electrolytic solution is inhibited. Inhibiting the decomposition of an electrolytic solution leads to suppression of generation of a gas caused by the decomposition. The generation of a gas increases, for example, an unreacted active material in a negative electrode; accordingly, the effectual current density is increased and a voltage drop is increased. This increases the possibility of lithium deposition. The use of the electrode of one embodiment of the present invention as the negative electrode enables solution of these problems.

Presumably, the smaller the specific surface area of the active material is, the higher the proportion of the binder covering the surface or the proportion of the area of a region of the entire surface that is in contact with the film-like binder is. Thus, the proportion of the binder is optimized in accordance with the specific surface area of the active material, whereby a more reliable electrode can be fabricated.

[Fabricating Method of Electrode]

Next, a method for manufacturing the electrode 100 of one embodiment of the present invention will be described.

In order to form the active material layer 102, first, slurry is formed. The slurry can be formed in such a manner that the above-described material to which a conductive additive, a binder, and the like are added as appropriate is mixed with a solvent, for example. As the solvent, for example, water or N-methyl-2-pyrrolidone (NMP) can be used. Water is preferably used in terms of the safety and cost. With the use of a water-soluble polymer as the binder, slurry with an appropriate viscosity for application can be formed. In addition, slurry with high dispersibility can be formed. Accordingly, the binder can favorably cover with or be in contact with a surface of the active material. In forming the slurry, by kneading the active material and the water-soluble polymer and then adding a solvent and other materials, the slurry with highly stable viscosity can be formed. It is also possible to increase the dispersibility of the materials. Furthermore, the surface of the active material can be easily coveted with the binder.

The case where the electrode 100 is a negative electrode of a storage battery will be described as an example. Here, an example will be described in which graphite is used as a negative electrode active material, CMC-Na and SBR are used as binders, and water is used as a solvent.

Graphite and CMC-Na are mixed in a mixer or the like to obtain a mixture. In this case, graphite may be added to an aqueous solution of CMC-Na after CMC-Na is dissolved in water to prepare the aqueous solution of CMC-Na. The case where graphite is added to the aqueous solution of CMC-Na is more preferred to the case where graphite is added to water because cohesion of graphite and the like can be inhibited to enable uniform mixing.

Alternatively, graphite powder and CMC-Na powder may be mixed in a mixer or the like to be dispersed and then water may be added to the mixture.

Both the above cases are preferred because cohesion of graphite, which is the active material, can be weaken and dispersibility of graphite and CMC-Na can be improved when a small amount of water is added and mixing (kneading) in a high viscosity state is performed to obtain a mixture in the form of a paste.

After the kneading is performed, water may further be added and mixing may be performed.

Then, SBR is added and mixing is performed using a mixer or the like. Here, an SBR dispersion liquid in which water has been mixed is preferably added to the mixture, in which case cohesion of SBR can be suppressed unlike in the case where SBR powder is added. Furthermore, dispersibility of other materials and SBR is improved in some cases.

Next, the pressure in the mixer containing this mixture may be reduced to perform degasification. Through the above steps, favorable slurry in which graphite, CMC-Na, and SBR are uniformly dispersed can be formed.

Note that the order of mixing graphite, CMC-Na, and SBR is not limited to the above. All the materials may be added at a time and mixed.

Here, any of a variety of mixers can be used as the mixer. For example, a planetary mixer, a homogenizer, or the like can be used.

The polymerization degree of CMC-Na that is used is preferably, for example, higher than or equal to 100 and lower than or equal to 1000, more preferably higher than or equal to 500 and lower than or equal to 900, still more preferably higher than or equal to 600 and lower than or equal to 800. In the case of forming a 1 wt % CMC-Na aqueous solution, the viscosity of the aqueous solution is preferably higher than or equal to 150 mPa·s and lower than or equal to 2000 mPa·s, more preferably higher than or equal to 200 mPa·s and lower than or equal to 1000 mPa·s, still more preferably higher than or equal to 300 mPa·s and lower than or equal to 300 mPa·s. The Na content of GMC-Na after drying is preferably, for example, higher than or equal to 5 wt % and lower than or equal to 10 wt %, more preferably higher than or equal to 6.5 wt % and lower than or equal to 8.5%. Furthermore, the molecular weight of CMC-Na that is used is preferably, for example, 130000 to 190000.

Here will be described examples of favorable proportions and a favorable specific surface area of an active material when the electrode of one embodiment of the present invention includes the active material, a first binder, and the second binder and water-soluble polymers are used as the first binder. The weight of the active material included in the electrode is a, the weight of the first binder is b, the weight of the second binder is c, and the specific surface area of the active material is S [m²/g], A variable B defined by Mathematical Formula (3) is, for example, preferably 0.15 or more, more preferably 0.3 or more, still more preferably 0.5 or more.

$$B = \frac{b}{a+b+c} \times 100 \div S \quad \text{[Mathematical Formula 3]}$$

When the weight of the active material included in the electrode is a, the weight of the first binder is b, the weight of the second binder is c, and the specific surface area of the active material is S [m²/g], the favorable relation between the proportions and the specific surface area of the active material is as follows: A defined by Mathematical Formula 4 is preferably 0.3 or more, more preferably 1 or more, still more preferably 2 or more. Particularly when if is 1 or more and the electrode is used as a negative electrode of a storage battery, the storage battery can have significantly excellent cycle characteristics.

$$A = \frac{b+c}{a+b+c} \times 100 \div S \quad \text{[Mathematical Formula 4]}$$

Here, for example, graphite is particularly preferably used as the active material, and polymers containing styrene monomers or butadiene monomers are particularly preferably used as the second binder.

The specific surface area of the active material that is used is preferably greater than or equal to 0.2 m²/g and less than or equal to 7.0 m²/g, more preferably greater than or equal to 0.5 m²/g and less than or equal to 3.0 m²/g, still more preferably greater than or equal to 0.5 m²/g and less than or equal to 2.5 m²/g, for example.

Here, in the case of using, for example, CMC-Na as water-soluble polymers, the proportion of CMC-Na with respect to the sum of the weights of the active material, CMC-Na, and the second binder is preferably higher than or equal to 0.5 wt % and lower than 10 wt %, more preferably higher than or equal to 1 wt % and lower than or equal to 7 wt % in terms of easiness of electrode fabrication, stabilization of electrode characteristics, reduction in electrode resistance, or the like.

For example, when the proportion of CMC-Na is less than 1 wt %, non-uniform application is likely to occur (the thickness uniformity is poor, so that a thin portion is locally formed) in some cases. The non-uniform application is caused by an increase in viscosity due to drying of the slurry (volatilization of the solvent), for example. If the proportion of CMC-Na is higher than 7 wt %, for example, the fluidity of the slurry might decrease. The proportion of CMC-Na wife respect to fee sum of fee weights of fee active material, CMC-Na, and the second binder is feus preferably higher than or equal to 0.5 wt % and lower than 10 wt %, more preferably higher than or equal to 1 wt % and lower than or equal to 7 wt %.

Here, in fee case where fee binder covering or being in contact with the active material surface forms a film, fee film is expected to serve as a passivation film to inhibit fee decomposition of an electrolytic solution. Such an effect may be obtained even when CMC-Na or SBR is not in a film form. A porous film of CMC-Na or SBR may be formed.

Any of the conductive additives listed above is preferably used, in which case a more highly conductive electrode can be fabricated. Steps for forming slurry for the electrode by mixing carbon fiber as a conductive additive, graphite, CMC-Na, and SBR will be described below as an example. Examples of the carbon fiber include mesophase pitch-based carbon fiber, isotropic pitch-based carbon fiber, carbon nanofiber, and carbon nanotube. Carbon nanotube can be formed by, for example, a vapor deposition method.

First, graphite and carbon fiber are mixed in a mixer or the like. At this time, it is preferred that graphite, carbon fiber, and a small amount of water be kneaded (mixed in a high viscosity state), in which case graphite and carbon fiber may be easily dispersed uniformly.

Next, CMC-Na is added and mixing is performed using a mixer or the like to obtain a mixture. At this time, a CMC-Na aqueous solution prepared by mixing CMC-Na with water in advance is preferably added, in which case cohesion of CMC-Na can be prevented. When water is added prior to the addition of CMC-Na, the viscosity is lowered, damaging the dispersive state of graphite and carbon fiber in some cases.

After that, water may further be added and mixing may be performed.

Then, SBR is added and mixing is performed using a mixer or the like. Here, an SBR dispersion liquid in which water has been mixed is preferably added to the mixture, in which case cohesion of SBR can be suppressed unlike in the case where SBR powder is added. Furthermore, dispersibility of other materials and SBR is improved in some cases.

Next, the pressure in the mixer containing this mixture may be reduced to perform degasification. Through the above steps, favorable slurry in which graphite, carbon fiber, CMC-Na, and SBR are uniformly dispersed can be formed.

Note that the order of mixing graphite, carbon fiber, CMC-Na, and SBR is not limited to the above. All the materials may be added at a time and mixed.

As an example, another fabricating method will be described. First, graphite powder, carbon fiber powder, and CMC-Na powder are mixed in a mixer or the like. Then, water is added in the state where the materials are mixed, and mixing is further performed.

The above case is preferred because cohesion of graphite, which is the active material, can be weaken and dispersibility of graphite, carbon fiber, and CMC-Na can be improved when a small amount of water is added and mixing (kneading) in a high viscosity state is performed to obtain a mixture in the form of a paste.

After the kneading is performed, water may further be added and mixing may be performed.

Then, SBR is added and mixing is performed using a mixer or the like. Here, an SBR dispersion liquid in which water has been mixed is preferably added to the mixture, in which case cohesion of SBR can be suppressed unlike in the case where SBR powder is added. Furthermore, dispersibility of other materials and SBR is improved in some cases.

After that, degasification may be performed. Through the above steps, favorable shiny in which graphite, carbon fiber, CMC-Na, and SBR are uniformly dispersed can be formed.

CMC-Na and SBR are uniformly dispersed, whereby when these binders cover the active material surface and form a film, the film does not become too thick. As a result, a large area can be covered with a small amount of binders. Alternatively, the surface can be covered with a small amount of binders, so that the proportion of an area in contact with the film-like binders with respect to the entire surface can be increased. The binders have low electric conductivity and thus might increase the resistance of the electrode when they cohere. Uniform dispersion of the binders can inhibit cohesion of the binders, so that a favorable electrode with high electric conductivity can be fabricated.

The current collector 101 may be subjected to surface treatment Examples of such surface treatment include corona discharge treatment, plasma treatment, and undercoat treatment. The surface treatment can increase the wettability of the current collector 101 with respect to the slurry. In addition, the adhesion between the current collector 101 and the active material layer 102 can be increased.

Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black, and a carbon nanotube.

Then, the slurry is applied to the current collector 101. For the application, a slot the method, a gravure method, a blade method, or combination of any of them can be used. Furthermore, a continuous coater or the like may be used for the application.

Then, the solvent of the slurry is volatilized to form the active material layer 102. The steps for volatilizing the solvent of the slurry are as follows, for example. Heat treatment is performed using a hot plate at 30° C. or higher and 70° C. or lower in an air atmosphere for longer than or equal to 10 minutes, and then, for example, another heat treatment is performed at room temperature or higher and 100° C. or lower in a reduced-pressure environment for longer than or equal to 1 hour and shorter than or equal to 10 hours.

Alternatively, heat treatment may be performed using a drying furnace or the like. In the case of using a drying furnace, the heat treatment is performed at 30° C. or higher and 120° C. or lower for longer than or equal to 30 seconds and shorter than or equal to 20 minutes, for example. The temperature may be increased in stages. For example, after heat treatment is performed at 60° C. or lower for shorter than or equal to 10 minutes, another heat treatment may further be performed at higher than or equal to 63° C. for longer than or equal to 1 minute.

The thickness of the active material layer 102 formed through the above steps is, for example, preferably greater than or equal to 5 μm and less than or equal to 300 μm, more preferably greater than or equal to 10 μm and less than or equal to 130 μm. Furthermore, the amount of the active material in the active material layer 102 is, for example, preferably greater than or equal to 2 $mg/cm^2$ and less than or equal to 30 $mg/cm^2$.

The active material layer 102 may be formed over only one surface of the current collector 101, or the active material layers 102 may be formed such that the current collector 101 is sandwiched therebetween. Alternatively, the active material layers 102 may be formed such that part of the current collector 101 is sandwiched therebetween.

Note that the active material layer 102 may be predoped. There is no particular limitation on the method for predoping the active material layer 102. For example, the active material layer 102 may be predoped electrochemically. For example, before the battery is assembled, the active material layer 102 can be predoped with lithium in an electrolytic solution described later with the use of a lithium metal as a counter electrode.

Embodiment 2

Described in this embodiment will be an example of a power storage device using the electrode of one embodiment of the present invention.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

[Thin Storage Battery]

FIG. 2A illustrates a thin storage battery as an example of a storage device. When a flexible thin storage battery is used in an electronic device at least part of which is flexible, the storage battery can be bent as the electronic device is bent.

Figure 2:
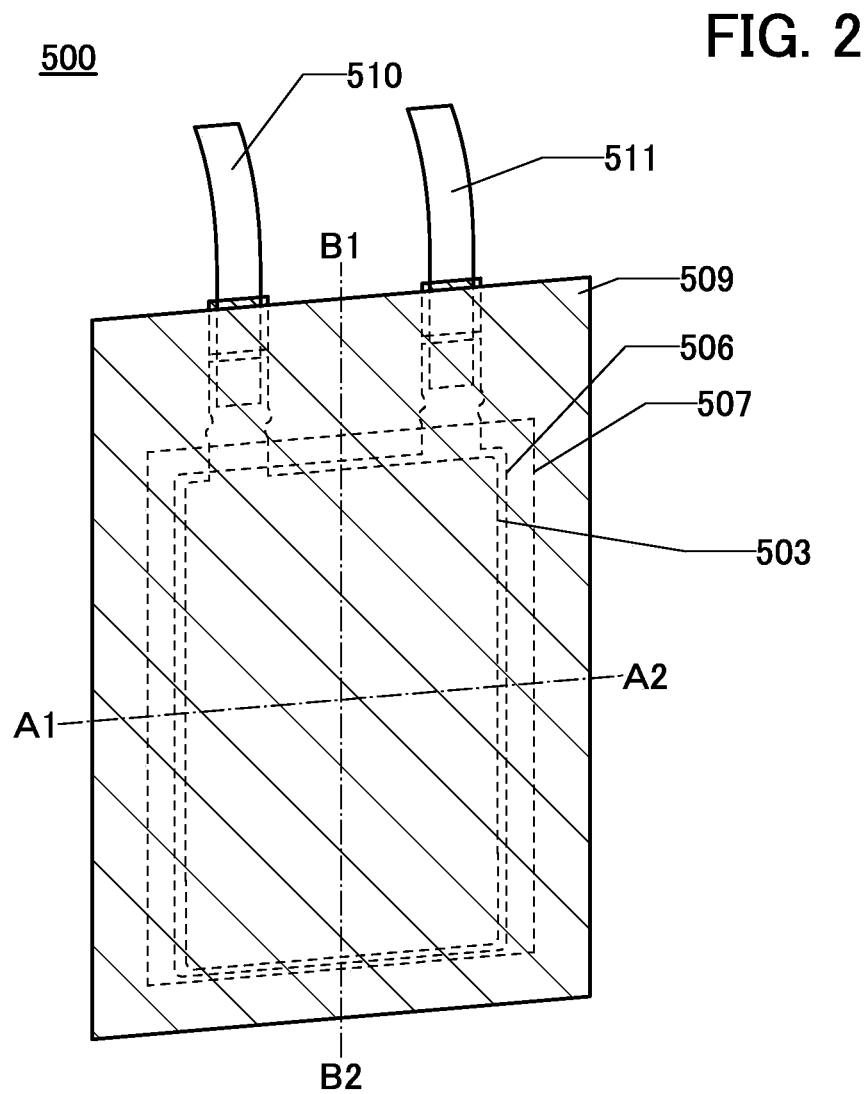
FIG. 2 illustrates a thin storage battery.
Figure 3A:
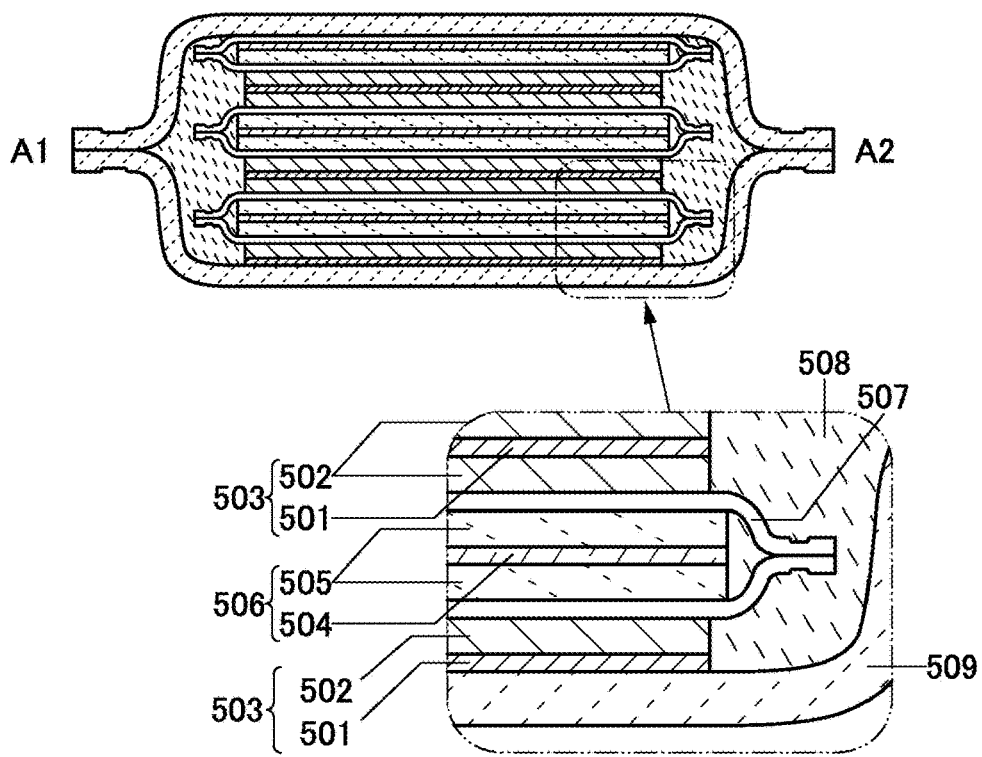
FIGS. 3A and 3B illustrate thin storage batteries.
Figure 3B:
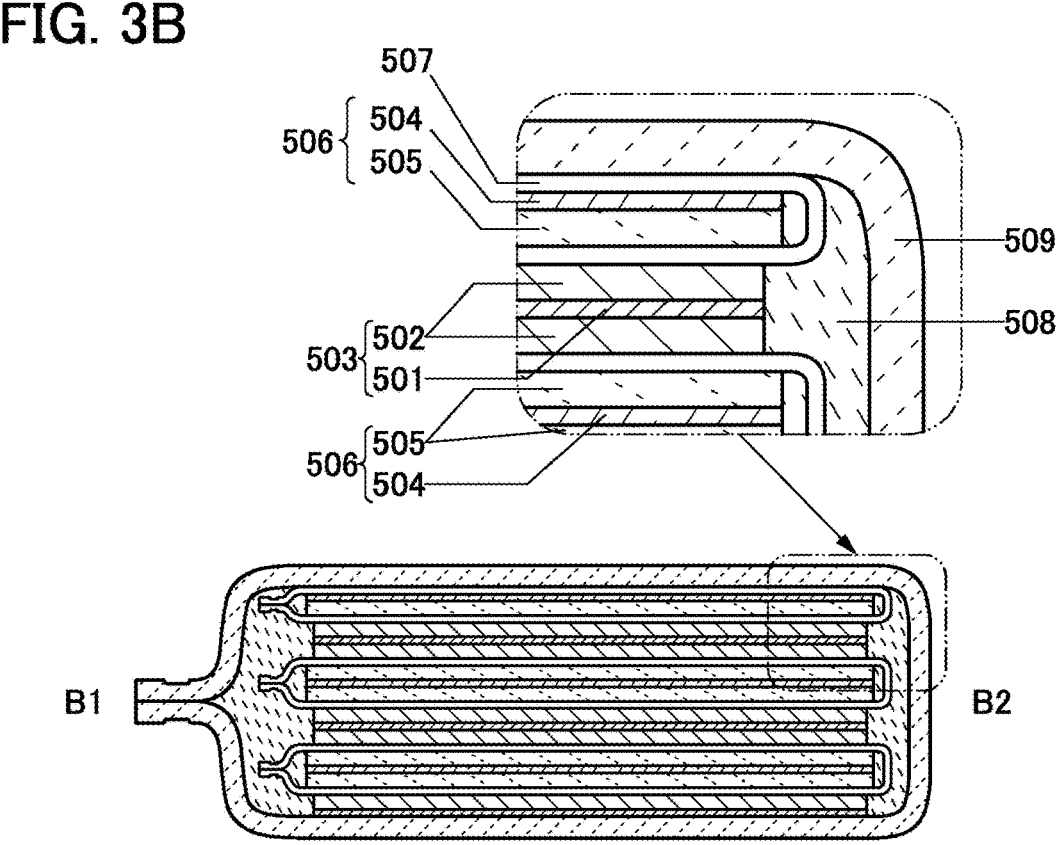

FIG. 2 is an external view of a thin storage battery 500. FIG. 3A is a cross-sectional view along dashed-dotted line A1-A2 in FIG. 2, and FIG. 3B is a cross-sectional view along dashed-dotted line B1-B2 in FIG. 2. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509.

As at least one of the positive electrode 503 and the negative electrode 506, the electrode of one embodiment of the present invention is used. The electrode of one embodiment of the present invention may be used as both the positive electrode 503 and the negative electrode 506.

In the case where both the positive electrode 503 and the negative electrode 506 are the electrodes of embodiments of the present invention, the decomposition of the electrolytic solution caused by a negative electrode reaction (e.g., mainly, oxidative decomposition) and the decomposition of the electrolytic solution caused by a positive electrode reaction (e.g., mainly, reductive decomposition) can be inhibited. Thus, it is possible that a storage battery having excellent properties can be fabricated even with the use of an electrolytic solution having a narrower potential window than a conventional electrolytic solution. In other words, the electrolytic solution used in the storage battery can be selected from a wide range of alternatives. For example, a safer electrolytic solution such as a nonflammable electrolytic solution to which fluorine is added might have low resistance to oxidation; however, even in the case where such an electrolytic solution is selected, a decrease in capacity by charge and discharge can be inhibited, so that more excellent characteristics can be achieved.

First, the structure of the negative electrode 506 will be described. The electrode of one embodiment of the present invention is preferably used as the negative electrode 506. Note that the electrode of one embodiment of the present invention may be used as the positive electrode 503. Here, an example of using the electrode 100 described in Embodiment 1 as the negative electrode 506 will be described.

The negative electrode active material and the binder that are described in Embodiment 1 are used for the negative electrode 506. The negative electrode 506 preferably includes a first binder and a second binder. Water-soluble polymers are preferably used as the first binder. The binder described in Embodiment 1 is used as the second binder; a binder having a styrene monomer or a butadiene monomer is preferably used. Furthermore, the conductive additive described in Embodiment 1 may be used for the negative electrode 506.

The negative electrode 506 is fabricated by the method described in Embodiment 1.

Next, a structure of the positive electrode 503 will be described.

For the positive electrode current collector S0I, any of the examples of the materials for the current collector 101 listed above can be selected to be used.

The positive electrode active material layer 502 includes a positive electrode active material. As described above, an "active material" refers only to a material that relates to insertion and extraction of ions functioning as carriers. In this specification and the like, however, a layer including a conductive additive, a binder, or the like as well as a material that is actually a "active material" is also referred to as an active material layer.

As a positive electrode active material, the positive electrode active material described in Embodiment 1 can be used.

The positive electrode active material layer 502 may further include a conductive additive. As the conductive additive, any of the materials for the conductive additive described in Embodiment 1 can be used, for example.

The positive electrode active material layer 502 may further include a binder. As the binder, the binder described in Embodiment 1 is used, for example.

Here, the positive electrode active material layer 502 preferably contains graphene. Graphene is capable of making low-resistance surface contact and has extremely high conductivity even with a small thickness. Therefore, even a small amount of graphene can efficiently form a conductive path in an active material layer.

Here, for example, lithium-containing complex phosphate with an olivine crystal structure used for the positive electrode active material has a one-dimensional lithium diffusion path, so that lithium diffusion is slow. The size of a primary particle of the active material is thus preferably reduced to increase the charge and discharge rate. Furthermore, the specific surface area of the active material is preferably increased.

In the case where such an active material with a small average particle size (e.g., 1 µm or less) is used, the specific surface area of the active material is large and thus more conductive paths for the active material particles are needed. In such a case, it is particularly preferred that graphene with extremely high conductivity that can efficiently form a conductive path even in a small amount be used.

Next, a method for fabricating the positive electrode 503 will be described.

Figure 4A:
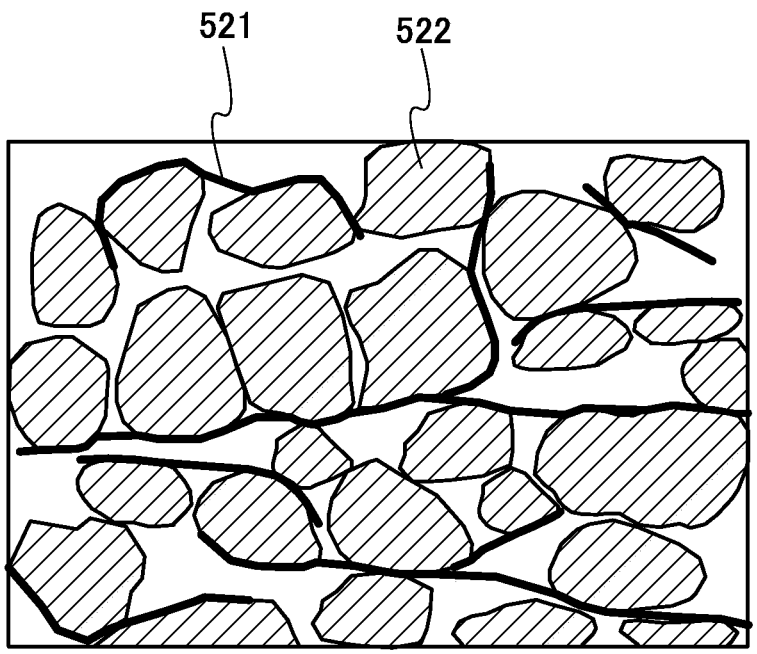
FIGS. 4A to 4C are cross-sectional views of an electrode.

FIG. 4A is a longitudinal sectional view of the positive electrode active material layer 502. The positive electrode active material layer 502 includes positive electrode active material particles 522, graphene flakes 521 as a conductive additive, and a binder (not illustrated).

The longitudinal section of the positive electrode active material layer 502 in FIG. 4A shows substantially uniform dispersion of the graphene flakes 521 in the positive electrode active material layer 502. The graphene flakes 521 are schematically shown by thick lines in FIG. 4A but are actually thin films each having a thickness corresponding to the thickness of a single layer or a multi-layer of carbon molecules. The plurality of graphene flakes 521 are formed in such a way as to wrap, coat, or adhere to the surfaces of the plurality of positive electrode active material particles 522, so that the graphene flakes 521 make surface contact with the positive electrode active material particles 522. Furthermore, the graphene flakes 521 are also in surface contact with each other; consequently, the plurality of graphene flakes 521 form a three-dimensional network for electric conduction.

This is because graphene oxide with extremely high dispersibility in a polar solvent is used for the formation of the graphene flakes 521. The solvent is removed by volatilization from a dispersion medium in which graphene oxide is uniformly dispersed, and the graphene oxide is reduced to graphene; hence, the graphene flakes 521 remaining in the positive electrode active material layer 502 partly overlap with each other and are dispersed such that surface contact is made, thereby forming an electrical conduction path.

Unlike a conventional conductive additive in the form of particles, such as acetylene black, which makes point contact with an active material, the graphene flake 521 is capable of making low-resistance surface contact; accordingly, the electrical conduction between the positive electrode active material particles 522 and the graphene flakes 521 can be improved without an increase in the amount of a conductive additive. Thus, the proportion of the positive electrode active material particles 522 in the positive electrode active material layer 502 can be increased. This can increase the discharge capacity of a storage battery.

Next, an example of a method for fabricating a positive electrode in which graphene is used as a conductive additive will be described. First, an active material, a binder, and graphene oxide are prepared.

The graphene oxide is a raw material of the graphene flakes 521 that serves as a conductive additive later. Graphene oxide can be formed by various synthesis methods such as a Hummers method, a modified Hummers method, and oxidation of graphite. Note that a method for fabricating a storage battery electrode of the present invention is not limited by the degree of separation of graphene oxide.

For example, the Hummers method is a method for forming graphite oxide by oxidizing graphite such as flake graphite. The obtained graphite oxide is graphite that is oxidized in places and thus to which a functional group such as a carbonyl group, a carboxyl group, or a hydroxyl group is bonded. In the graphite oxide, the crystallinity of the graphite is lost and the distance between layers is increased. Therefore, the layers can be easily separated by ultrasonic treatment or the like to obtain graphene oxide.

The length of one side (also referred to as a flake size) of the graphene oxide is greater than or equal to 50 nm and less than or equal to 100 μm, preferably greater than or equal to 800 run and less than or equal to 20 μm. Particularly in the case where the flake size is smaller than the average particle size of the positive electrode active material particles 203, the surface contact with a plurality of the positive electrode active material particles 522 and connection between graphene flakes become difficult, resulting in difficulty in improving the electrical conductivity of the positive electrode active material layer 502.

Positive electrode slurry is formed by adding a solvent to such graphene oxide, an active material, and a binder. As the solvent, water or a polar organic solvent such as N-methylpyrrolidone (NMP) or dimethylformamide can be used.

With the use of the active material layer including the active material particles, graphene, and the binder in the above-described manner, a graphene flake and part of the alloy-based material particles have a surface contact so that the flake surrounds the particles, and graphene flakes also have surface contact to overlap with each other; thus, an extensive network of three-dimensional electric conduction paths is established in the active material layer. For this reason, it is possible to form an active material layer with higher electric conductivity than a negative electrode active material layer including acetylene black (AB) particles or ketjen black (KB) particles, which are conventionally used as a conductive additive and have an electrical point contact with an active material.

Furthermore, graphene is preferably used because even in the case of using, for example, an active material with a small particle size, the conductive path can be maintained even after charges and discharges are repeatedly performed. Thus, favorable cycle characteristics can be achieved. A material that can have a surface contact with an active material, such as graphene, is preferably used in a storage battery provided in an electronic device that can be repeatedly folded, in which case the contact between the active material and a conductive additive can be maintained even when the electronic device is folded. Graphene is preferably used because it is flexible and thus allows a storage battery to flexibly change its form when the storage battery is changed in form by being folded and can prevent breakage of the conductive additive when the storage battery is changed in form.

Graphene flakes are bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the power storage device can be increased.

In the case where the positive electrode active material layer 502 includes a binder, the binder described in Embodiment 1 is used, for example. One example is PVDF, which has high resistance to oxidation and is stable even in the case where foe battery reaction potential of the positive electrode is high. Another example is water-soluble polymers, which have high dispensability and can be evenly dispersed with small active material particles. Thus, water-soluble polymers can function even in a smaller amount. A film containing water-soluble polymers that covers or is in contact with the surface of an active material can inhibit the decomposition of an electrolytic solution.

Note that the amount of graphene oxide is set to 0.1 wt % to 10 wt % inclusive, preferably 0.1 wt % to 5 wt % inclusive, more preferably 0.2 wt % to 1 wt % inclusive with respect to the total weight of the mixture of the graphene oxide, the positive electrode active material, the conductive additive, and the binder. In contrast, graphene obtained after the positive electrode slurry is applied to a current collector and reduction is performed is included at least at 0.05 wt % to 5 wt % inclusive, preferably 0.05 wt % to 2.5 wt % inclusive, more preferably 0.1 wt % to 0.5 wt % inclusive with respect to the total weight of the positive electrode active material layer. This is because the weight of graphene obtained by reducing graphene oxide is approximately half that of the graphene oxide.

Note that a polar solvent may be further added after the mixing so that foe viscosity of the mixture can be adjusted. Mixing and addition of a polar solvent may be repeated more than once.

Subsequently, the positive electrode slurry is applied to the current collector.

Then, the solvent is volatilized from the slurry applied to the positive electrode current collector 501 by a method such as ventilation drying or reduced pressure (vacuum) drying, whereby the positive electrode active material layer 502 is formed. The drying step is preferably performed using, for example, a hot wind at a temperature higher than or equal to 50° C. and lower than or equal to 160° C. There is no particular limitation on the atmosphere.

Note that the positive electrode active material layer 502 may be formed over only one surface of the positive electrode current collector 501, or the positive electrode active material layers 502 may be formed such that the positive electrode current collector 501 is sandwiched therebetween. Alternatively, the positive electrode active material layers 502 may be formed such that part of the positive electrode current collector 501 is sandwiched therebetween.

The positive electrode current collector 501 may be subjected to surface treatment. Examples of such surface treatment include corona discharge treatment, plasma treatment, and undercoat treatment. The surface treatment increases the wettability of the positive electrode current collector SOI to the positive electrode slurry. In addition, the adhesion between the positive electrode current collector 501 and the positive electrode active material layer 502 can be increased.

The positive electrode active material layer 502 may be pressed by a compression method such as a roll press method or a flat plate press method so as to be consolidated.

Then, graphene oxide is preferably reduced by heat treatment or with the use of a reducing agent, for example.

An example of a reducing method using a reducing agent will be described below. First, a reaction is caused in a solvent containing a reducing agent. Through this step, the graphene oxide contained in the active material layer is reduced to form the graphene flakes 521. Note that it is possible that oxygen in the graphene oxide is not necessarily entirely released and may partly remain in the graphene. When the graphene flakes 521 contain oxygen, the proportion of oxygen measured by XPS is higher than or equal to 2 at. % and lower than or equal to 20 at. %, preferably higher than or equal to 3 at. % and lower titan or equal to 15 at. %. This reduction treatment is preferably performed at higher than or equal to room temperature and lower than or equal to 150° C.

Examples of the reducing agent include ascorbic acid, hydrazine, dimethyl hydrazine, hydroquinone, sodium boron hydride (NaBHf), tetra butyl ammonium bromide (TBAB), LiAlH$_4$, ethylene glycol, polyethylene glycol, N,N-diethylhydroxylamine, and a derivative thereof.

A polar solvent can be used as the solvent. Any material can be used for the polar solvent as long as it can dissolve the reducing agent. Examples of the material of tire polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

After that, washing and drying are performed. The drying is preferably performed under a reduced pressure (in vacuum) or in a reduction atmosphere. This drying step is preferably performed, for example, in vacuum at a temperature higher than or equal to 50° C. and lower than or equal to 160° C. for longer than or equal to 10 minutes and shorter than or equal to 48 hours. The drying allows evaporation, volatilization, or removal of the polar solvent and moisture in the positive electrode active material layer 502. The drying may be followed by pressing.

Alternatively, the drying may be performed using a drying furnace or the like. In the case of using a drying furnace, the drying is performed at 30° C. to 200° C. inclusive for longer than or equal to 30 seconds and shorter than or equal to 20 minutes, for example. The temperature may be increased in stages.

Note that heating can facilitate the reduction reaction caused using the reducing agent. After drying following the chemical reduction, heating may further be performed.

In the case of not performing reduction with the use of a reducing agent, reduction can be performed by heat treatment. For example, reduction by heat treatment can be performed under a reduced pressure (in vacuum) at a temperature higher than or equal to 150° C. for longer than or equal to 0.5 hours and shorter than or equal to 30 hours.

Through the above steps, the positive electrode active material layer 502 in which the positive electrode active material particles 522 and the graphene flakes 521 are uniformly dispersed can be formed.

Here, reduction is preferably performed on an electrode using graphene oxide. It is more preferred that reduction be performed in such a manner that chemical reduction and thermal reduction are performed in this order. In thermal reduction, oxygen atoms are released in the form of, for example, carbon dioxide. In contrast, in chemical reduction, reduction is performed using a chemical reaction, whereby the proportion of carbon atoms that form an sp$^2$ bond of graphene can be high. Furthermore, thermal reduction is preferably performed after chemical reduction, in which case the conductivity of formed graphene can be further increased.

The thickness of the positive electrode active material layer 502 formed in the above-described manner is preferably greater than or equal to 5 μm and less than or equal to 300 μm, more preferably greater than or equal to 10 μm and less than or equal to 150 μm, for example. The amount of the active material in the active material layer 102 is preferably greater than or equal to 2 mg/cm$^2$ and less than or equal to 50 mg/cm$^2$, for example.

The use of LiFePO$_4$ for the positive electrode allows fabrication of a highly safe storage battery that is stable to an external load such as overcharge. That is to say, according to one embodiment of the present invention, a long-life and highly safe storage battery can be fabricated. Such a storage battery is particularly suitable for, for example, a mobile device, a wearable device, and the like.

For example, in storage batteries provided in electronic devices that can be repeatedly folded, exterior bodies gradually deteriorate and cracks are likely to be caused in some cases as the electronic devices are folded repeatedly. Furthermore, the contact between a surface of an active material and the like and an electrolytic solution by charge and discharge causes a decomposition reaction, which might generate a gas or the like. When expanded because of generation of a gas, the exterior bodies are more likely to be damaged as the electronic devices are folded. Even in such a case, according to one embodiment of the present invention, for example, generation of a gas by charge and discharge can be inhibited, and consequently, expansion, deformation, damage, and the like of the exterior bodies can be suppressed. This reduces a load on foe exterior body, which is preferable.

Furthermore, the electrode of one embodiment of the present invention used as foe negative electrode can inhibit the decomposition of an electrolytic solution and thus can also inhibit growth of a coating film. The resistance of a negative electrode in which growth of a coating film is significant increases as the number of charge and discharge cycles is increased. In such a negative electrode, lithium deposition might occur because of, for example, stress caused when an electronic device is folded. For example, wrinkles and fold lines formed on an electrode when an electronic device is folded might form unevenness. In the electrode with such unevenness, lithium intercalation into graphite particles proceeds at projections first (the depth of charge is larger than that at a region other than the projections, so that lithium deposition might occur more easily at the projections. The electrode of one embodiment of the present invention used as the negative electrode has durability to stress caused when an electronic device is folded, and thus can reduce the possibility of causing lithium deposition, for example.

Here, the ratio of the capacity of a positive electrode of a storage battery to the capacity of a negative electrode of the storage battery will be described. A variable R defined by Mathematical Formula 5 below is the ratio of positive electrode capacity to negative electrode capacity. Here, positive electrode capacity means the capacity of the positive electrode of the storage battery, and negative electrode capacity means the capacity of the negative electrode of the storage battery.

[Mathematical Formula 5]

$$R = \frac{\text{Positive electrode capacity}}{\text{Negative electrode capacity}} \times 100 \ [\%]$$

Here, the theoretical capacity or the like may be used for calculation of foe positive electrode capacity and the negative electrode capacity. Alternatively, capacity based on a measured value or the like may be used. For example, in the case where $LiFePO_4$ and graphite are used, the capacity per unit weight of the active material of $LiFePO_4$ is 170 mAh/g, and that of graphite is 372 mAh/g.

In the case where the ratio R of the positive electrode capacity to the negative electrode capacity is small, the depth of charge and discharge of graphite is small, whereas in the case where the ratio R of the positive electrode capacity to the negative electrode capacity is large, the depth of charge and discharge of graphite is large, so that changes of graphite due to expansion and contraction caused by charge and discharge increase, which might decrease the strength of the electrode. Consequently, the reliability of the power storage device might be decreased. For example, the capacity might be reduced through a large number of charge and discharge cycles.

In contrast, in the case where the ratio R of the positive electrode capacity to the negative electrode capacity is large, the specific surface area of graphite with respect to the capacity of the power storage device can be small, which can inhibit a decomposition reaction of an electrolytic solution that occurs on the surface of graphite.

The smaller the depth of charge and discharge of graphite is, the smaller changes in volume due to expansion and contraction are. When the change in volume is small, a coating film formed in the initial charge is less likely to be damaged, for example. Furthermore, the loss of a conductive path of the electrode due to expansion and contraction, or the like can presumably be suppressed. This leads to inhibition of a reduction in capacity with increasing number of charge and discharge cycles.

In addition, for example, in the case where a storage battery provided in an electronic device can be repeatedly folded is expanded and contracted by charge and discharge and deformed as the electronic device is folded, the storage battery deteriorates at high speed compared with the case where folding is not performed. When the depth of charge and discharge is rendered small to inhibit expansion and contraction, however, deterioration can probably be small.

Here, the ratio R of the positive electrode capacity to the negative electrode capacity is, for example, preferably 20% to 90% inclusive, more preferably 30% to 75% inclusive, still more preferably 35% to 50% inclusive.

The optimum value of the depth of charge and discharge of graphite is preferably 20% to 90% inclusive, more preferably 30% to 75% inclusive, still more preferably 35% to 50% inclusive.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used. Examples of the gelled electrolyte (polymer-gel electrolyte) include a host polymer that is used as a support and contains the electrolytic solution described above.

Examples of host polymers include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the separator 507, paper; nonwoven fabric; glass fiber; ceramics; synthetic fiber containing polyamide, vinylon (polyvinyl alcohol-based fiber), polyester, acrylic, polyolefin, or polyurethane; or the like can be used.

Figure 5A:
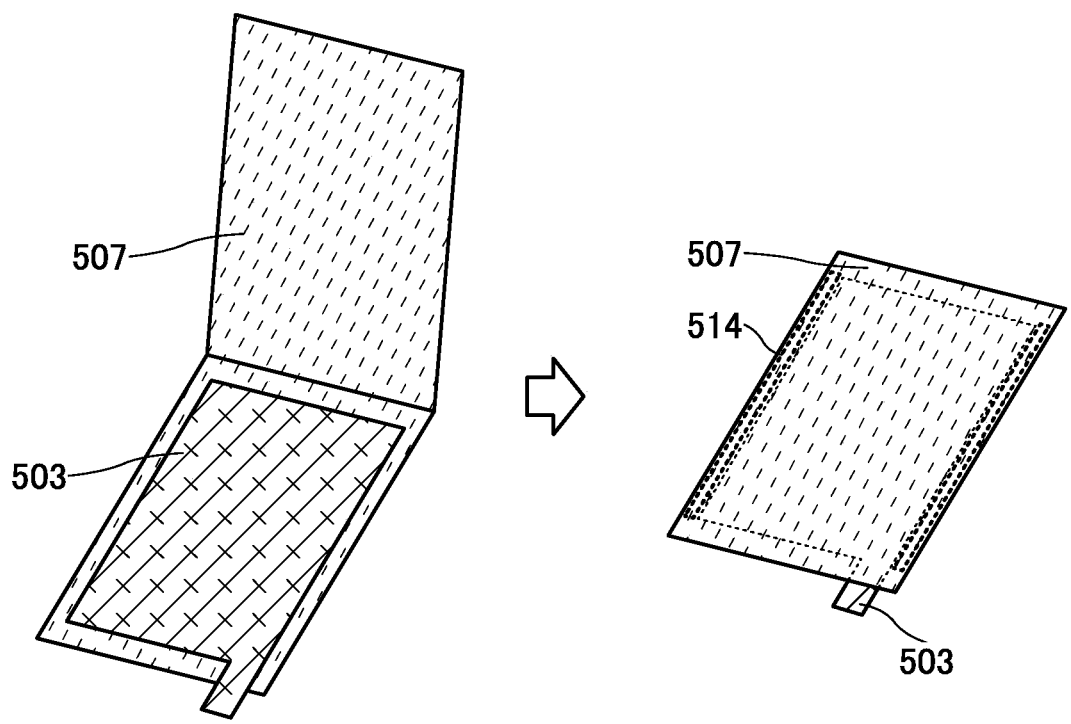
Figure 5B:
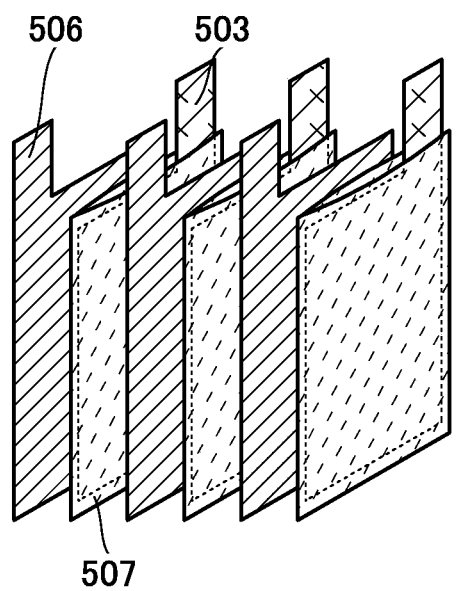

The separator 507 is preferably formed to have a bag-like shape to surround one of the positive electrode 503 and the negative electrode 506. For example, as illustrated in FIG. 5A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 5B, the positive electrodes 503 surrounded by the separators 507 and the negative electrodes 506 are alternately stacked and provided in the exterior body 509, whereby the thin storage battery 500 can be formed.

Here, the operation of storage batteries will be described.

The operating principle of secondary batteries will be described using a lithium-ion secondary battery as an example. Here, for example, $LiFePO_4$ and graphite are used as a positive electrode active material and a negative electrode active material, respectively.

FIG. 41 illustrates connections between a lithium-ion secondary battery 1101 and a charger 1102 when the lithium-ion secondary battery is charged. In the case of charging the lithium-ion secondary battery, a reaction expressed by Formula 6 occurs in a positive electrode.

$LiFePO_4 \rightarrow FePO_4 + Li^+ + e^-$       [Formula 6]

In addition, a reaction expressed by Formula 7 occurs in a negative electrode.

$xC + Li^+ + e^- \rightarrow LiC_x \; x \geq 6$       [Formula 7]

FIG. 42 illustrates connections between the lithium-ion secondary battery 1101 and a load 1103 when the lithium-ion secondary battery is discharged. In the case of discharging the lithium-ion secondary battery, a reaction expressed by Formula 8 occurs in the positive electrode.

$FePO_4 + Li^+ + e^- \rightarrow LiFePO_4$       [Formula 8]

In addition, a reaction expressed by Formula 9 occurs in the negative electrode.

$LiC_x \rightarrow xC + Li^+ + e^- \; x \geq 6$       [Formula 9]

Figure 4B:
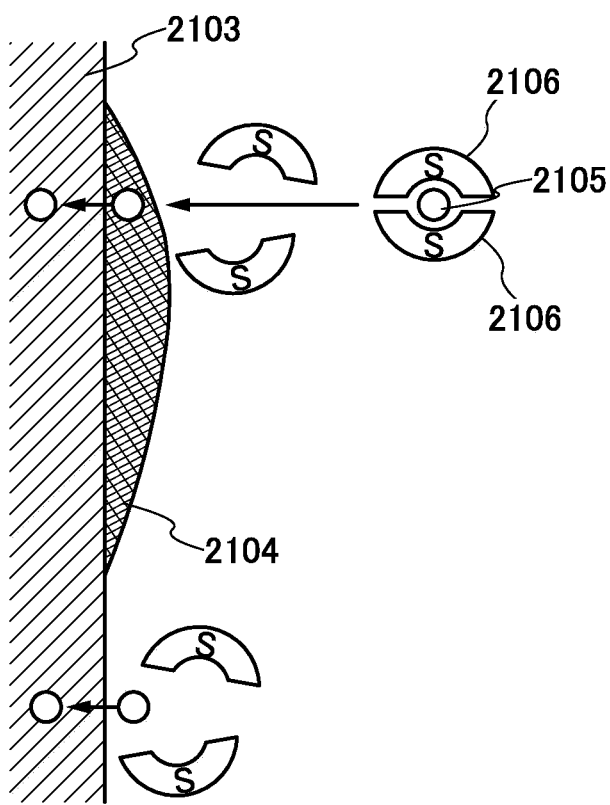
Figure 4C:
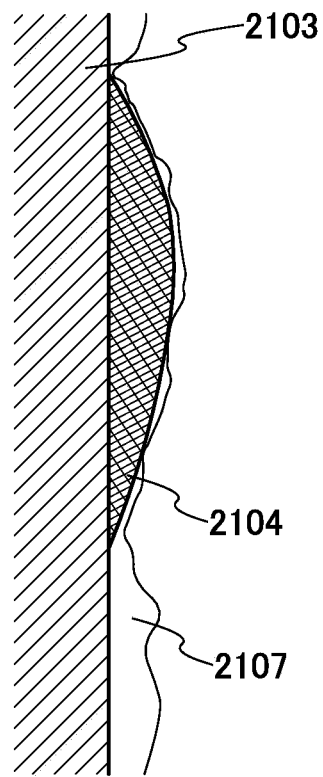

Here, an electrode of one embodiment of the present invention will be described with reference to FIGS. 4B and 4C. FIG. 4B illustrates the state where a film-like binder 2104 is in contact with a surface of an active material 2103. In an electrolytic solution, solvent molecules 2106 are solvated with a cation 2105 that contributes to a battery reaction (e.g., a lithium ion in a lithium-ion secondary battery). Although FIG. 4B illustrates the state where two solvent molecules are solvated for simplicity, it is needless to say that more than two solvent molecules may be solvated. The solvent molecules 2106 are desolvated from the cation 2105 at the surface of the binder 2104 or the surface of the active material 2103, and the cation 2105 is inserted into the active material 2103 through the binder 2104 or from the surface of the active material. Although not illustrated, release of the cation 2105 from the active material 2103 also occurs as a counter reaction.

Here, a coating film 2107 is formed on the surface of the active material mainly in the initial charge. It is believed that the coating film 2107 is also grown in the initial discharge and the second and subsequent charge and discharge cycles. The coating film 2107 is formed in such a manner that a solvent or a salt in the electrolytic solution is decomposed at a potential at which a battery reaction is caused and the decomposition product is deposited. Here, a coating film is presumably not formed on the surface of the binder 2104, which functions as a passivation film, or a coating film is presumably thinner on the surface of the binder 2104 than on a portion where the binder 2104 does not exist or a portion where the binder 2104 is thin. In other words, decomposition of the electrolytic solution can be more inhibited on the surface of the binder 2104 than on a portion where the binder 2104 does not exist or a portion where the binder 2104 is thin.

Here, decomposition of the electrolytic solution is caused by a reduction reaction, an oxidation reaction, or the like, so that charge is consumed. This causes the irreversible capacity of the battery.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where an electrolytic solution is decomposed and a gas is generated and accumulated in the storage battery, the electrolytic solution cannot be in contact with a surface of the electrode in some regions. That is to say, an effectual reaction area of the electrode is reduced and effectual current density is increased.

When the current density is extremely high, a voltage drop occurs depending on the resistance of the electrode, lithium is intercalated into graphite and lithium is deposited on the surface of graphite. The lithium deposition might reduce capacity. For example, if a coating film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a coating film. The formed coating film may thus be densified when the charging state is held at a temperature higher than room temperature after the release of the gas, for example.

Figure 6A:
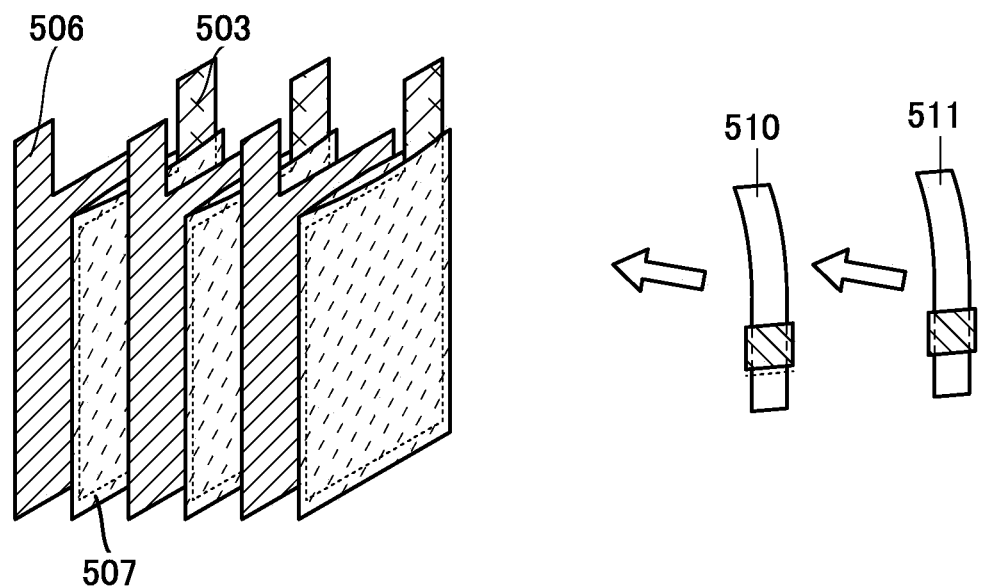
FIGS. 6A and 6B illustrate a thin storage battery.
Figure 6B:
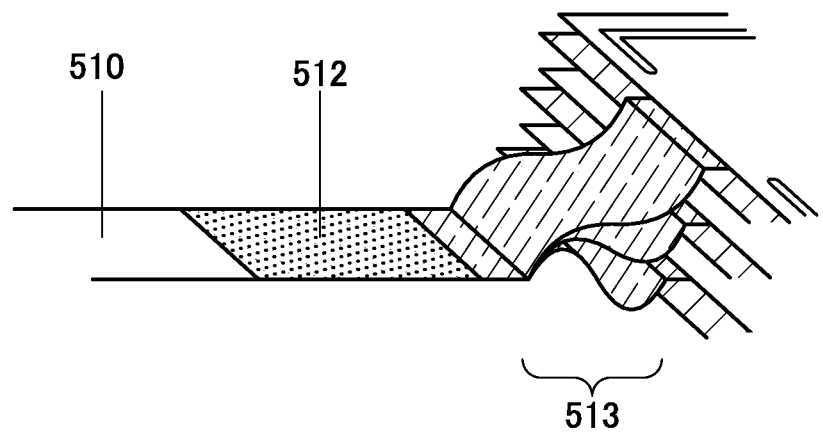

FIG. 6B illustrates an example where a current collector is welded to a lead electrode, specifically, an example where positive electrode current collectors 501 are welded to a positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 6B, and it is therefore possible to relieve stress due to external force applied after fabrication of the thin storage battery 500. Thus, the thin storage battery 500 can have high reliability.

In the thin storage battery 500 illustrated in FIG. 2 and FIGS. 3A and 3B, the positive electrode current collectors 501 and the negative electrode current collectors 504 are welded to the positive electrode lead electrode 510 and a negative electrode lead electrode 511, respectively, by ultrasonic welding so that part of the positive electrode lead electrode 510 and part of the negative electrode lead electrode 511 are exposed to the outside. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

Although the positive electrode lead electrode 510 and the negative electrode lead electrode 511 are provided on the same side in FIG. 2, the positive electrode lead electrode 510 and the negative electrode lead electrode 511 may be provided on different sides as illustrated in FIG. 7. The lead electrodes of a storage battery of one embodiment of the present invention can be finely positioned as described above; therefore, the degree of freedom in design is high. Accordingly, a product including a storage battery of one embodiment of the present invention can have a high degree of freedom in design. Furthermore, an yield of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIG. 2 includes five positive electrode-negative electrode pairs (the positive and negative electrodes of each pair face each other). It is needless to say that the number of pairs of electrodes is not limited to five, and may be more than five or less than five. In the case of a large number of electrode layers, the storage battery can have high capacity. In contrast, in the case of using a small number of electrode layers, the storage battery can have a small thickness and high flexibility.

In the above structure, the exterior body 509 of the storage battery can change its form with a radius of greater than or equal to 10 mm, preferably greater than or equal to 30 mm. One or two films are used as the exterior body of the storage battery. In the case where the storage battery has a layered structure, the storage battery has a cross section sandwiched by two curved surfaces of the films when it is bent.

Figure 8A:
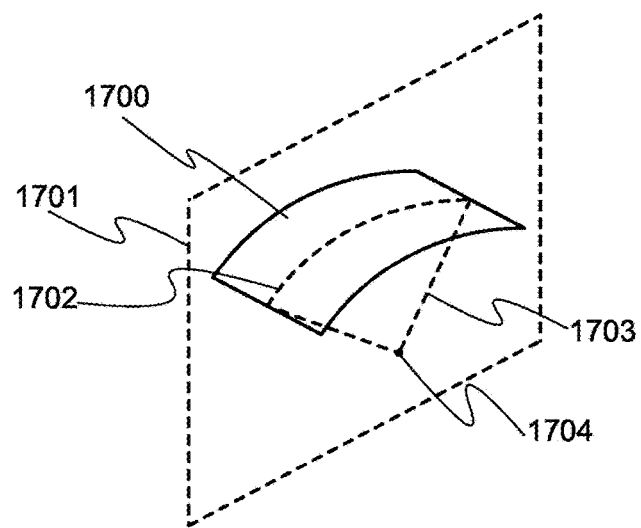
FIGS. 8A to 8C illustrate the radius of curvature of a surface.
Figure 8B:
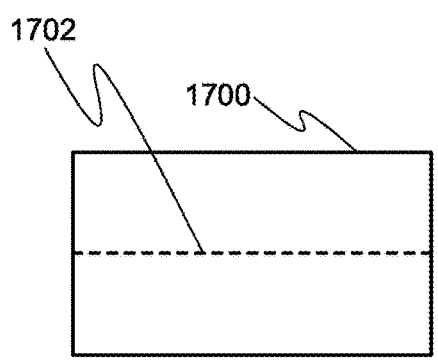
Figure 8C:
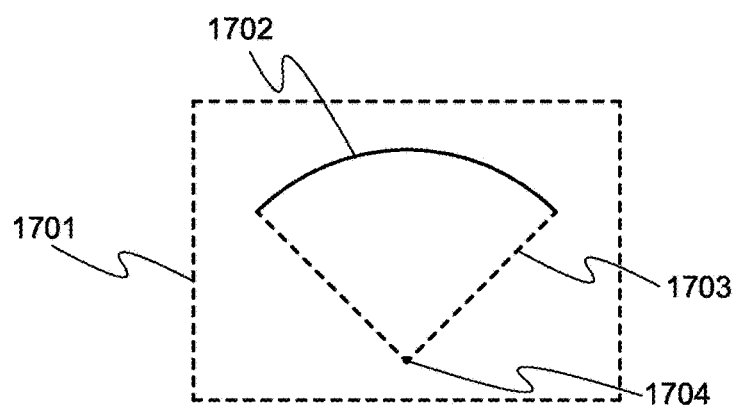

Description is given of the radius of curvature of a surface with reference to FIGS. 8A to 8C. In FIG. 8A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 8B is a top view of the curved surface 1700. FIG. 8C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 9A:
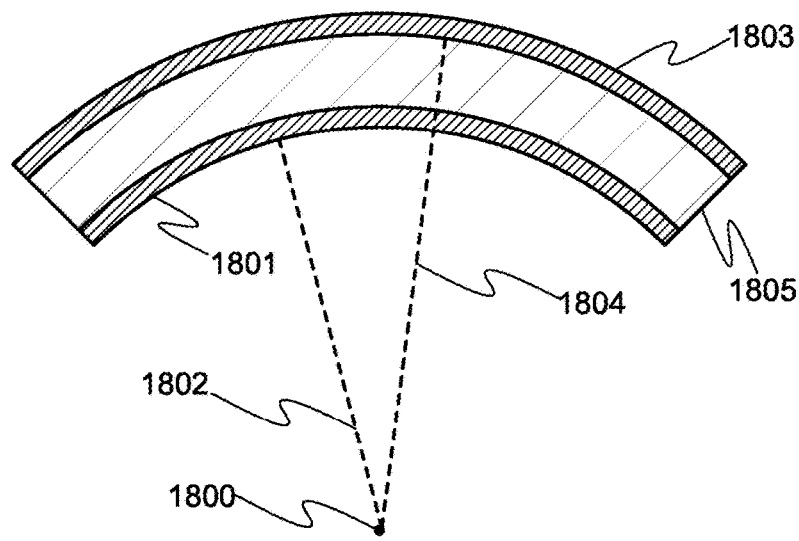
FIGS. 9A to 9D illustrate the radius of curvature of a film.
Figure 9B:
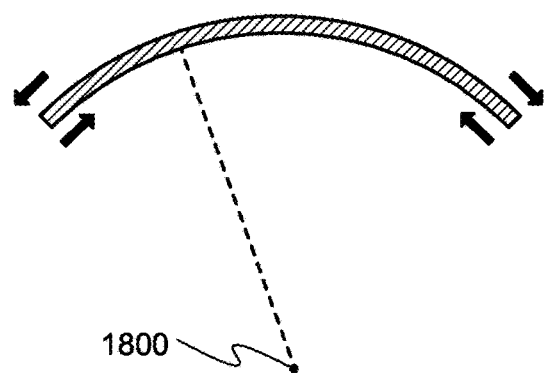

In the case of bending a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 9A). When the secondary battery is curved and has an arc-shaped cross section, compressive stress is applied to a surface of the film on the side closer to the center 1800 of curvature and tensile stress is applied to a surface of the film on the side farther from the center 1800 of curvature (FIG. 9B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 10 mm, preferably greater than or equal to 30 mm.

Figure 9C:
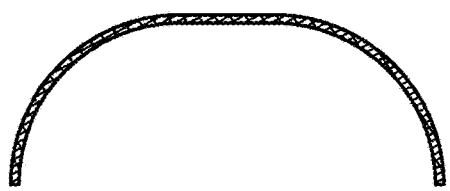
Figure 9D:
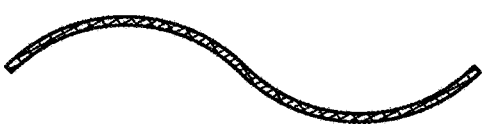

Note that the cross-sectional shape of the secondary battery is not limited to a simple arc shape, and the cross section can be partly arc-shaped; for example, a shape illustrated in FIG. 9C, a wavy shape illustrated in FIG. 9D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

[Coin-Type Storage Battery]

Figure 10A:
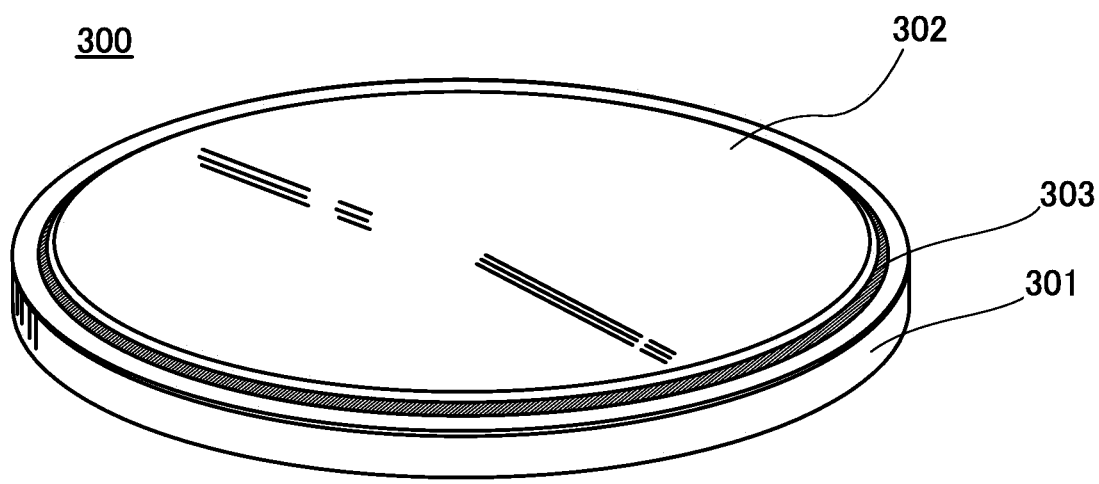
FIGS. 10A and 10B illustrate a coin-type storage battery.
Figure 10B:
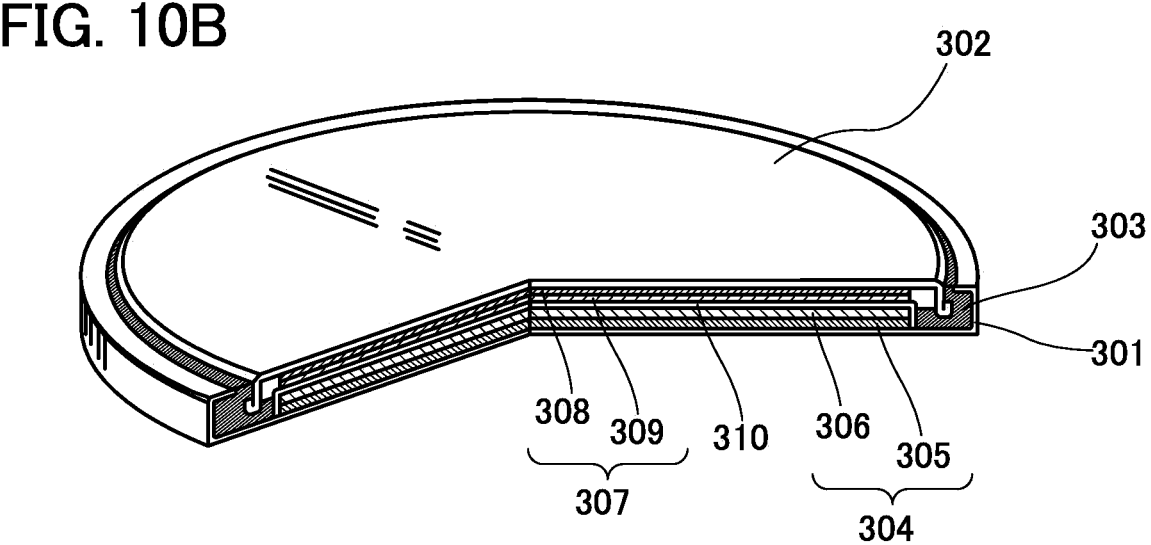

Next, an example of a coin-type storage battery will be described as an example of a power storage device with reference to FIGS. 10A and 10B. FIG. 10A is an external view of a coin-type (single-layer flat type) storage battery, and FIG. 10B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The description of the positive electrode active material layer 502 can be referred to for the positive electrode active material layer 306.

A negative electrode 307 includes a negative electrode current collector 308 and a negative electrode active material layer 309 provided in contact with the negative electrode current collector 308. The description of the negative electrode active material layer 505 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 10B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

[Cylindrical Storage Battery]

Figure 11A:
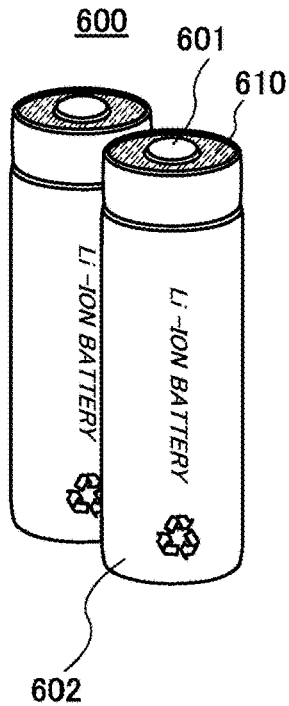
FIGS. 11A and 11B illustrate a cylindrical storage battery.

Next, an example of a cylindrical storage battery will be described as an example of a power storage device with reference to FIGS. 11A and 11B. As illustrated in FIG. 11A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 11B:
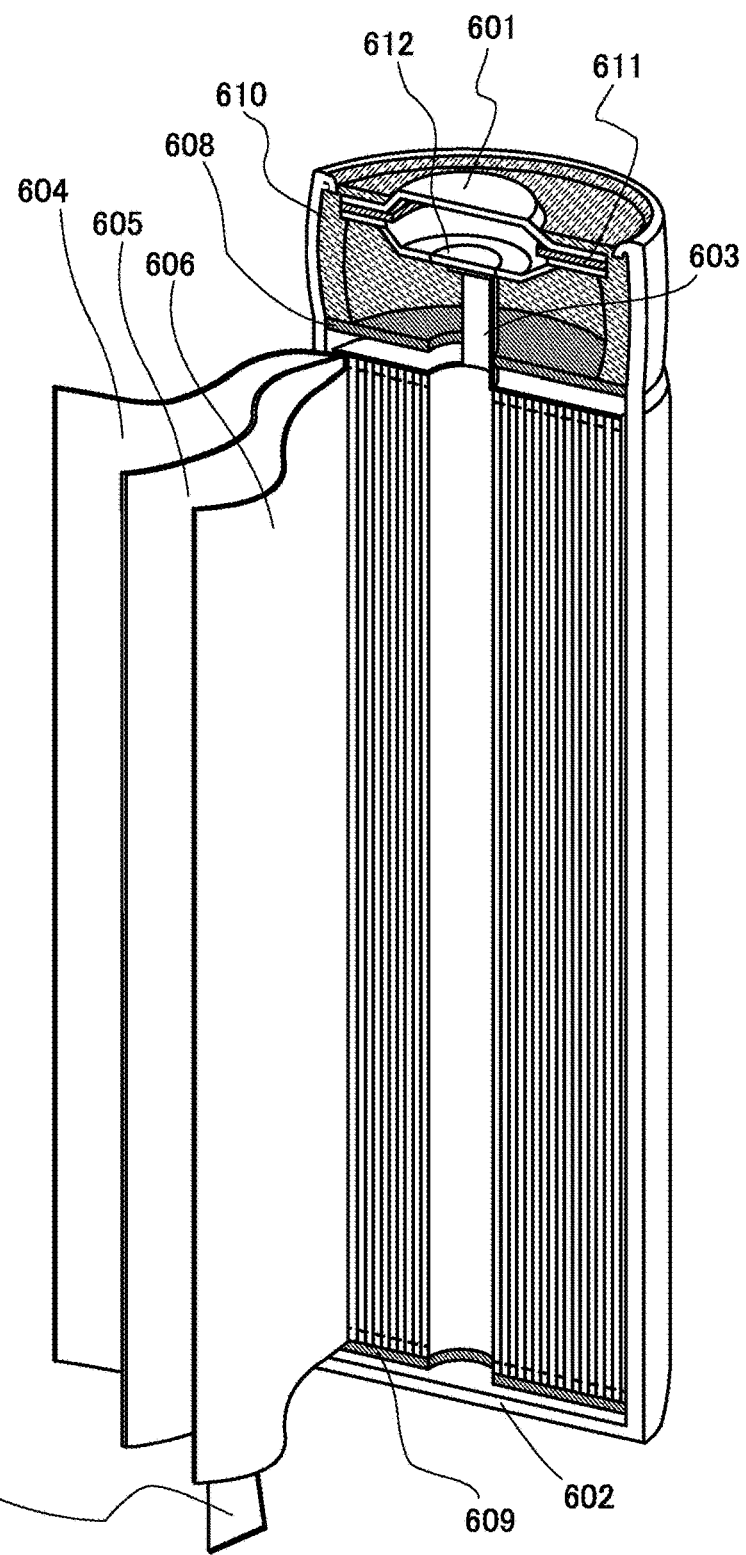

FIG. 11B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 603 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The positive electrode 604 and the negative electrode 606 can be formed in a manner similar to that of the positive electrode and the negative electrode of the thin storage battery described above. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits foe amount of current by increasing the resistance, in order to prevent abnormal heat generation. Note that barium titanate ($BaTiO_3$)-based semiconductor ceramic can be used for the PTC element.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 12A to 12C, FIGS. 13A to 13C, FIGS. 14A and 14B, FIGS. 15A1 to 15B2, and FIGS. 16A and 16B illustrate examples of other storage batteries.

[Structural Example of Storage Battery]

FIGS. 12A to 12C and FIGS. 13A to 13C illustrate structural examples of thin storage batteries. A wound body 993 illustrated in FIG. 12A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 12A:
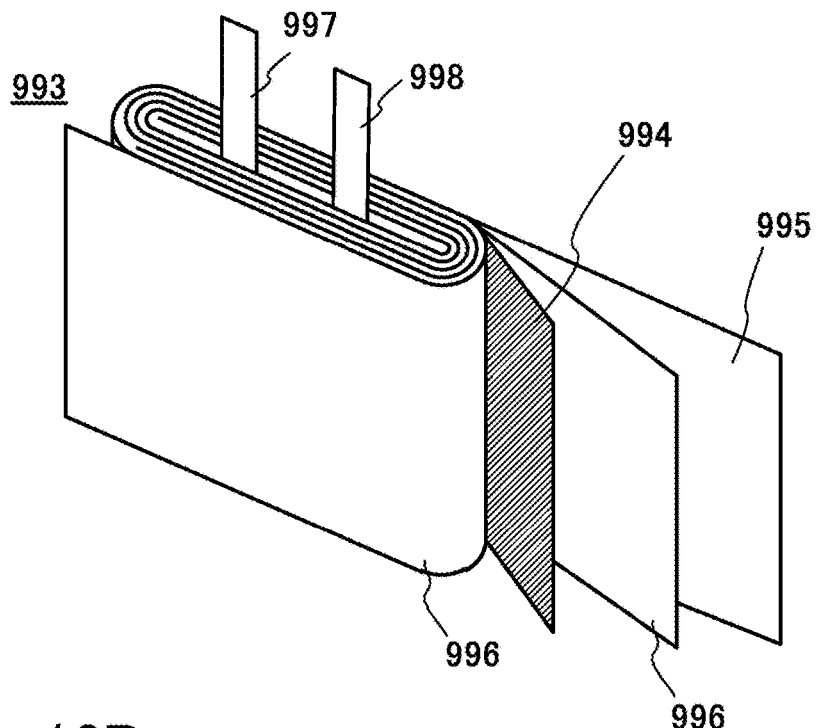
FIGS. 12A to 12C illustrate examples of power storage devices.
Figure 12B:
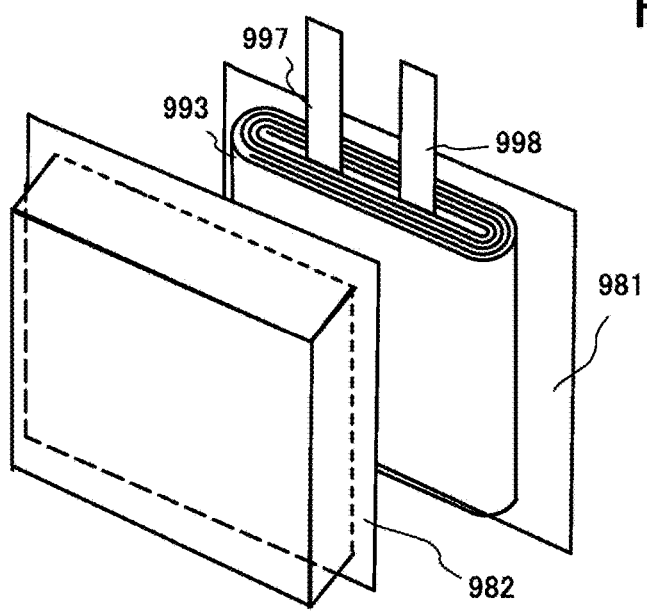
Figure 12C:
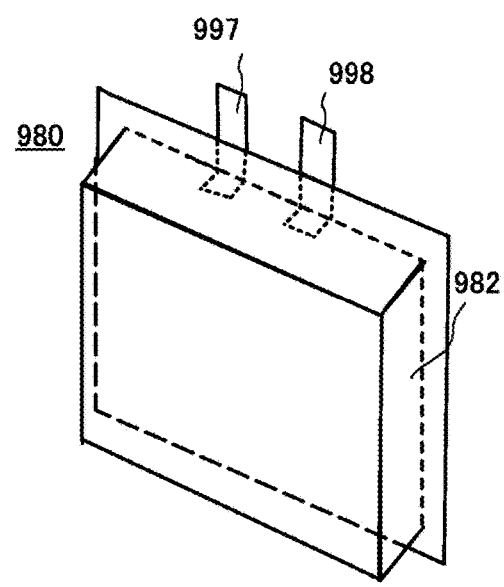

In a storage battery 990 illustrated in FIGS. 12B and 12C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 12B and 12C illustrate an example where a space is formed by two films, the wound body 993 may be placed in a space formed by bending one film.

Furthermore, not only a thin storage battery but also an exterior body and a sealed container of the storage battery may have flexibility in a power storage device. In that case, a resin material or the like is used for the exterior body and the sealed container. Note that in the case where a resin material is used for the exterior body and the sealed container, a conductive material is used for a portion connected to the outside.

For example, FIGS. 13B and 13C illustrate another example of a flexible thin storage battery. The wound body 993 illustrated in FIG. 13A is the same as that illustrated in FIG. 12A, and the detailed description thereof is omitted.

In the storage battery 990 illustrated in FIGS. 13B and 13C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

[Structural Example of Power Storage System]

Structural examples of power storage systems will be described with reference to FIGS. 14A and 14B, FIGS. 15A1 to 15B2, and FIGS. 16A and 16B. Here, a power storage system refers to, for example, a device including a power storage device.

Figure 14A:
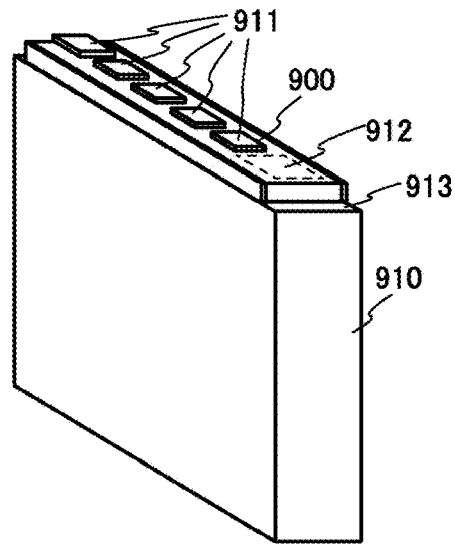
FIGS. 14A and 14B illustrate an example of a power storage device.
Figure 14B:
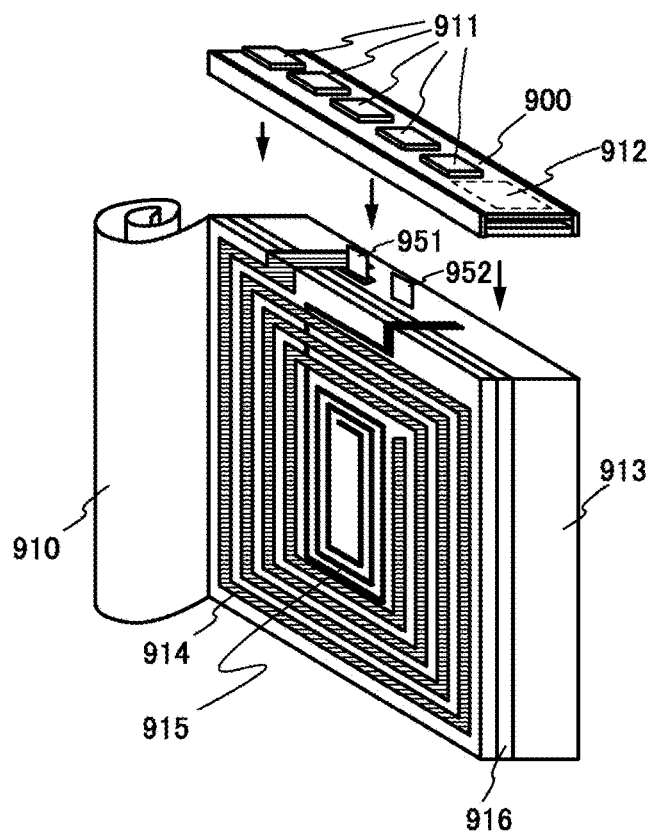

FIGS. 14A and 14B are external views of a power storage system. The power storage system includes a circuit board 900 and a storage battery 913. A label 910 is attached to the storage battery 913. As shown in FIG. 14B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 14A and 14B.

For example, as shown in FIGS. 15A1 and 15A2, two opposite surfaces of the storage battery 913 in FIGS. 14A and 14B may be provided with respective antennas. FIG. 15A1 is an external view showing one side of the opposite surfaces, and FIG. 15A2 is an external view showing the other side of the opposite surfaces. For portions similar to those in FIGS. 14A and 14B, the description of the power storage system illustrated in FIGS. 14A and 14B can be referred to as appropriate.

As illustrated in FIG. 15A1, the antenna 914 is provided on one of the opposite surfaces of the storage battery 913 with the layer 916 interposed therebetween, and as illustrated in FIG. 15A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 15B1 and 15B2, two opposite surfaces of the storage battery 913 in FIGS. 14A and 14B may be provided with different types of antennas. FIG. 15B1 is an external view showing one side of the opposite surfaces, and FIG. 15B2 is an external view showing the other side of the opposite surfaces. For portions similar to those in FIGS. 14A and 14B, the description of the power storage system illustrated in FIGS. 14A and 14B can be referred to as appropriate.

As illustrated in FIG. 15B1, the antenna 914 is provided on one of the opposite surfaces of the storage battery 913 with the layer 916 interposed therebetween, and as illustrated in FIG. 15B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 16A:
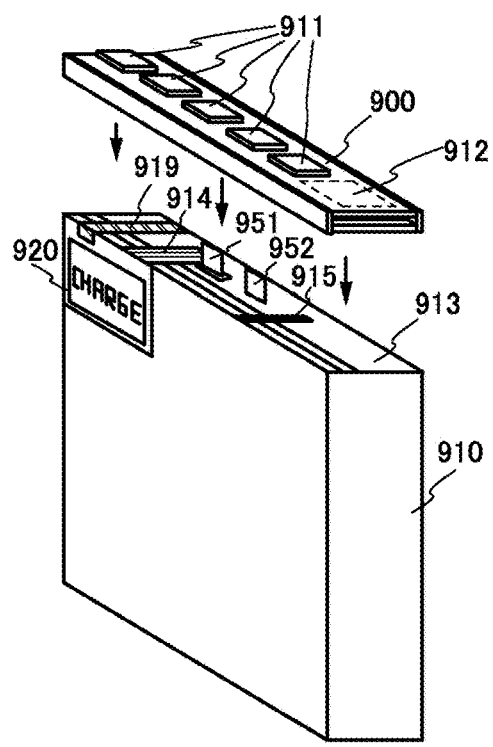
FIGS. 16A and 16B illustrate examples of power storage devices.

Alternatively, as illustrated in FIG. 16A, the storage battery 913 in FIGS. 14A and 14B may be provided with a display device 920. The display device 920 is electrically connected to the terminal 911 via a terminal 919. It is possible that the label 910 is not provided in a portion where the display device 920 is provided. For portions similar to those in FIGS. 14A and 14B, the description of the power storage system illustrated in FIGS. 14A and 14B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.191

Figure 16B:
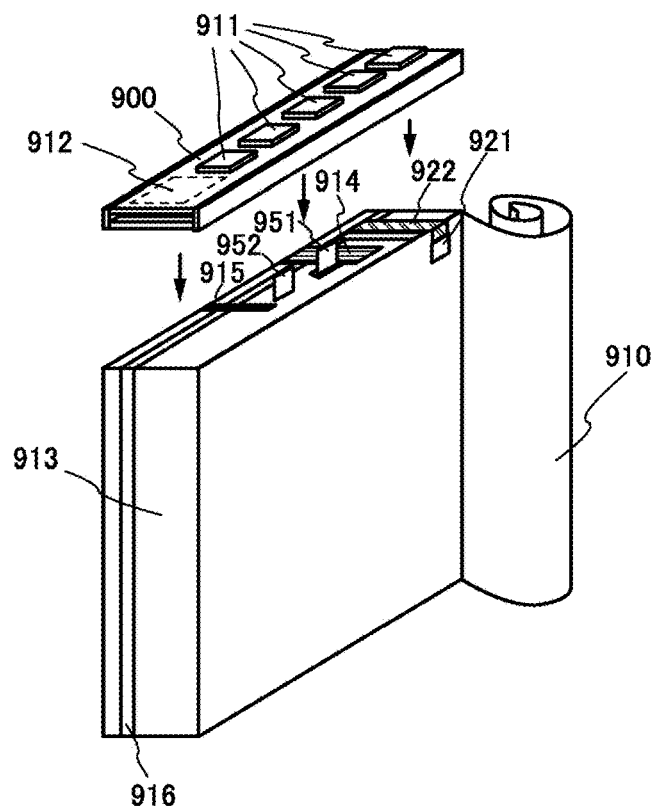

Alternatively, as illustrated in FIG. 16B, the storage battery 913 illustrated in FIGS. 14A and 14B may be provided with a sensor 921. The sensor 921 is electrically connected to the terminal 911 via a terminal 922. For portions similar to those in FIGS. 14A and 14B, the description of the power storage system illustrated in FIGS. 14A and 14B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 3

In this embodiment, an example of an electronic device including a flexible power storage device will be described.

FIGS. 17A to 17G illustrate examples of electronic devices including the flexible storage batteries described in Embodiment 2. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 17A:
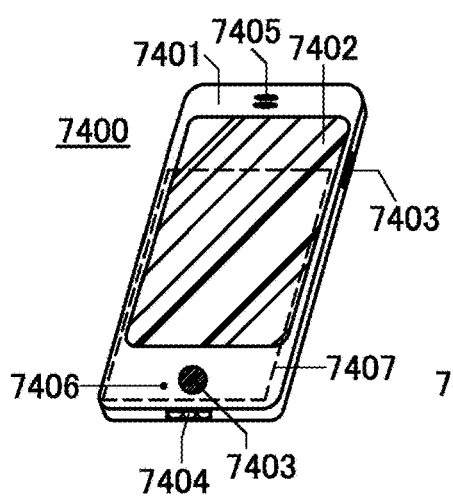
FIGS. 17A to 17G illustrate examples of electronic devices.

FIG. 17A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 17B:
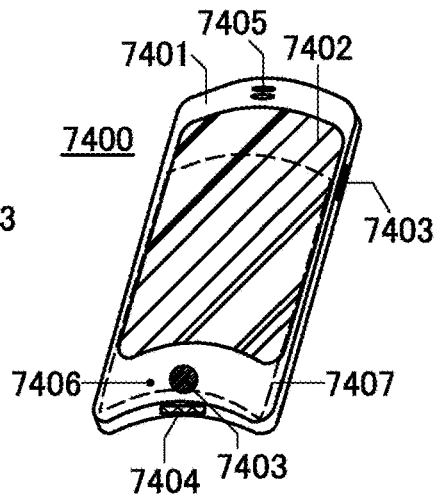
Figure 17C:
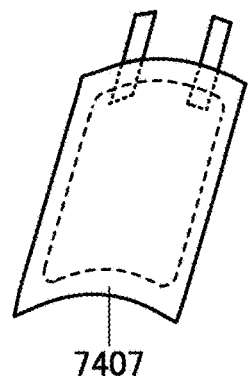

FIG. 17B illustrates the mobile phone 7400 that is bent. When the whole mobile phone 7400 is bent by the external force, the power storage device 7407 included in the mobile phone 7400 is also bent. FIG. 17C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409.

Figure 17D:
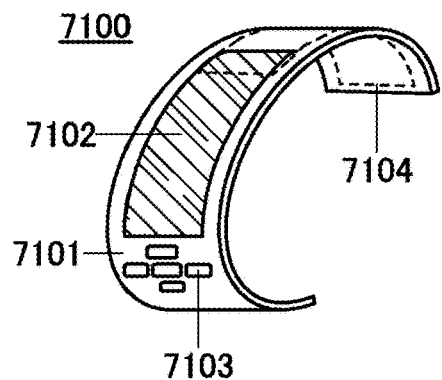
Figure 17E:
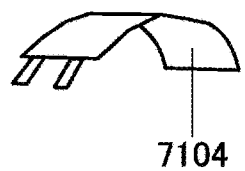

FIG. 17D illustrates an example of a bangle display device. A portable display device 7100 includes a housing 7101, a display portion 7102, an operation button 7103, and a power storage device 7104. FIG. 17E illustrates the bent power storage device 7104. When the display device is worn on a user's arm while the power storage device 7104 is beat, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 17F:
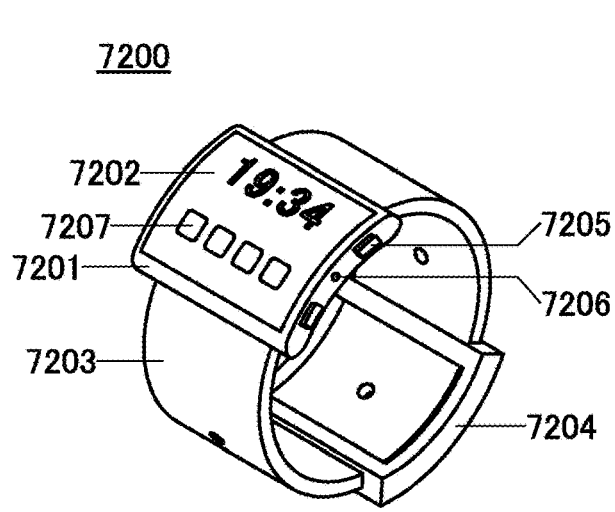

FIG. 17F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as power on/off, on/off of wireless communication, setting and cancellation of a manner mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 17E that is in the state of being curved can be provided in the housing 7201. Alternatively, the power storage device 7104 illustrated in FIG. 17E can be provided in the band 7203 such that it can be curved.

Figure 17G:
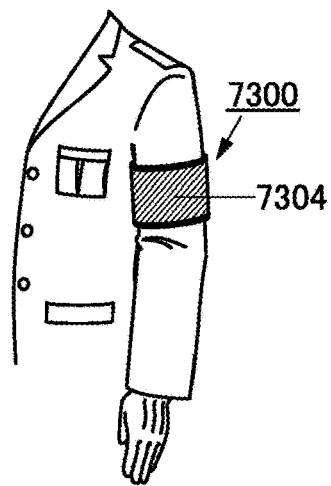

FIG. 17G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of foe other embodiments.

Embodiment 4

In this embodiment, examples of electronic devices that can include power storage devices will be described.

Figure 18A:
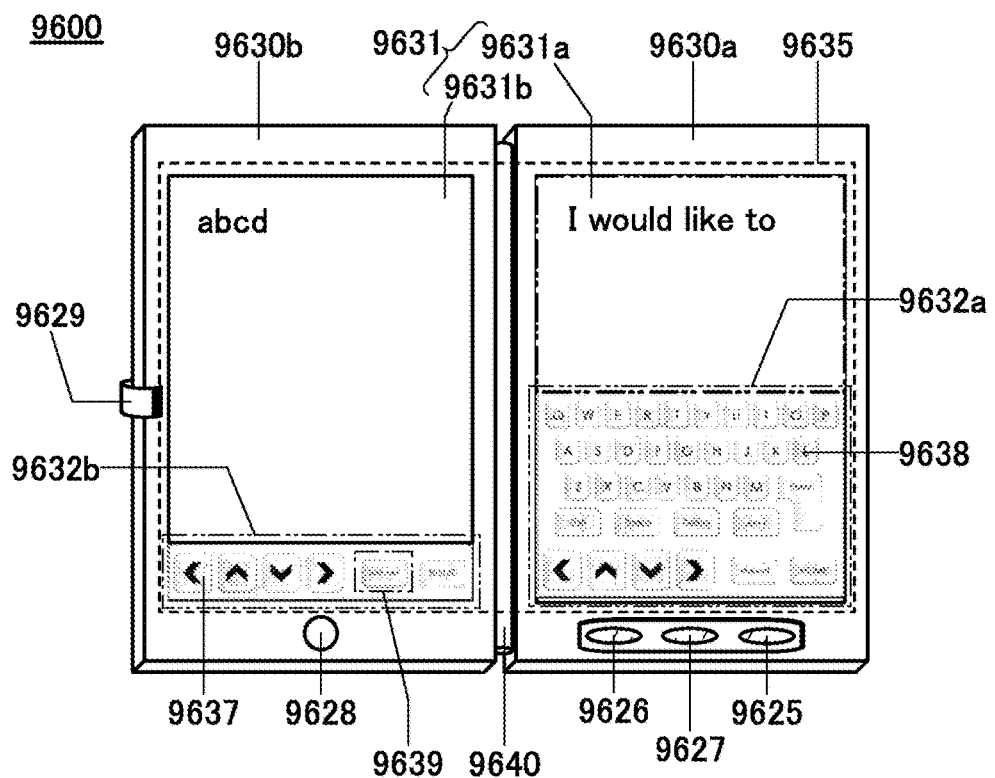
FIGS. 18A to 18C illustrate an example of an electronic device.
Figure 18B:
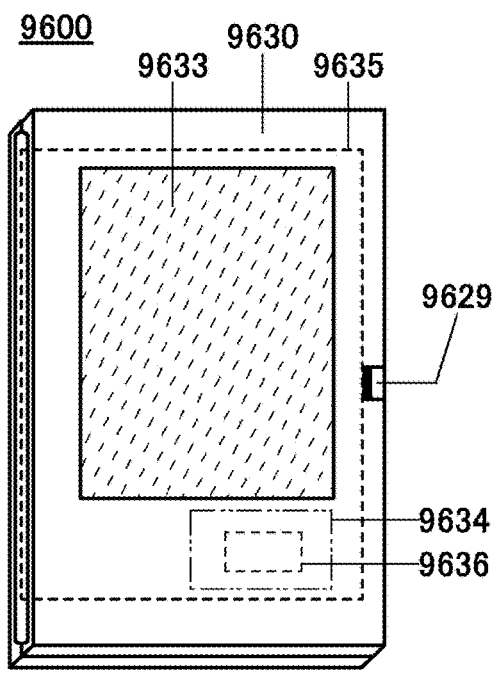

FIGS. 18A and 18B illustrate an example of a tablet terminal that can be folded in half. A tablet terminal 9600 illustrated in FIGS. 18A and 18B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 18A illustrates the tablet terminal 9600 that is opened, and FIG. 18B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that FIG. 18A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 18A, one embodiment of the present invention is not limited to this example. The display portion 9631*a* and the display portion 9631*b* may have different areas or different display quality. For example, one of the display portions 9631*a* and 9631*b* may display higher definition images than the other.

The tablet terminal is closed in FIG. 18B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 18A and 18B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 18C:
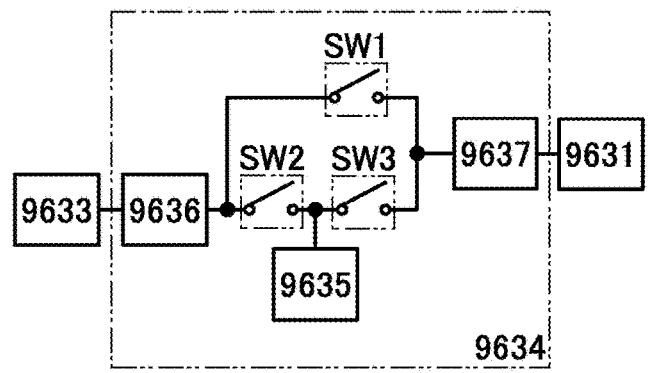

The structure and operation of the charge and discharge control circuit 9634 illustrated in FIG. 18B will be described with reference to a block diagram in FIG. 18C. The solar cell 9633, the power storage unit 9635, the DCDC converter 9636, a converter 9637, switches SW1 to SW3, and the display portion 9631 are illustrated in FIG. 18C, and the power storage unit 9635, the DCDC converter 9636, the converter 9637, and the switches SW1 to SW3 correspond to the charge and discharge control circuit 9634 in FIG. 18B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 19:
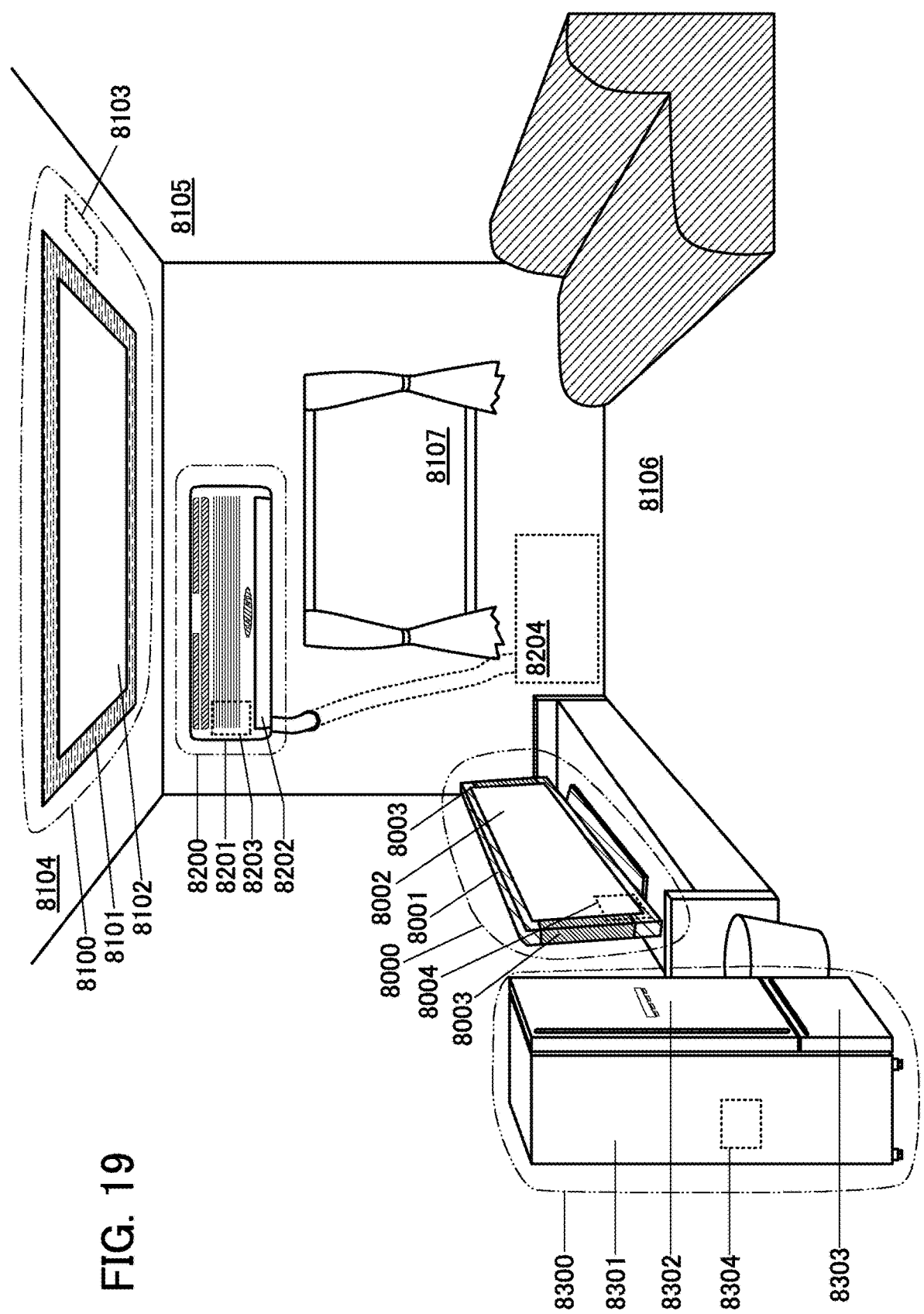
FIG. 19 illustrate examples of electronic devices.

FIG. 19 illustrates other examples of electronic devices. In FIG. 19, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing

8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 19, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 19 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of foe present invention as an uninterruptible power supply even when electric power cannot be supplied from a commercial power supply due to power failure or the like.

Note that although the installation lighting device 8100 provided in the ceiling 8104 is illustrated in FIG. 19 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 19, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 19 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where foe power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 19 as an example, the power storage device of one embodiment of the present invention can be used in an air conditioner in which the functions of an indoor unit and an outdoor unit are integrated in one housing.

In FIG. 19, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 19. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a tune period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and foe door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 5

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 20A:
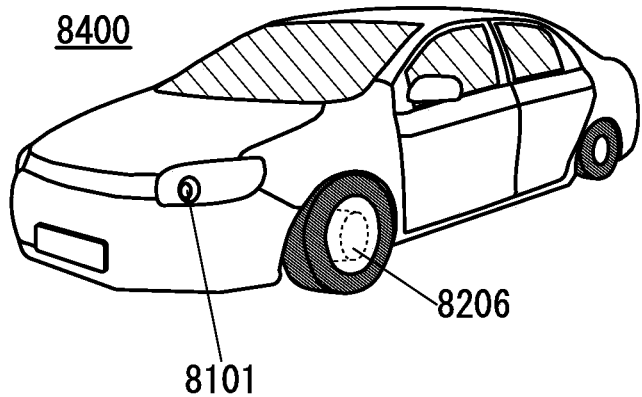
FIGS. 20A and 20B illustrate examples of electronic devices.
Figure 20B:
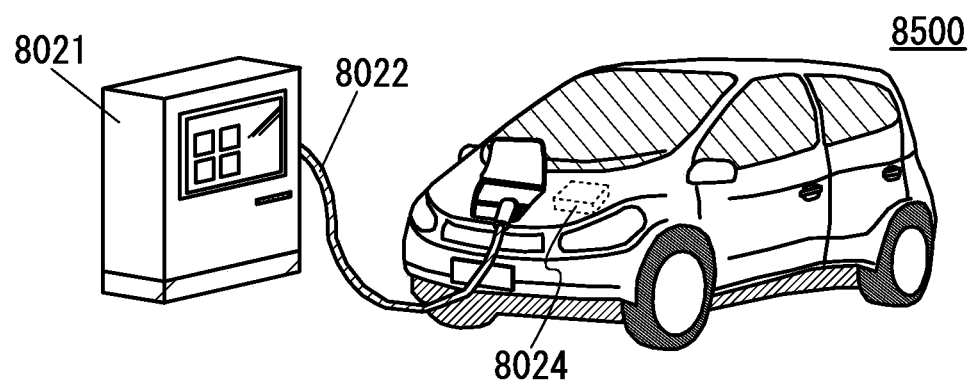

FIGS. 20A and 20B each illustrate an example of a vehicle using one embodiment of the present invention. An automobile 8400 illustrated in FIG. 20A is an electric vehicle that runs on the power of an electric motor 8206. Alternatively, the automobile 8400 is a hybrid electric vehicle capable of driving appropriately using either the electric motor 8206 or the engine. One embodiment of the present invention can provide a high-mileage vehicle. The automobile 8400 includes the power storage device. The power storage device is used not only for driving the electric motor 8206, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 20B illustrates an automobile 8500 including the power storage device. The automobile 8500 can be charged when the power storage device is supplied with electric power through external charging equipment by a plug-in system, a contactless power feeding system, or the like. In FIG. 20B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Example 1

In this example, the characteristics of electrodes each formed using graphite as an active material will be described.

[Fabrication of Electrodes]

Electrodes were each fabricated using graphite as an active material. Table 1 shows the measured values of the specific surface areas and the average particle sizes of graphites that were used.

TABLE 1

|  | Specific surface area [m$^2$/g] | Particle size [μm] |
| --- | --- | --- |
| Graphite A | 1.5 | 11 |
| Graphite B | 1.3 | 9 |
| Graphite C | 2.7 | 20 |
| Graphite D | 6.3 | 15 |

Coated electrodes were fabricated under the conditions of the kinds of graphite and the compositions that are shown in Table 2. As a conductive additive, VGCF (registered trademark)-H (manufactured by SHOWA DENKO K.K., the fiber diameter 150 nm, the specific surface area: 13 m$^2$/g), which is vapor grown carbon fiber, was used. Here, "amount" refers to the amount of an active material. Note that as Graphite D, materials of different two lots ("Lot1" and "Lot2") were used.

TABLE 2

| Condition | | Series | Composition [wt %] |
| --- | --- | --- | --- |
| Electrode A-1 | Graphite A | Series 1 | Graphite:CMC-Na:SBR = 97:1:2 |
| Electrode B-1 | Graphite B | Series 1 | Graphite:CMC-Na:SBR = 97:1:2 |
| Electrode C-1 | Graphite C | Series 1 | Graphite:CMC-Na:SBR = 97:1:2 |
| Electrode D-1 | Graphite D (Lot 2) | Series 1 | Graphite:CMC-Na:SBR = 97:1:2 |
| Electrode E-1 | Graphite D (Lot 2) | — | Graphite:CMC-Na:SBR = 97:1.5:1.5 |
| Electrode E-2 | Graphite D (Lot 1) | — | Graphite:CMC-Na:SBR = 97:1.5:1.5 |
| Electrode F-1 | Graphite D (Lot 1) | — | Graphite:CMC-Na:SBR = 95:3.5:1.5 |
| Electrode G-1 | Graphite D (Lot 1) | — | Graphite:CMC-Na:SBR = 93:1.5:5.5 |
| Electrode A-2 | Graphite A | Series 2 | Graphite:carbon fiber:CMC-Na:SBR = 96:1:1:2 |
| Electrode A-2-2 | Graphite A | Series 2 | Graphite:carbon fiber:CMC-Na:SBR = 96:1:1:2 |
| Electrode C-2 | Graphite C | Series 2 | Graphite:carbon fiber:CMC-Na:SBR = 96:1:1:2 |
| Electrode A-3 | Graphite A | — | Graphite:carbon fiber:AB:CMC-Na:SBR = 96:1: |
| Electrode A-4 | Graphite A | Series 3 | Graphite:PVDF = 90:10 |
| Electrode C-4 | Graphite C | Series 3 | Graphite:PVDF = 90:10 |
| Electrode D-4 | Graphite D | Series 3 | Graphite:PVDF = 90:10 |
| Electrode A-5 | Graphite A | Series 4 | Graphite:carbon fiber:PVDF = 89:1:10 |

Next, methods for fabricating the electrodes will be described. The polymerization degree of CMC-Na used for fabricating the electrodes was 600 to 800, and the viscosity of a 1 wt % CMC-Na aqueous solution was in the range from 300 Pa·s to 500 mPa·s.

Methods for fabricating Electrodes B-1, C-1, D-1, E-1, E-2, F-1, and G-1 will be described. First, slurry was formed. Mixing was performed with a planetary mixer. A container with a volume of 5 ml to 250 ml inclusive, was used for the mixing.

First, an aqueous solution was prepared in such a manner that CMC-Na was uniformly dissolved in pure water. Then, the active material was weighed and the CMC-Na aqueous solution was added thereto.

Then, the mixture of these materials was kneaded in a mixer for 5 minutes. The kneading was performed several times to form a paste. Here, kneading means mixing something so that it has a high viscosity.

Then, a 50 wt % SBR aqueous dispersion liquid was added to the mixture, and mixing was performed with a mixer for 5 minutes.

After that, pure water, which is a disperse medium, was added to the mixture until it had a predetermined viscosity, and mixing was performed using a mixer for 5 minutes once or twice. Through the above steps, the slurry was formed.

Subsequently, the slurry was applied to a current collector with the use of a blade. As the current collector, 18-μm-thick tolled copper foil was used. The scanning speed of the blade was set to 10 mm/sec.

Subsequently, the coated electrode was dried using a hot plate at 50° C. in an air atmosphere for 30 minutes, and then, further drying was performed at 100° C. under a reduced pressure for 10 hours.

Though the above steps, Electrodes B-1, C-1, D-1, E-1, E-2, F-1, and G-1 were fabricated.

Next, a fabricating method of Electrode A-1 will be described. First, slurry was formed. Mixing was performed with a planetary mixer. A container with a volume of 1.4 L was used for the mixing.

First, pure water was added to CMC-Na to prepare an aqueous solution. Then, the active material was weighed and the CMC-Na aqueous solution was added thereto. The weight proportion of water in the total weight of the active material, CMC-Na, and water was set to approximately 28 wt %.

Then, the mixture of these materials was kneaded in a mixer for approximately 40 minutes to form a paste. Here, kneading means mixing something so that it has a high viscosity.

Subsequently, an SBR aqueous dispersion liquid was added to the mixture, water was further added, and mixing was performed with a mixer for 20 minutes.

Pure water serving as a dispersion medium was then added to the mixture until a predetermined viscosity was obtained, and mixing was performed with a mixer for 20 minutes.

Then, the pressure in the mixer containing this mixture was reduced and degasification was performed for 20 minutes. The pressure was adjusted such that a pressure difference from the atmospheric pressure was 0.096 Mpa or less. Through the above steps, the slurry was formed.

Subsequently, the slurry was applied to a current collector with the use of a continuous coater. An 18-μm-thick rolled copper foil was used as the current collector. Two kinds of electrodes with different active material amounts were fabricated. Here, the electrode with an active material amount of approximately 10 mg/cm is Electrode A-1(a), and the electrode with an active material amount of approximately 6 mg/cm$^2$ is Electrode A-1(b). The coating rates of Electrodes A-1(a) and A-1(b) were 3 m/min. and 4 m/min., respectively.

Subsequently, the coated electrode was dried in a drying furnace. Electrode A-1(a) was dried at 80° C. in an air atmosphere for 48 seconds and then further dried at 100° C. in the air atmosphere for 32 seconds. Electrode A-1(b) was dried at 80° C. in an air atmosphere for 36 seconds and then further dried at 100° C. in the air atmosphere for 24 seconds.

After the drying in the drying furnace, further drying was performed at 100° C. under a reduced pressure for 10 hours.

Through the above steps, Electrodes A-1(a) and A-1(b) were fabricated.

Next, methods for fabricating Electrodes A-2, C-2, and A-3 will be described. First, shiny was formed. Mixing was performed with a planetary mixer. A container with a volume of 5 ml to 250 ml inclusive, was used for the mixing.

First, graphite and carbon fiber were weighed, and water whose amount is 36 wt % of the weight of graphite and the conductive additive was added thereto. Then, Imputing was performed with a mixer to form paste-like Mixture 1 (Step 1). Here, kneading means mixing something so that it has a high viscosity.

Then, CMC-Na was added to pure water to prepare a CMC-Na aqueous solution (Step 2). After that, the prepared CMC-Na aqueous solution was added to Mixture 1 to form Mixture 2.

Subsequently, Mixture 2 was mixed in a mixer for 5 minutes several times (Step 3).

Then, SBR was added to pure water to prepare an SBR aqueous dispersion liquid (Step 4). After that, the SBR aqueous dispersion liquid was added to mixed Mixture 2 to form Mixture 3. Formed Mixture 3 was mixed in a mixer for 5 minutes (Step 5).

Then, pure water, which is a disperse medium, was added to Mixture 3 until it had a predetermined viscosity, and mixing was performed using a mixer for 5 minutes twice. Through the above steps, the slurry was formed.

Subsequently, the slurry was applied to a current collector with the use of a blade. As the current collector, 18-μm-thick rolled copper foil was used. The operating speed of the blade was set to 10 mm/sec.

Subsequently, the coated electrode was dried using a hot plate at 50° C. in an air atmosphere for 30 minutes, and then, further drying was performed at 100° C. under a reduced pressure for 10 hours.

Through the above steps, Electrodes A-2, C-2, and A-3 were fabricated.

A method for fabricating Electrode A-2-2 will be described below. The composition condition for Electrode A-2-2 is the same as that for Electrode A-2 as in Table 2, and the fabricating method of Electrode A-2-2 is slightly different from that of Electrode A-2. First, slurry was formed. Here, two kinds of electrodes with the same composition and different active material amounts were fabricated. The electrode with an active material amount of approximately 8 mg/cm$^2$ is Electrode A-2-2(a), and the electrode with an active material amount of approximately 9 mg/cm$^2$ is Electrode A-2-2(b).

In both the cases of Electrodes A-2-2(a) and A-2-2(b), mixing was performed with a planetary mixer. A container with a volume of 1.4 L was used for the mixing.

In both the cases of Electrodes A-2-2(a) and A-2-2(b), the active material was weighed and then carbon fiber powder and CMC-Na powder were added thereto.

Subsequently, water was added to the mixture and kneading was performed with a mixer for approximately 40 minutes to form a paste. The amount of water added here was 25 wt % of the total weight of the mixture in the case of Electrode A-2-2(a), and was 22 wt % in the case of Electrode A-2-2(b). Here, kneading means mixing something so that it has a high viscosity.

Subsequently, an SBR aqueous dispersion liquid was added to the mixture, water was further added, and mixing was performed with a mixer for 20 minutes.

Pure water serving as a dispersion medium was then added to the mixture until a predetermined viscosity was obtained, and mixing was performed with a mixer for 20 minutes.

Then, the pressure in the mixer containing this mixture was reduced and degasification was performed for 20 minutes. The pressure was adjusted such that a pressure difference from the atmospheric pressure was 0.096 MPa or less. Through the above steps, the slurry was formed.

Subsequently, the slurry was applied to a current collector with the use of a continuous coater. An 18-μm-thick rolled copper foil was used as the current collector. The coating rates of Electrodes A-2-2(a) and A-2-2(b) were 0.5 m/min. and 0.75 m/min., respectively.

Subsequently, the coated electrode was dried using a drying furnace. The drying was performed in an air atmosphere. Regarding the temperature and time for the drying of Electrode A-2-2(a), the electrode was dried at 50° C. for 180 seconds and then dried at 80° C. for 180 seconds. Regarding the temperature and time for foe drying of Electrode A-2-2(b), the electrode was dried at 50° C. for 120 seconds and then dried at 80° C. for 120 seconds.

After the drying in the drying furnace, further drying was performed at 100° C. under a reduced pressure for 10 hours.

Through the above steps, Electrode A-2-2 was formed.

Then, Electrodes A-4, C-4, D-4, and A-5 were fabricated. In the cases of Electrodes A-4, C-4, and D-4, graphite and PVDF were weighed such that each composition was obtained as in Table 2 and mixed, and NMP was added as a solvent to foe mixture to form slurry. In the case of Electrode A-5, graphite, carbon fiber, and PVDF were weighed such that the composition was obtained as in Table 2 and mixed, and NMP was added as a solvent to the mixture to form slurry.

Subsequently, a blade was used to apply the slurry to a current collector (18-μm-thick rolled copper foil), and then the solvent was volatilized by heat treatment. Consequently, Electrodes A-4, C-4, D-4, and A-5 were fabricated.

[ToF-SIMS Analysis]

Figure 21A:
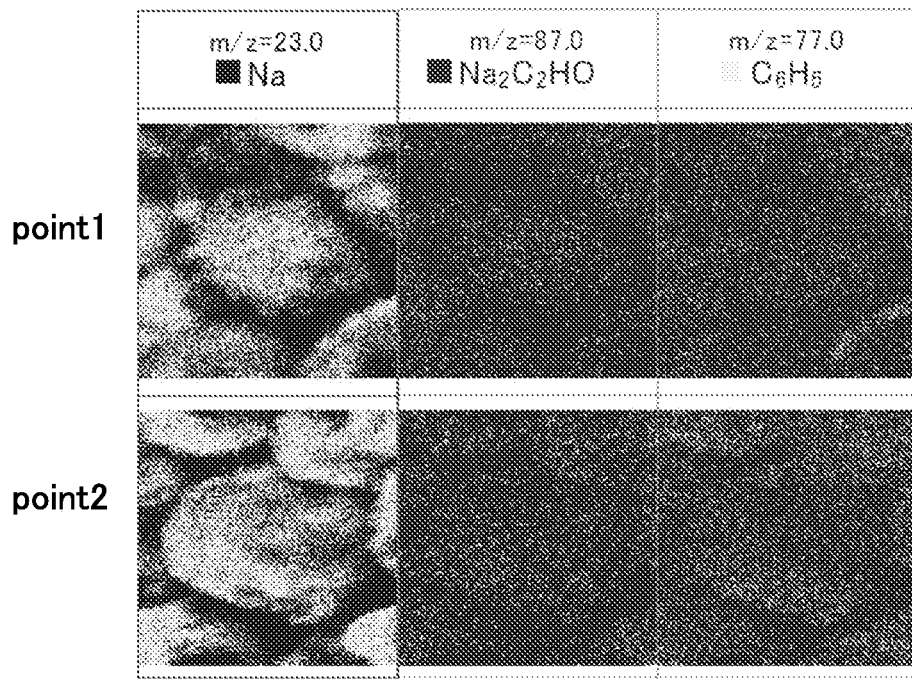
FIGS. 21A and 21B show ToF-SIMS analysis results of electrodes.
Figure 21B:
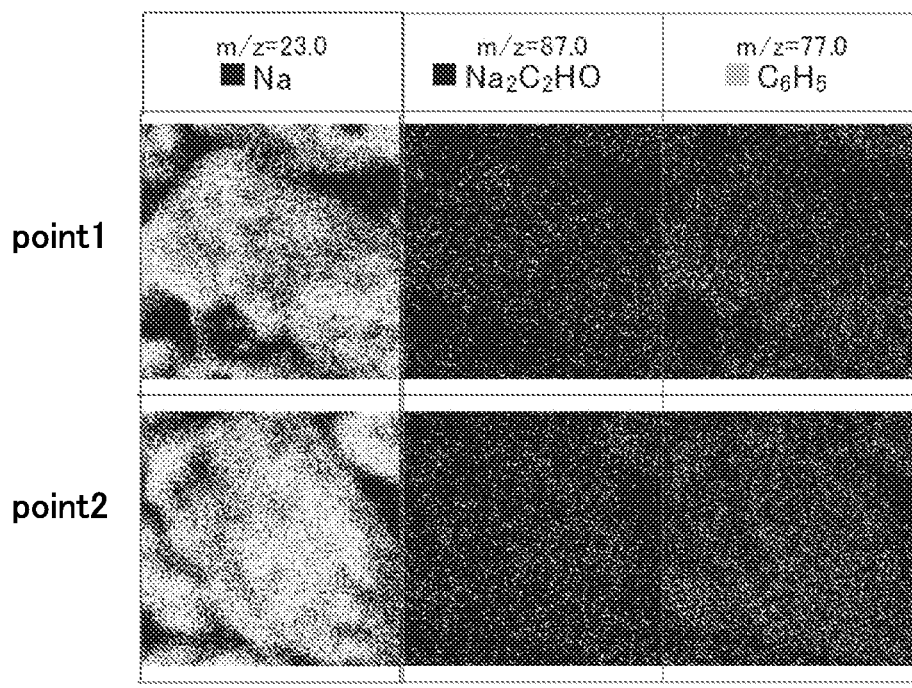

Next, Electrodes A-1 and C-1 among the fabricated electrodes were analyzed by time-of-flight secondary ion mass spectrometry (ToF-SIMS). FIGS. 21A and 21B show mapping measurement results of Na ions, $Na_2C_2HO$ ions, and $C_6H_5$ ions. FIG. 21A shows the analysis results of Electrode A-1, and FIG. 21B shows the analysis results of Electrode C-1. The observed regions are each 19.5 μm square.

As shown in FIGS. 21A and 21B, Na and $Na_2C_2HO$ that are presumably mainly attributed to CMC-Na are observed in an entire surface of graphite. In addition, $C_6H_5$ that is presumably mainly attributed to SBR is observed in the entire surface of graphite. These results suggest that CMC-Na and SBR are dispersed well and distributed in the surface of graphite.

[Cross-Sectional TEM Observation]

Figure 34A:
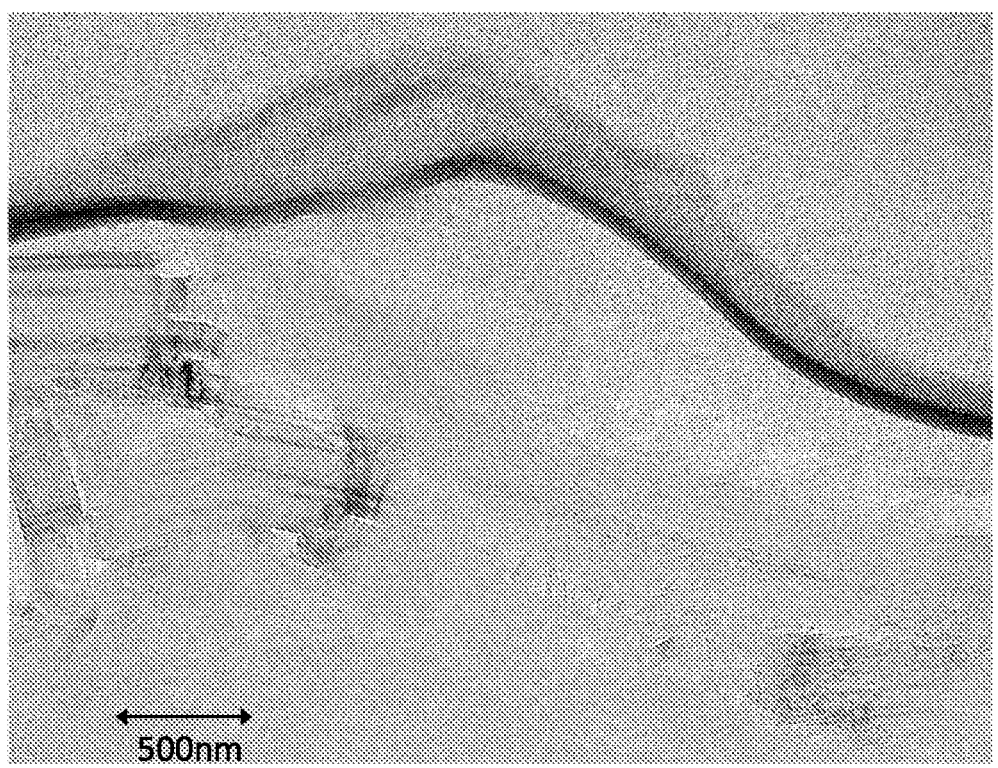
FIGS. 34A and 34B show cross-sectional TEM observation results of an electrode.
Figure 34B:
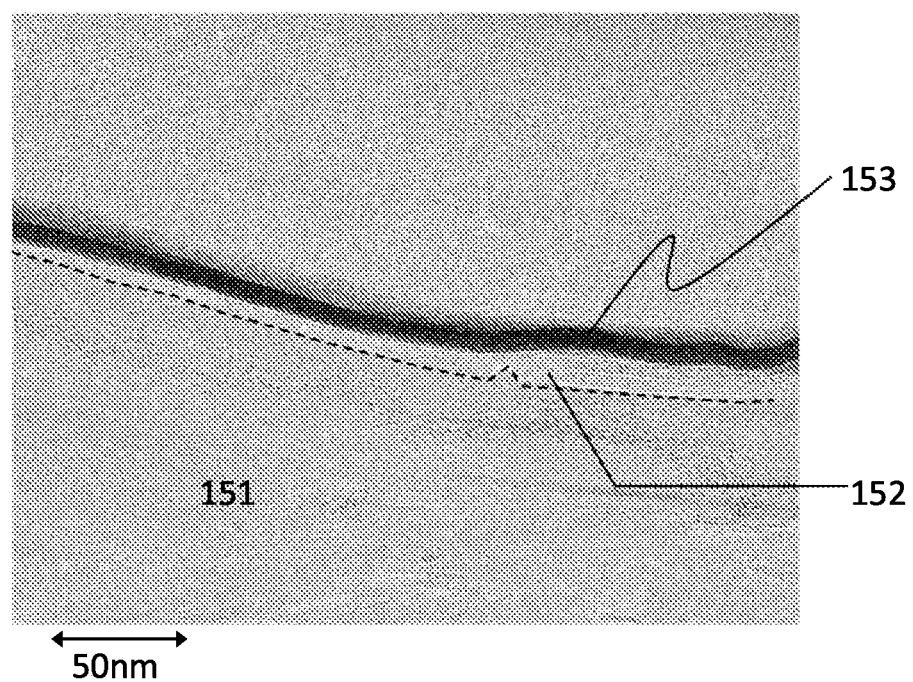

Next, Electrode A-1 was sliced using a focused ion beam system (FIB) and then a cross section thereof was observed with a transmission electron microscope (TEM). FIGS. 34A and 34B show TEM observation results. FIG. 34A shows an observed part of a cross section of an electrode, and FIG. 34B shows the part of the cross section of the electrode observed at higher magnification. As shown in FIG. 34B, graphite 151 is covered with a binder 152. The thickness of the binder 152 is estimated to be approximately greater than or equal to 4 nm and less than or equal to 13 nm. Note that a protective film 153 was formed over a surface of the electrode for easier observation.

Figure 22A:
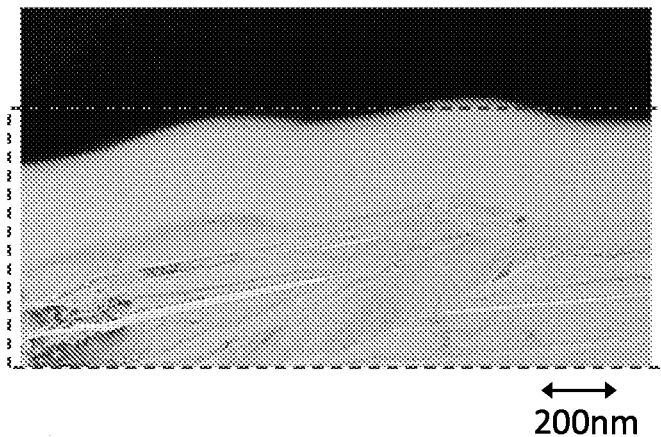
FIGS. 22A to 22C show cross-sectional TEM observation results of an electrode.
Figure 22B:
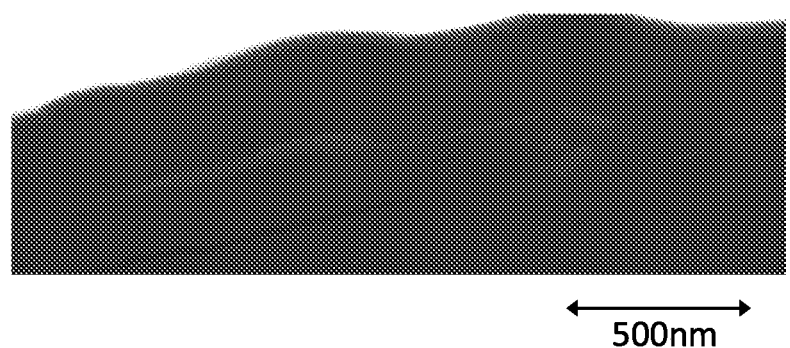
Figure 22C:
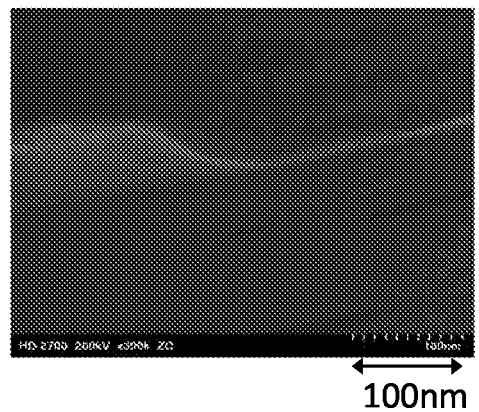

Next, vapor staining using osmium tetroxide was performed on Electrode G-1 to stain a double bond portion. After that, processing was performed using FIB and a cross section of the electrode was observed with TEM. FIGS. 22A to 22C show TEM observation results. FIG. 22A shows a STEM image. FIGS. 22B and 22C show Z contrast images. A film in contact with a surface of graphite was observed.

Figure 23A:
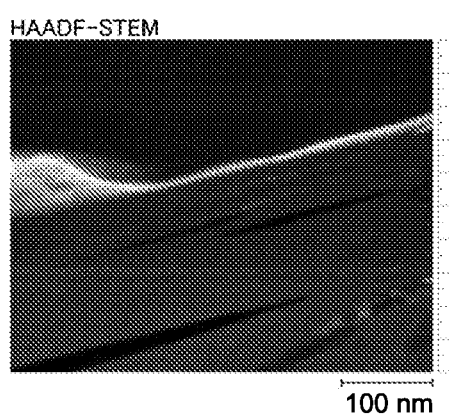
FIGS. 23A to 23D show a STEM observation result and EDX analysis results.
Figure 23B:
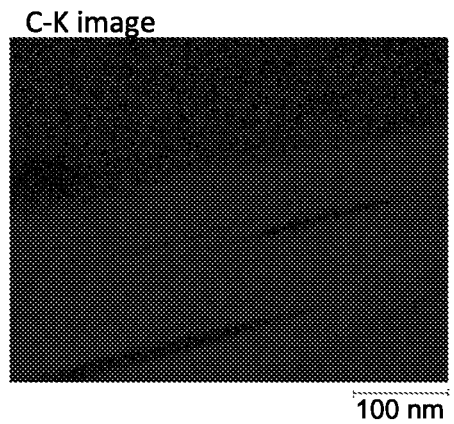
Figure 23C:
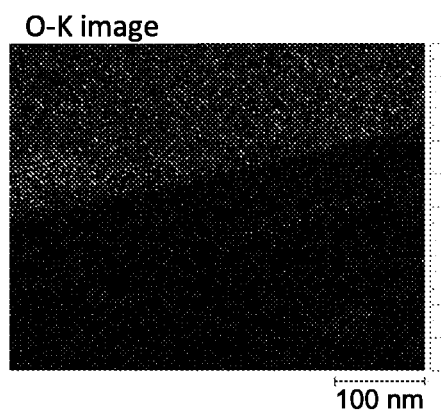
Figure 23D:
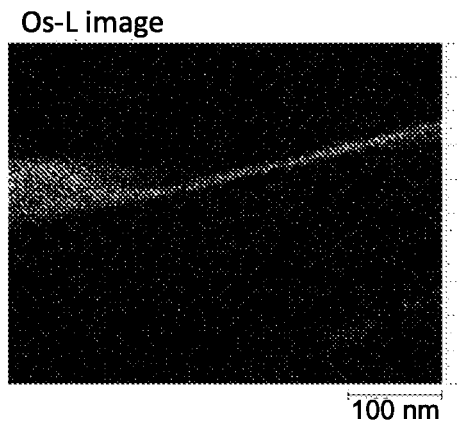

Next, FIG. 23A shows observation result obtained by high-angle annular dark field scanning transmission electron microscopy (HAADF-STEM), and FIGS. 23B to 23D show results obtained by performing element mapping analysis by TEM energy dispersive X-ray (EDX) spectroscopy. It is found that the film in contact with the surface of graphite contained Os. This indicates that the film had a double bond before being stained. The double bond is presumably attributed to SBR. Consequently, it is suggested that the film containing SBR was in contact with the surface of graphite.

Example 2

In this example, half cells were fabricated using the electrodes formed in Example 1, and the charge and discharge characteristics thereof were measured.

[Characteristics of Half Cells]

Each half cell was fabricated using the electrode formed in Example 1 and a lithium metal as a counter electrode. The characteristics were measured with the use of a CR2032 coin-type storage battery (with a diameter of 20 mm and a height of 212 mm). For a separator, a stack of polypropylene and GF/C, which is Whatman glass-fiber filter paper, was used. An electrolytic solution was formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 3:7. A positive electrode can and a negative electrode can were formed of stainless steel (SUS).

Next, the fabricated half cells were charged and discharged. The measurement temperature was 25° C. The conditions for charge and discharge in the first and second cycles are as follows. The discharge (Li intercalation) was performed in the following manner constant current discharge was performed at a rate of 0.1 C until the voltage decreased and reached 0.01 V, and then, constant voltage discharge was performed at 0.01 V until the current value decreased and reached a current value corresponding to 0.01 C. As the charge (Li deintercalation), constant current charge was performed at a rate of 0.1 C until the voltage increased and reached 1V.

Next, the constant current discharge rate in discharge (Li intercalation) was changed for each cycle in the third and later cycles, and the dependence on the rate was examined. Specifically, the discharge rate characteristics of 0.2 C, 0.3 C, 0.4 C, and 0.5 C were examined. In addition, in each cycle, constant current discharge was performed and then constant voltage discharge was performed at 0.01 V under the condition that the lower current limit was a current value of 0.01 C. Note that the conditions for charge (Li deintercalation) are the same as those for the first and second cycles. The rate for charge (Li deintercalation) in the third and later cycles was 0.2 C.

Table 3 shows charge capacity with respect to discharge capacity in the first cycle as initial charge and discharge efficiency (charge capacity÷discharge capacity×100[%]). Note that the active material amounts and the densities shown in Table 3 indicate the actually measured characteristics of the half cells. One electrode with two values of the active material amounts means that electrodes with the same composition and different active material amounts were fabricated.

TABLE 3

| | Active material amount [mg/cm$^2$] | Electrode density [g/cm$^3$] | Series | Initial charge and discharge efficiency [%] |
|---|---|---|---|---|
| Electrode A-1 | 9.7 | 1.3 | Series 1 | 97.4 |
| | 6.1 | 1.2 | Series 1 | 97.3 |
| Electrode B-1 | 10.5 | 1.1 | Series 1 | 96.7 |
| Electrode C-1 | 4.2 | 0.8 | Series 1 | 94.8 |
| Electrode D-1 | 5.8 | 0.9 | Series 1 | 91.4 |
| Electrode E-1 | 4.9 | 0.8 | — | 92.8 |
| Electrode E-2 | 7.3 | 0.9 | — | 91.6 |
| Electrode F-1 | 7.1 | 0.9 | — | 92.9 |
| Electrode G-1 | 7.9 | 0.9 | — | 92.7 |
| Electrode A-2 | 4.6 | 1.3 | Series 2 | 96.9 |
| | 5.7 | 1.1 | Series 2 | 97.1 |
| Electrode A-2-2 | 8.1 | 1.2 | Series 2 | 96.9 |
| Electrode C-2 | 5.0 | 0.9 | Series 2 | 94.2 |
| Electrode A-3 | 6.1 | 0.8 | — | 96.1 |
| Electrode A-4 | 6.8 | 1.2 | Series 3 | 95.6 |
| Electrode C-4 | 8.0 | 0.9 | Series 3 | 92.9 |
| Electrode D-4 | 7.5 | 1.0 | Series 3 | 88.6 |
| Electrode A-5 | 5.4 | 1.1 | Series 4 | 90.5 |

Figure 24A:
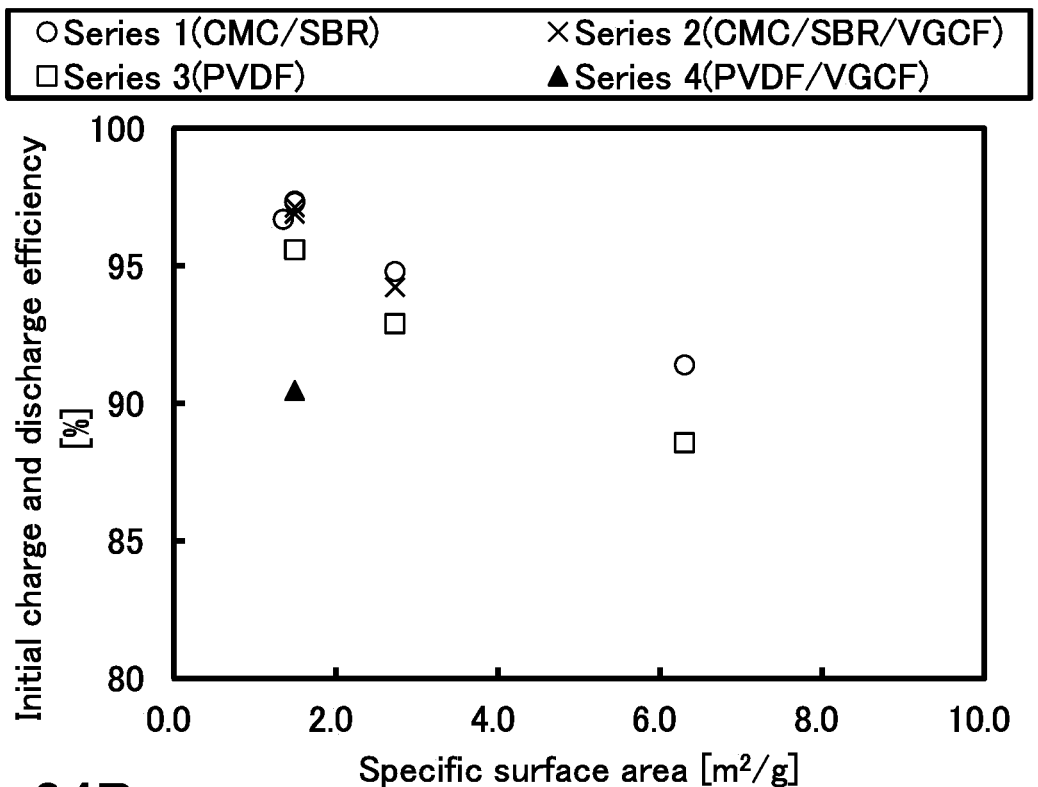
FIGS. 24A and 24B are graphs each showing charge and discharge efficiency.
Figure 24B:
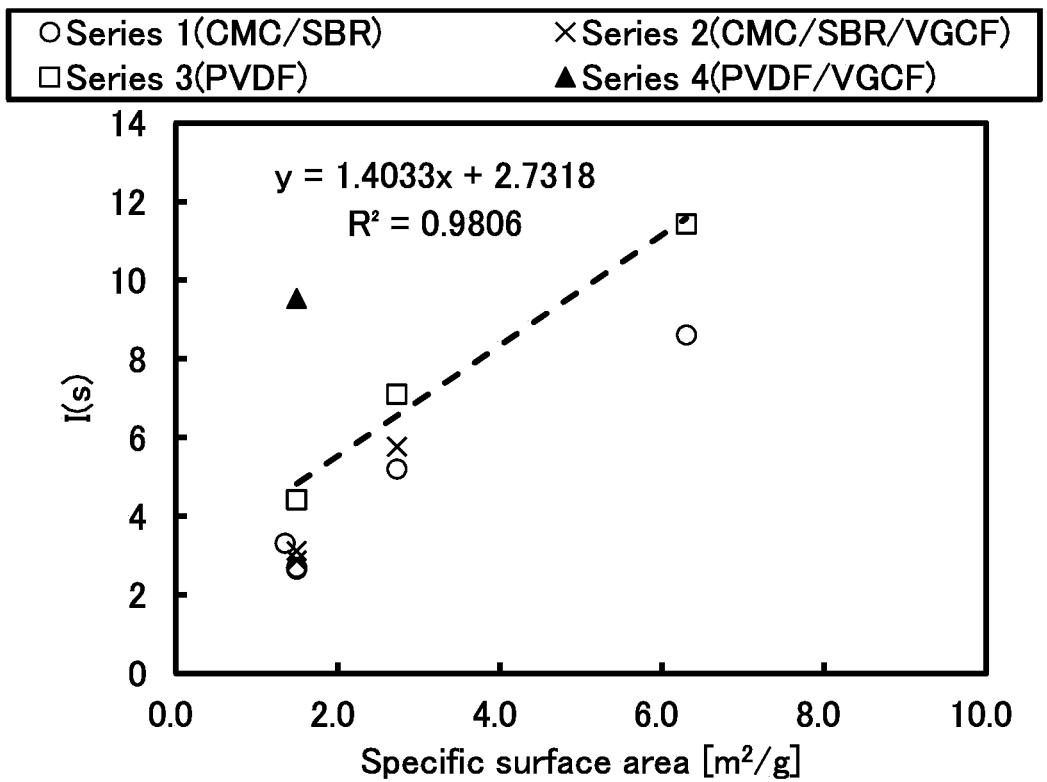

As shown in Table 3, the smaller the specific surface area of graphite is, the higher the initial charge and discharge efficiency is. In the case where CMC-Na and SBR were used as binders, the initial charge and discharge efficiency was higher than that in the case where PVDF was used as a binder. FIG. 24A shows a graph where the specific surface area of graphite and initial charge and discharge efficiency are plotted on the horizontal axis and the vertical axis, respectively. Here, when discharge capacity is $C_d$ and charge capacity is $C_c$, I(a) is defined by Mathematical Formula 10. FIG. 24B shows a graph where I(s) and the specific surface area S [m$^2$/g] are plotted on the horizontal axis and the vertical axis, respectively. Here, discharge capacity refers to capacity in Li intercalation, and charge capacity refers to capacity in Li deintercalation. Series 1 to 4 are the same as those in Table 2.

$$I(s) = \frac{Cd - Cc}{Cd} \times 100 \qquad \text{[Mathematical Formula 10]}$$

FIG. 24B shows an approximate curve regarding I(s:Series 3) of Series 3, that is, the condition where PVDF was used as a binder and carbon fiber was not added. When the specific surface area is S [m$^2$/g], the approximate curve can be expressed by Mathematical Formula 11.

$$I(s\text{:Series3}) = 1.4033 \times S + 2.7318 \qquad \text{[Mathematical Formula 11]}$$

In contrast, I(s) of Series 1, that is, the condition where CMC-Na and SBR were used as binders was lower than that of Series 3. Here, by aligning I(g)=5.2 when Graphite C with a specific surface area of 2.73 m$^2$/g to I(s) in Mathematical Formula 11 when PVDF was used, S is calculated to be 1.76.

That is to say, when CMC-Na and SBR are used as binders, for example, the effectual specific surface area in charge and discharge corresponds to 1.76 m$^2$/g. This means that, for example, a specific surface area of 2.73−1.76=0.97 m$^2$/g is presumably covered when CMC-Na and SBR are used as binders.

Similarly, I(s) of Series 3 when Graphite D with a specific surface area of 6.30 m$^2$/g was used is 8.6. Here, by assigning 8.6 to I(s) in Mathematical Formula 11 when PVDF was used, x is calculated to be 4.18. This means that, for example, a specific surface area of 6.30−4.18=2.12 m$^2$/g is presumably covered when CMC-Na and SBR are used as binders.

According to the above results, in the case where the weight of CMC-Na and the weight of SBR are respectively 1 wt % and 2 wt % of the sum of the weights of graphite, CMC-Na, and SBR, I(s) that corresponds to the state where a surface corresponding to a specific surface area of 0.9 m$^2$/g to 2.2 m$^2$/g is covered is estimated to be decreased.

Next, the electrodes using carbon fiber as conductive additives were examined. In the case of using PVDF as the binder and Graphite A with a specific surface area of 1.49 m$^2$/g, irreversible capacity was 9.5%. In contrast, in the case of using CMC-Na and SBR as binders and Graphite A with a specific surface area of 1.49 m$^2$/g, irreversible capacity was 3.0%, which is approximately equal to that when carbon fiber was not used. These results imply that when CMC-Na and SBR were used as binders, not only graphite but a surface of carbon fiber was possibly efficiently covered, inhibiting the decomposition or the like of the electrolytic solution at the surface of carbon fiber.

Next, the charge and discharge curves of the electrode using carbon fiber as the conductive additive and the electrode using carbon fiber and AB as the conductive additive are shown. FIGS. 25A1 to 23C2 show the charge and discharge curves of the half cells using Electrodes A-1, A-2, and A-3. The discharge curves are the curve when the initial discharge rate was 0.1 C and the curve when the discharge rate was 0.3 C. The charge curve is the curve when the initial discharge rate was 0.1 C.

FIGS. 25A1 and 25A2 show the characteristics of the half cell using Electrode A-2 with an active material amount of 5.1 mg/cm$^2$ and the characteristics of the half cell using Electrode A-2 with an active material amount of 6.3 mg/cm$^2$, respectively. FIGS. 25B1 and 25B2 show the characteristics of the half cell using Electrode A-3 with an active material amount of 5.6 mg/cm$^2$ and the characteristics of the half cell using Electrode A-3 with an active material amount of 6.5 mg/cm$^2$, respectively. FIGS. 25C1 and 25C2 show the characteristics of the half cell using Electrode A-1 with an active material amount of 6.0 mg/cm$^2$ and the characteristics of the half cell using Electrode A-1 with an active material amount of 6.1 mg/cm$^2$, respectively.

It is found from the discharge (Li intercalation) curves in FIGS. 25A1 to 25C2 that a voltage drop of the half cell using the electrode containing carbon fiber and the half cell using the electrode containing carbon fiber and AB is smaller in the case of 0.3 C than in the case of 0.1 C. Thus, the use of carbon fiber or carbon fiber and AB enabled fabrication of a favorable electrode with high electric conductivity and low resistance.

Example 3

In this example, thin storage batteries were fabricated using the electrodes formed in Example 1 for a negative electrode and the cycle characteristics thereof were measured.

Table 4 shows the conditions of the fabricated storage batteries.

TABLE 4

| | Negative electrode | Positive electrode | Positive electrode reduction | Electrolytic solution | Capacity ratio [%] |
|---|---|---|---|---|---|
| Cell M | Electrode A-2 | Positive electrode A | Thermal reduction | Electrolytic solution A | 70.3 |
| Cell N | Electrode C-2 | Positive electrode A | Thermal reduction | Electrolytic solution B | 69.6 |
| Cell O | Electrode C-2 | Positive electrode A | Thermal reduction | Electrolytic solution A | 70.8 |
| Cell P | Electrode C-2 | Positive electrode B | Chemical reduction and thermal reduction | Electrolytic solution A | 71.7 |
| Cell Q | Electrode C-2 | Positive electrode A | Chemical reduction and thermal reduction | Electrolytic solution A | 66.0 |
| Cell R | Electrode A-1 | Positive electrode A | Thermal reduction | Electrolytic solution B | 39.4 |
| Cell R' | Electrode A-1 | Positive electrode A | Thermal reduction | Electrolytic solution B | 40.6 |
| Cell S | Electrode A-5 | Positive electrode B | Chemical reduction | Electrolytic solution B | 62.2 |
| Cell T | Electrode A-2 | Positive electrode C | Not performed | Electrolytic solution A | 54.2 |

[Fabrication of Positive Electrode]

As positive electrodes, Positive Electrodes A to D were used. Electrode slurry for Positive Electrode A was formed using NMP as a solvent and carbon-coated LiFePO$_4$ (hereinafter referred to as C/LiFePO$_4$), graphene oxide, and PVDF (C/LiFePO$_4$:graphene oxide:PVDF=94.2:0.8:5.0 (wt %)). The specific surface area of C/LiFePO$_4$ used was approximately 25 m$^2$/g. Electrode slurry for Positive Electrode B was formed using NMP as a solvent and LiFePO$_4$, graphene oxide, and PVDF (LiFePO$_4$:graphene oxide:PVDF=94.4:0.6:5.0 (wt %)). The specific surface area of LiFePO$_4$ used was approximately 9 m$^2$/g. Electrode slurry for Positive Electrode C was formed using NMP as a solvent and LiCoO$_2$ with an average particle size of 6.8 μm, AB, and PVDF (LiCoO$_2$:AB:PVDF=85.0:8.0:7.0 (wt %)).

The slurries for Positive Electrodes A and B were each applied to an aluminum current collector (with a thickness of 20 μm) subjected to undercoating in advance and then were volatilized by heat treatment. The slurry for Positive Electrode A was applied at 0.5 m/s, and the slurry for Positive Electrode B was applied at 1 m/s. Heat treatment for Positive Electrode A was performed in such a manner that heating was performed at 80° C. for 2 minutes and then another heating was performed at 120° C. for 4 minutes. Heat treatment for Positive Electrode B was performed in such a manner that heating was performed at 80° C. under atmospheric pressure for 4 minutes. After that, reduction was performed by three conditions of "thermal reduction", "chemical reduction and thermal reduction", and "chemical reduction".

"Thermal reduction" was performed at 170° C. under a reduced pressure (in vacuum) for 10 hours.

In the case of "chemical reduction", graphene oxide was reduced by reaction in a solvent containing a reducing agent. The reduction treatment was performed at 60° C. for 4.5 hours. Ascorbic acid was used as the reducing agent. As the solvent, ethanol was used. The concentration of the reducing agent was 13.5 g/L. After that, washing with ethanol was performed, and drying was performed at 70° C. for 10 hours. The drying was performed in a vacuum atmosphere.

In the case of "chemical reduction and thermal reduction", chemical reduction was first performed, followed by thermal reduction. First, conditions for chemical reduction will be described. A solution used for the reduction was prepared as follows: a solvent in which NMP and water were mixed at 9:1 was used, and ascorbic acid and LiOH were added to the solvent to have a concentration of 77 mmol/L and 73 mmol/L, respectively. The reduction treatment was performed at 60° C. for 1 hour. After that, washing with ethanol was performed, and drying was performed in an air atmosphere at room temperature. The drying was performed in a vacuum atmosphere. Next, conditions for thermal reduction will be described. After the chemical reduction, the thermal reduction was performed. The thermal reduction was performed at 170° C. under a reduced pressure for 10 hours.

Subsequently, the positive electrode active material layer was pressed by a roll press method so as to be consolidated.

Positive Electrodes C and D were each also fabricated in such a manner that a formed paste was applied to an aluminum current collector (with a thickness of 20 μm) subjected to undercoating in advance and drying was performed. Graphene oxide was not used for Positive Electrodes C and D; thus, reduction treatment was not performed.

Next, capacity values used for calculation of the ratio R of positive electrode capacity to negative electrode capacity will be described. In calculating positive electrode capacity, 170 mAh/g and 137 mAh/g were used as the capacity of LiFePO$_4$ and the capacity of LiCoO$_2$, respectively. In calculating negative electrode capacity, 372 mAh/g was used as the capacity of graphite.

[Fabrication of Storage Batteries]

Next, single-layer thin storage batteries were fabricated using the formed positive and negative electrodes. An aluminum film covered with a heat sealing resin was used as an exterior body. In each storage battery, the area of the positive electrode was 20.3 cm$^3$ and the area of the negative electrode was 23.8 cm$^2$. As each separator, 25-μm-thick polypropylene (PP) was used.

Electrolytic Solutions A and B were used as electrolytic solutions. Here, Electrolytic Solution A was formed in such a manner that an additive such as VC was added to a solvent mainly containing EC, DEC, and ethyl methyl carbonate (EMC). In Electrolytic Solution A, lithium hexafluorophosphate (LiPF$_6$) was dissolved at approximately 1.2 mol/L.

Electrolytic Solution B was formed in such a manner that VC as an additive was added at 1 wt % to a solvent mainly containing EC and EMC. In Electrolytic Solution B, lithium hexafluorophosphate (LiPF$_6$) was dissolved at approximately 1 mol/L.

Next, the fabricated storage batteries were subjected to aging. Note that rates woe calculated using 170 mAh/g as a standard in the case of using LiFePO$_4$ as the positive electrode and 137 mAh/g as a standard in the case of using LiCoO$_2$ as the positive electrode. Cells R, R', and S were charged at 0.01 C at 25° C. until the voltage increased and reached 3.2 V, and then degasification and resealing were performed. After that, the cells were charged at 0.1 C at 25°

C. until the voltage increased and reached 4 V, and then discharged until the voltage decreased and reached 2 V. Cells M, N, O, P, and Q were charged at 0.01 C at 25° C. until the voltage increased and reached 3.2 V, and then degasification and resealing were performed. Subsequently, the cells were charged at 0.1 C at 25° C. until the voltage increased and reached 4 V, stored at 40° C. for 24 hours, and then discharged at 25° C. until the voltage decreased and reached 2 V. After that, the cells were charged and discharged at 0.2 C twice. Cell T was charged at 0.01 C at 25° C. until power of 10 mAh/g was stored, and then degasification and resealing were performed. Subsequently, the cells were charged at 25° C. The charge was performed by CCCV, specifically, in such a manner that a voltage was applied at a constant current of 0.05 C until the voltage increased and reached 4.2 V and then a constant voltage of 4.2 V was maintained until the current value reached 0.01 C. After that, the cells were stored at 40° C. for 24 hours, discharged at 25° C. until the voltage decreased and reached 2 V, and charged and discharged at 0.2 C twice.

Next, the cycle characteristics of the fabricated thin storage batteries were measured. Initial charge and discharge were performed at a constant current of 0.2 C. Then, charge and discharge at a constant current of 0.5 C were repeated for a cycle test. The upper voltage limit and the lower voltage limit of Cell T were 4.2 V and 2.5 V, respectively. The upper voltage limit and the lower voltage limit of the other storage batteries were 4.0 V and 2 V, respectively. The measurement temperature was 60° C. Charge and discharge were performed at 0.2 C in the 202th cycle and every 200 cycles after the 202th cycle.

Figure 26A:
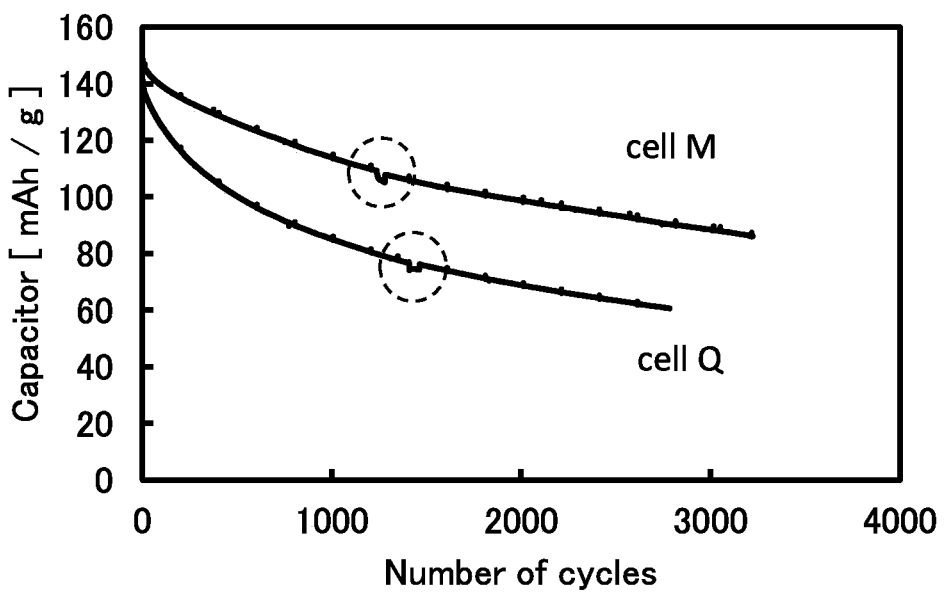
FIGS. 26A and 26B are graphs each showing the relation between charge and discharge cycles and discharge capacity.
Figure 26B:
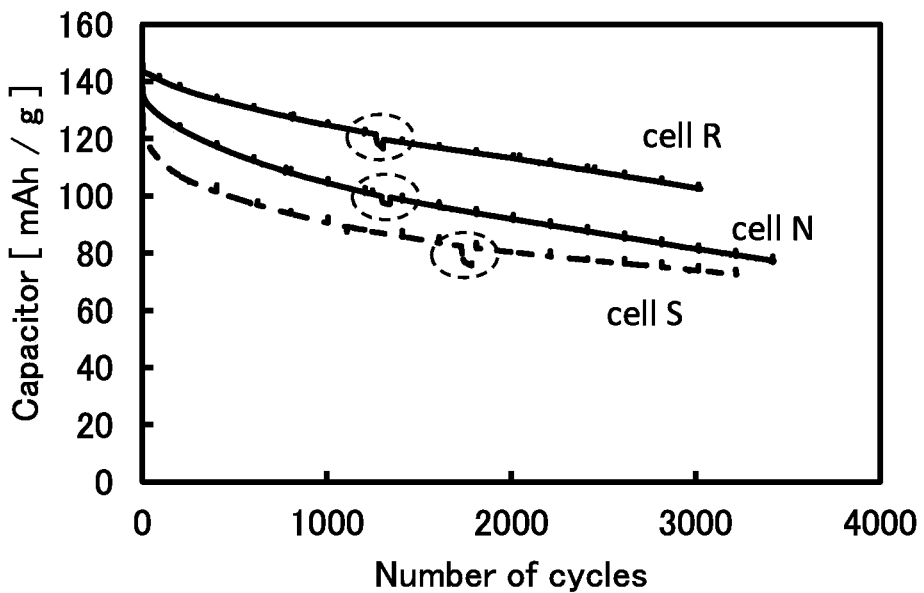
Figure 27:
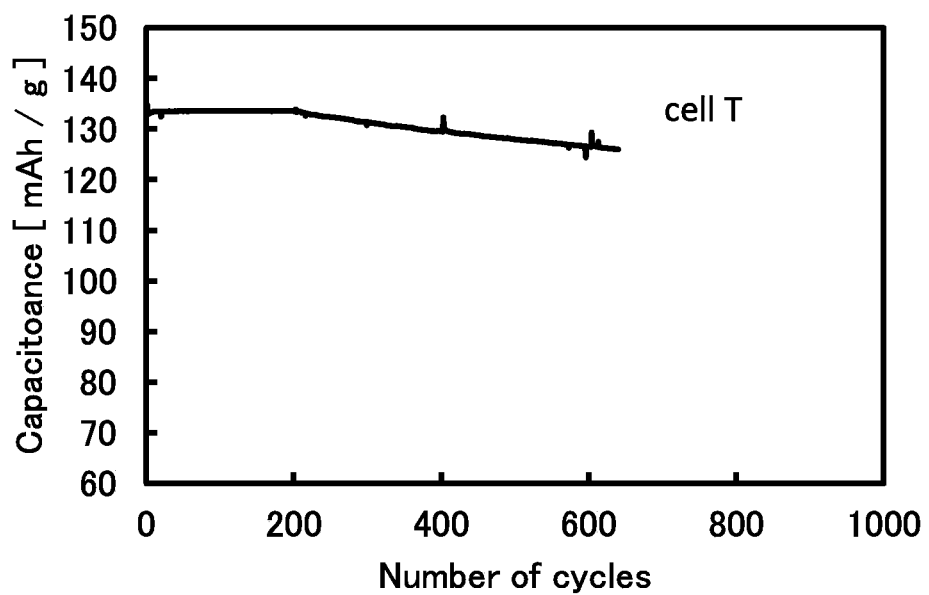
FIG. 27 is a graph showing the relation between charge and discharge cycles and discharge capacity.

FIGS. 26A and 26B and FIG. 27 are graphs where changes in capacity with increasing number of cycles are plotted. Table 3 shows discharge capacity in the second cycle, discharge capacity in the 300th cycle, and the values each obtained by dividing discharge capacity in the 300th cycle by discharge capacity in the second cycle (C[300]/C[2]). Here, the capacity of each storage battery per unit weight of the positive electrode active material was calculated. Each storage battery was put in a thermostatic bath where the temperature was controlled to be 60° C., and the cycle characteristics thereof were measured. As shown in FIGS. 26A and 26B and FIG. 27, all the cells have favorable cycle characteristics. Furthermore, as shown in FIGS. 26A and 26B, all the cells are highly reliable storage batteries that can be subjected to approximately 3000 charge and discharge cycles. Here, as shown in FIGS. 26A and 26B, the capacities of Cells M, Q, R, N, and S decrease sharply in portions surrounded by broken lines compared to other portions where changes are gradual. Periods when the capacities decrease sharply correspond to periods when interruption of power for the thermostatic bath occurs and the temperature decreases to approximately room temperature. Then, the power for the thermostatic bath was turned on again, and accordingly, the capacities increased. After that, the capacities gradually decreased again. In the long view, it can be said that the periods when the temperature decreases cause almost no adverse effect

TABLE 5

|  | C[2]: Discharge capacity in the second cycle [mAh/g] | C[500]: Discharge capacity in the 500th cycle [mAh/g] | C[500]/C[2] |
|---|---|---|---|
| Cell M | 147 | 126 | 0.86 |
| Cell N | 136 | 115 | 0.85 |
| Cell O | 139 | 98 | 0.71 |
| Cell P | 140 | 99 | 0.71 |
| Cell Q | 139 | 99 | 0.71 |
| Cell R | 142 | 132 | 0.93 |
| Cell R' | 145 | 131 | 0.91 |
| Cell S | 125 | 99 | 0.79 |
| Cell T | 133 | 128 | 0.96 |

The cell including the negative electrodes using CMC-Na and SBR as binders has more favorable cycle characteristics than the cell including the negative electrode using PVDF. The smaller the specific surface area of graphite is, the more excellent the cycle characteristics are. Furthermore, when the specific surface area of graphite is small, the degradation of the characteristics with increasing number of charge and discharge cycles can be inhibited even in the case of using PVDF as a binder.

First, the results of Cells N and S are considered. The ratios R of positive electrode capacity to negative electrode capacity are substantially equal to each other. The specific surface areas of Graphite A used for Cell S and Graphite C used for Cell N were 1.49 $m^2/g$ and 2.73 $m^2/g$, respectively. Here, assuming that in the case of using CMC-Na and SBR as binders as considered in Example 2, a specific surface area of approximately 1 $m^2/g$ of Graphite C is covered, that is, the characteristics similar to those of graphite with a specific surface area of approximately 1.73 $m^2/g$ can be obtained, the characteristics of Cell N are presumably lower than those of Cell S unless the effects of carbon fiber and aging or the like are considered. The characteristics of Cell N is actually better than those of Cell S, which suggests that the effect of covering carbon fiber with CMC-Na and SBR and the aging effect are obtained, for example.

Next, the results of Cells R and N are considered. The ratio R of the positive electrode capacity to the negative electrode capacity of Cell R is lower than that of Cell N. Here, for example, when the ratio R of positive electrode capacity to negative electrode capacity is ½, the negative electrode capacity is twice the positive electrode capacity.

Here, the doubled active material amount means a reduction in depth of charge and discharge of graphite by half and means doubled specific surface area of graphite.

The reduction in depth of charge and discharge of graphite leads to a decrease in volume change due to expansion and contraction, so that, for example, a coating film formed in initial charge is less likely to be damaged and is not necessarily formed again. The loss of charge is thus probably small and a reduction in capacity can be inhibited. Furthermore, the loss of a conductive path of the electrode due to expansion and contraction can be presumably inhibited. This leads to inhibition of a decrease in capacity with increasing number of charge and discharge cycles.

Here, the characteristics of Cell R are compared with those of Cell N. The ratio R of the positive electrode capacity to the negative electrode opacity of Cell R is 0.57 times that of Cell N, and the amount of graphite in Cell R is 1.77 times (=1÷0.37) that in Cell N. The specific surface area of graphite in Cell R is approximately 0.33 times that in Cell R (note that carbon fiber is not in consideration). The equation 1.77×0.33=0.97 is satisfied; therefore, a decrease in capacity of Cell R is estimated to be approximately equal to that of Cell N if a reduction in capacity dominantly depends on only the specific surface area. A decrease in capacity of Cell R, however, is actually significantly small.

These suggest that the depth of charge and discharge of graphite is also a parameter that considerably affects the cycle characteristics.

Figure 28A:
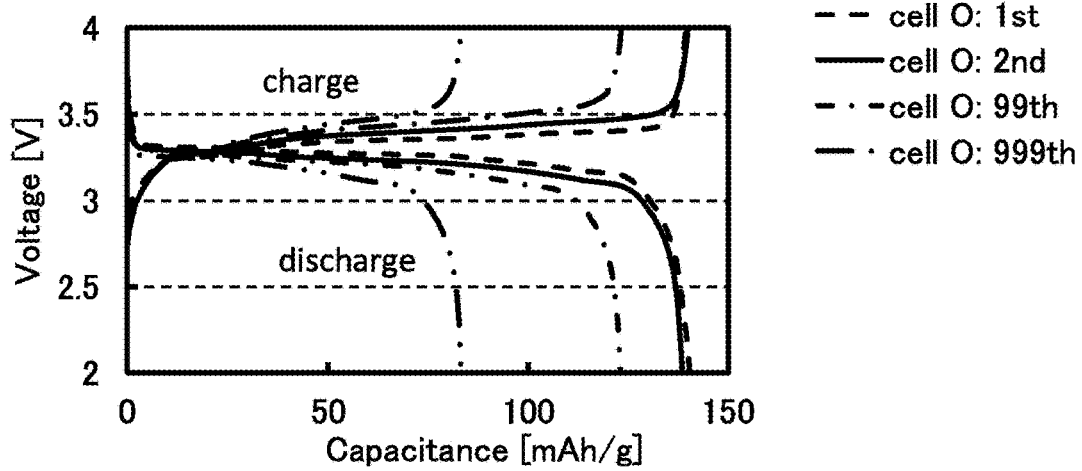
FIGS. 28A to 28C are graphs each showing charge and discharge characteristics.
Figure 28B:
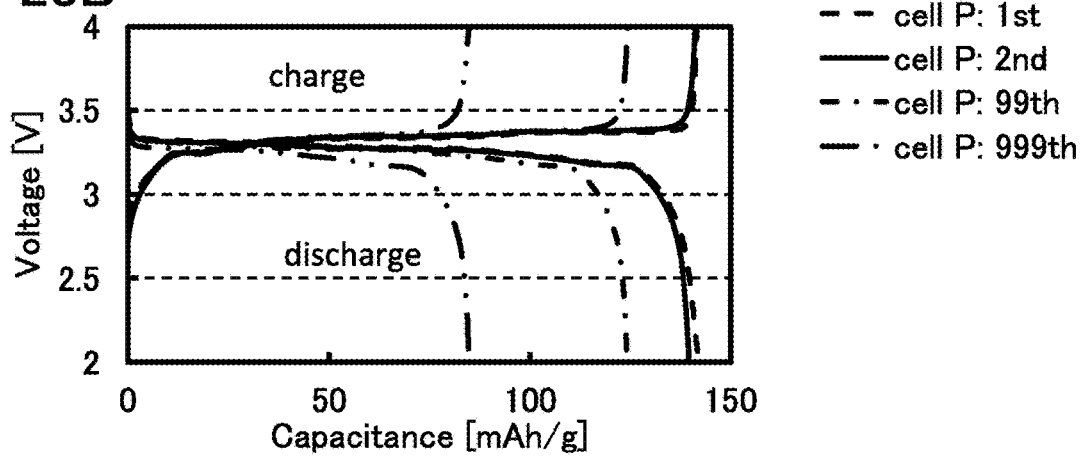
Figure 28C:
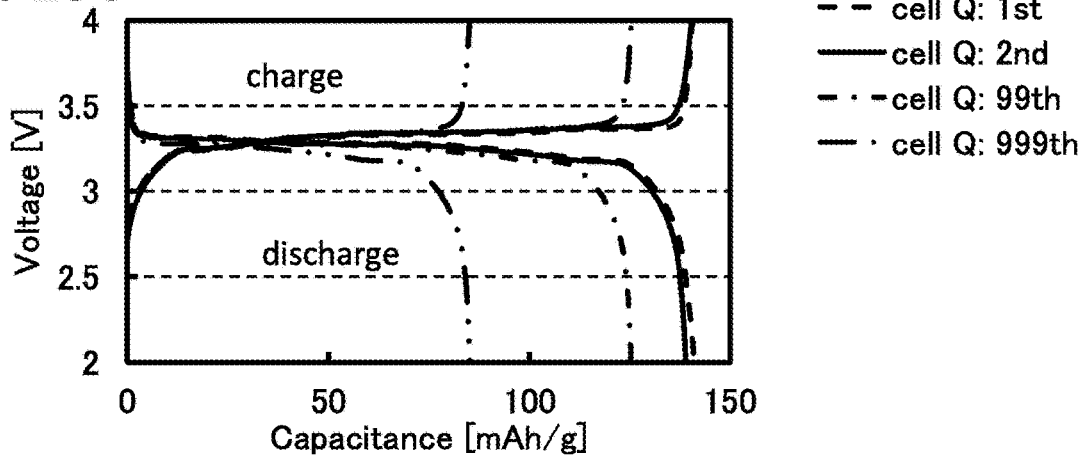
Figure 29:
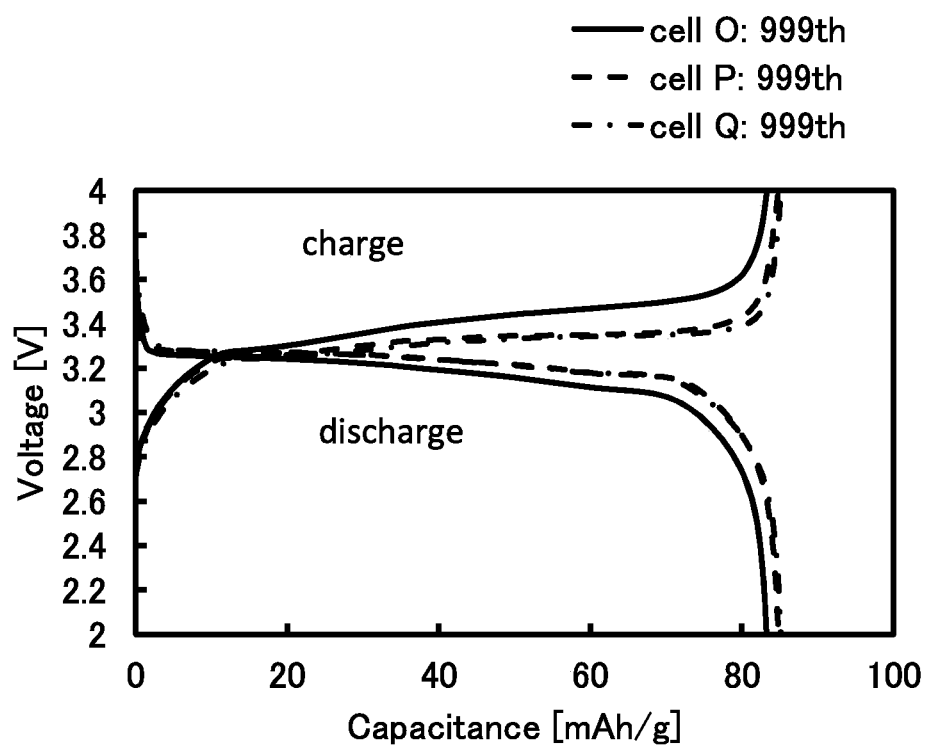
FIG. 29 is a graph showing charge and discharge characteristics.

Next, reducing methods of the positive electrodes, the charge and discharge characteristics, and the cycle characteristics will be described. FIGS. 28A to 28C show the initial, second, 99th, and 999th charge and discharge characteristics of Cells O, P, and Q. FIG. 29 shows a graph where the 999th charge and discharge characteristics of the cells are compared.

The gradient of a plateau region (flat potential region) in charge and discharge is smaller in the cases of Cells P and Q (the cells subjected to "chemical reduction and thermal reduction") than in the case of Cell O (the cell subjected to only "thermal reduction"). Thus, the positive electrodes of Cells P and Q presumably have lower resistance and are more favorable than that of Cell O.

FIG. 27 shows the cycle characteristics of the storage battery using $LiCoO_2$ for the positive electrode. Like in the case of using $LiFePO_4$ for the positive electrode, favorable cycle characteristics were obtained by using Graphite A with a small surface area. Furthermore, in the case of using $LiCoO_2$ for a positive electrode, the true density is high, which increases capacity per unit volume. That is, the occupied volume of the storage battery can be small.

[Cross-Sectional TEM Observation and EELS Analysis]

Here, Cell R' was subjected to 691 cycles of charge and discharge and then disassembled, and its electrode was observed with TEM. The discharge capacity in the 691th cycle was 128.4 mAh/g. Note that the disassembly of the cell, introduction to an FIB apparatus, and introduction to the TEM were performed in an inert atmosphere.

Figure 30A:
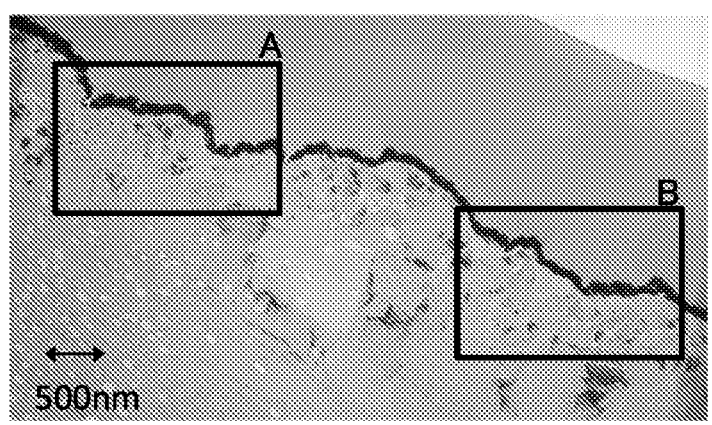
FIGS. 30A to 30C show cross-sectional TEM observation results of an electrode.
Figure 30B:
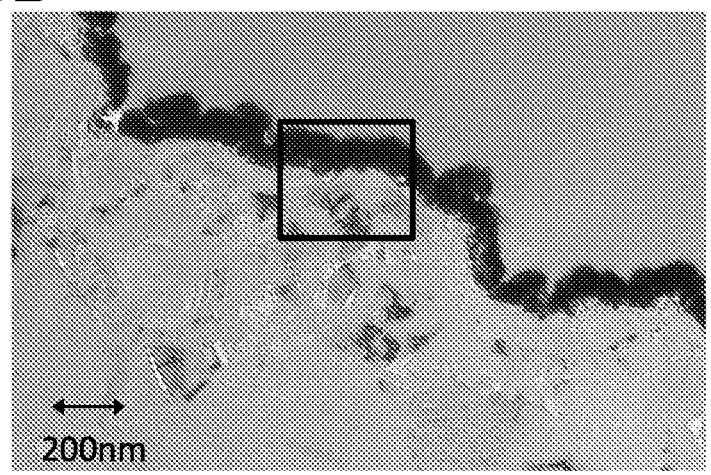
Figure 30C:
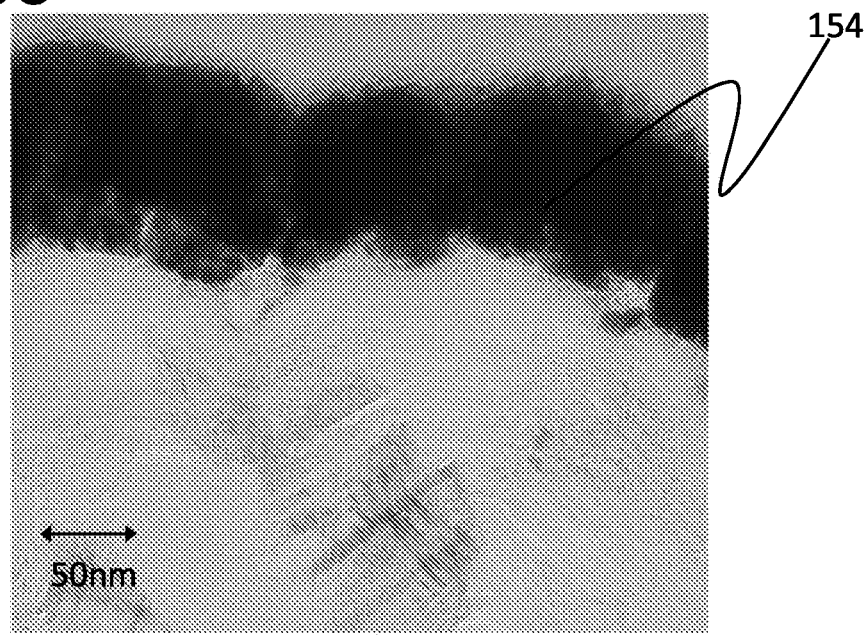
Figure 31A:
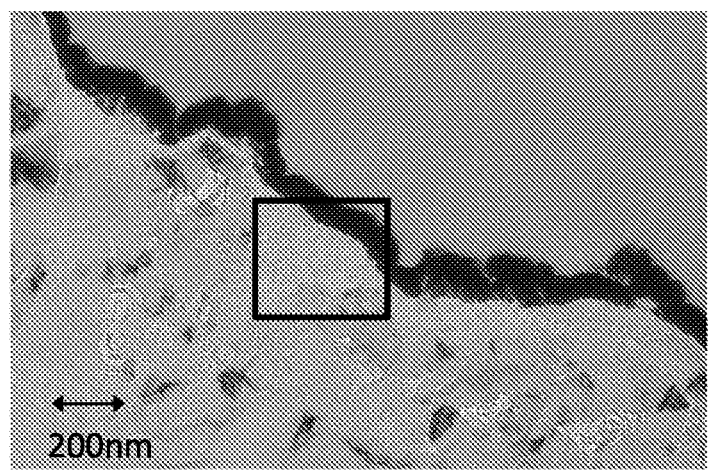
FIGS. 31A and 31B show cross-sectional TEM observation results of the electrode.
Figure 31B:
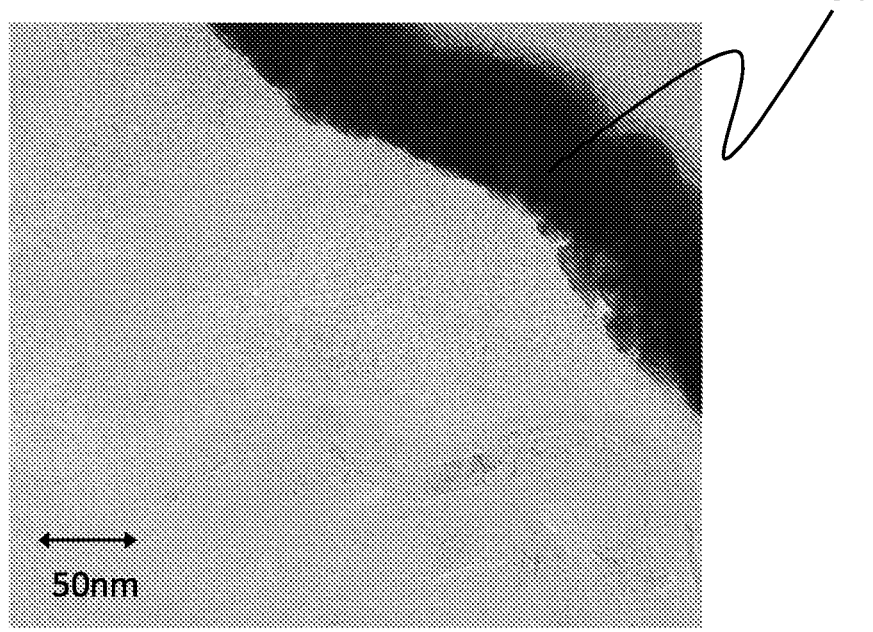

FIGS. 30A to 30C and FIGS. 31A and 31B show observation results. Region A and Region B each surrounded by a rectangle in FIG. 30A are enlarged for further observation. FIGS. 30B and 30C are enlarged views of Region A. FIGS. 31A and 31B are enlarged views of Region B. A protective film 154 was formed for easier observation.

Figure 32A:
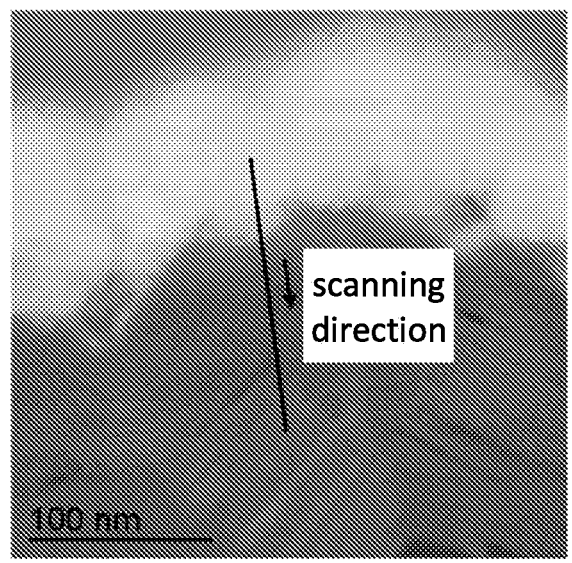
FIGS. 32A to 32C show EELS analysis results of the electrode.
Figure 32B:
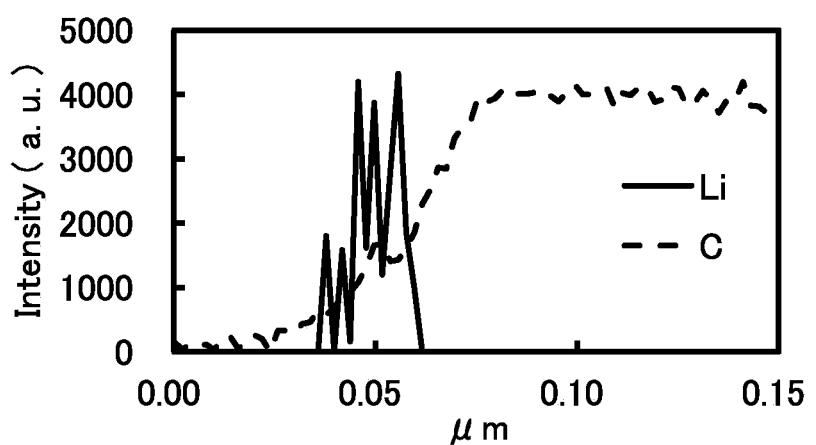
Figure 32C:
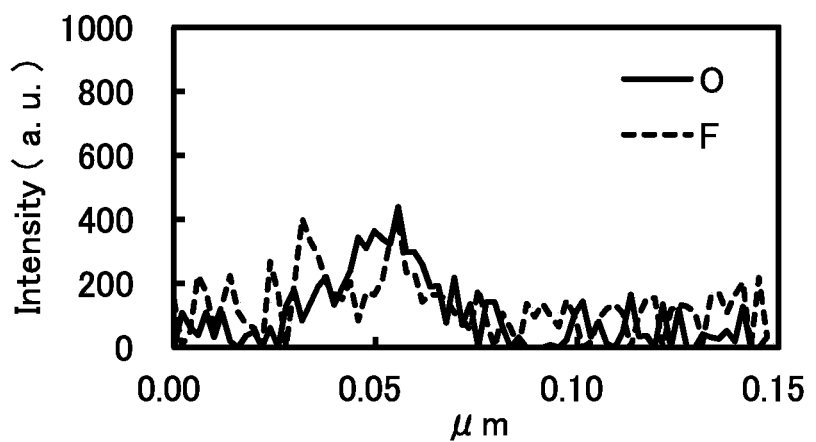
Figure 33A:
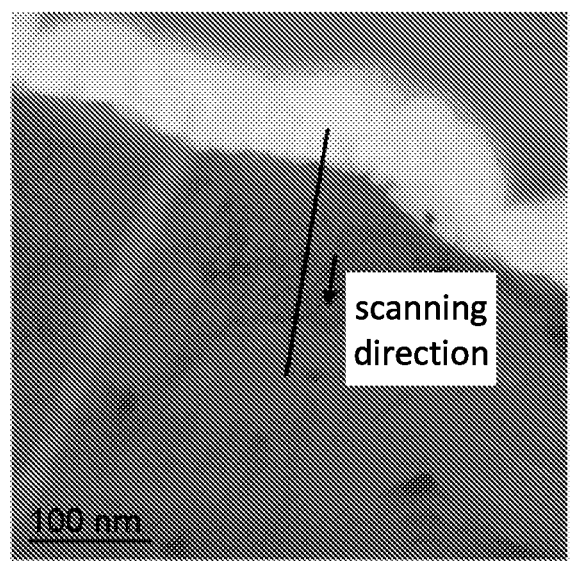
FIGS. 33A to 33C show EELS analysis results of the electrode.
Figure 33B:
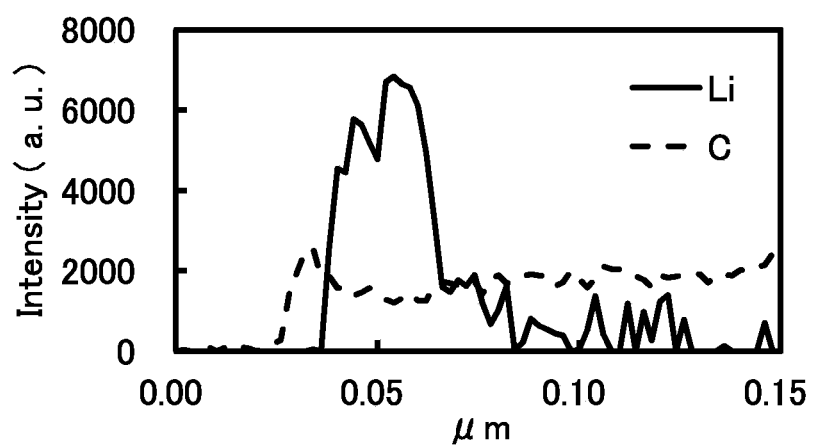
Figure 33C:
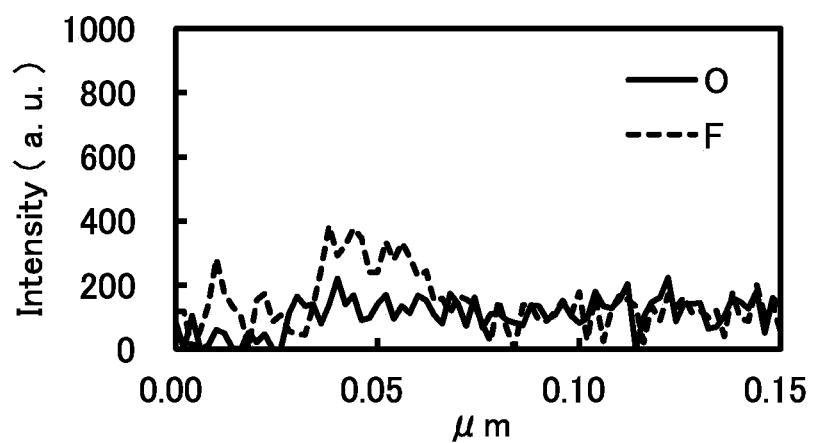

Next, regions whose cross sections were observed with TEM were analyzed by electron energy-loss spectroscopy (EELS). FIGS. 32A to 32C show EELS measurement results of the same portion as that of the observation image shown in FIG. 30C. FIGS. 33A to 33C show EELS measurement results of the same portion as that of the observation image shown in FIG. 31B.

FIG. 32A shows a portion subjected to linear analysis. FIG. 32B shows a linear analysts results of Li and C. FIG. 32C shows a linear analysis result of O and F. The results imply that a film-like region that is in contact with a surface of graphite and includes Li, C, O, and F exists.

FIG. 33A shows a portion subjected to linear analysis. FIG. 33B shows a linear analysis results of Li and C. FIG. 33C shows a linear analysis result of O and F. The results similarly imply that a film-like region that is in contact with a surface of graphite and includes Li, C, O, and F exists. The results also suggest that the concentration of Li is high at a surface of the film. When the distance from the surface of the observed film-like region is r, the average value of the detection intensity in EELS measurement in a region where r is greater than or equal to 0 nm and less than or equal to 30 nm is estimated to be at least three times that in a region where r is greater than or equal to 30 nm and less than or equal to 60 nm, as shown in FIG. 33B.

Example 4

[Low-Temperature Characteristics and Rate Characteristics]

Next, storage batteries were each fabricated using a negative electrode formed under the condition of Electrode A-2-2 described in Example 1 and the positive electrode described in Example 3, and the temperature characteristics and rate characteristics thereof were measured. The storage battery using Positive Electrode A described in Example 3 is referred to as Cell V, and the storage battery using Positive Electrode E including $LiCoO_2$ with an average particle size of 6.8 µm, AB, and PVDF ($LiCoO_2$:AB:PVDF=90.0:3.0:3.0 (wt %)) is referred to as Cell W. Table 6 shows electrolytic solutions, the positive electrode reduction conditions, and the capacity ratios used for Cells V and W. For the conditions of the electrolytic solutions and the reduction conditions, the description in Example 3 can be referred to.

TABLE 6

| | Negative electrode | Positive electrode | Positive electrode reduction | Electrolytic solution | Capacity ratio [%] |
| --- | --- | --- | --- | --- | --- |
| Cell V | Electrode A-2-2 | Positive electrode A | Chemical reduction and thermal reduction | Electrolytic solution A | 54.5 |
| Cell W | Electrode A-2-2 | Positive electrode E | Not performed | Electrolytic solution A | 76.1 |

As both of Cells V and W, thin storage batteries were fabricated using the positive electrode and the negative electrode in each of winch one surface of a current collector is coated with an active material. An aluminum, film covered with a heat sealing resin was used as an exterior body. In each cell, the area of the positive electrode was 20.5 $cm^2$ and the area of the negative electrode was 23.8 $cm^2$. As a separator, 25-µm-thick polypropylene (PP) was used. In Cell V, 10 pairs of positive and negative electrodes, in each of which one surface of the current collector is coated with the active material, were stacked. The positive electrode active material amount and the negative electrode active material amount in Cell V were 11.1 $mg/cm^2$ and 8.2 $mg/cm^2$, respectively. In Cell W, 6 pairs of positive and negative electrodes, in each of which one surface of the current collector is coated with the active material, were stacked. The positive electrode active material amount and the negative electrode active material amount in Cell W were 20.1 $mg/cm^2$ and 9.4 $mg/cm^2$, respectively.

First, aging was performed. Cell V was subjected to aging under the same conditions as those for Cell M in Example 3. Cell W was charged at 0.01 C at 25° C. until power of 10 mAh/g was stored, and then degasification and resealing were performed. Subsequently, the cell was charged at 25° C. The charge was performed by CCCV, specifically, in such a manner that a voltage was applied at a constant current of 0.05 C until the voltage increased and reached 4.1 V and then a constant voltage of 4.1 V was maintained until the current value reached 0.01 C. After that, the cells were stored at 40° C. for 24 hours, discharged at 25° C. until the voltage decreased and reached 2 V, and charged and discharged at 0.2 C twice.

After the aging, the discharge rate characteristics and temperature characteristics woe measured. First, the measurement conditions of the discharge rate characteristics will be described. Charge was performed by CCCV, specifically, in such a manner that a voltage was applied at a constant current of 0.05 C until the voltage increased and reached 4.1 V and then a constant voltage of 4.1 V was maintained until the current value reached 0.01 C. Discharge was performed at 0.2 C, 0.5 C, 1 C, and 2 C. Note that the charge and discharge rates after the aging were calculated based on the discharge capacity at the time of aging.

After the discharge rate characteristics were measured, the temperature characteristics were measured using the same storage batteries. The measurement conditions of the temperature characteristics will be described. Charge was performed at a constant current of 0.2 C at room temperature, and then discharge was performed at a constant current of 0.2 C at 25° C., 0° C., –10° C., and –20° C. The upper charge voltage limit of Cell V was 4 V, and that of Cell W was 4.1 V. The lower charge voltage limit of Cell V was 2 V, and that of Cell W was 2.5 V.

Figure 35A:
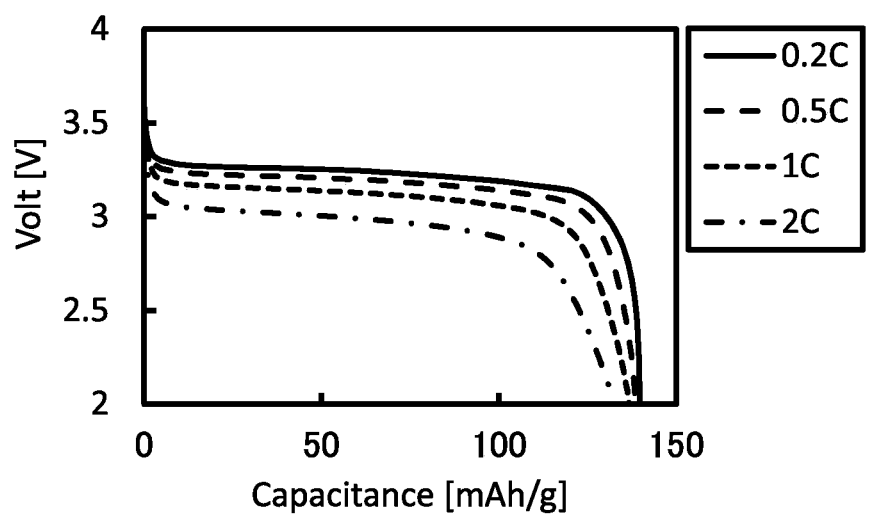
FIGS. 35A and 35B are graphs each showing discharge rate characteristics.
Figure 35B:
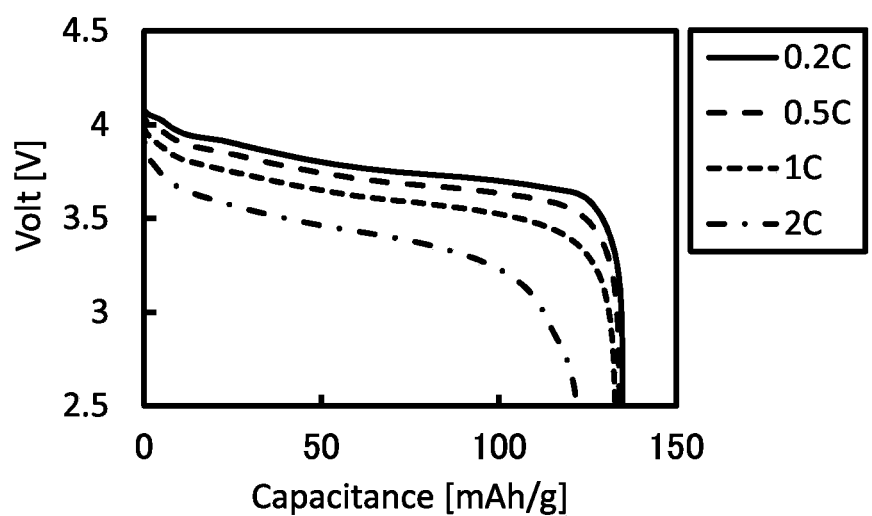
Figure 36A:
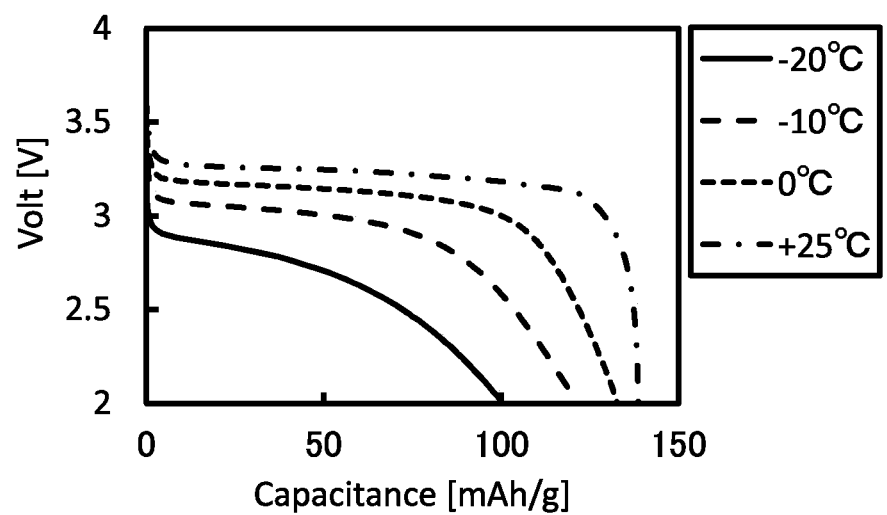
FIGS. 36A and 36B are graphs each showing discharge temperature characteristics.
Figure 36B:
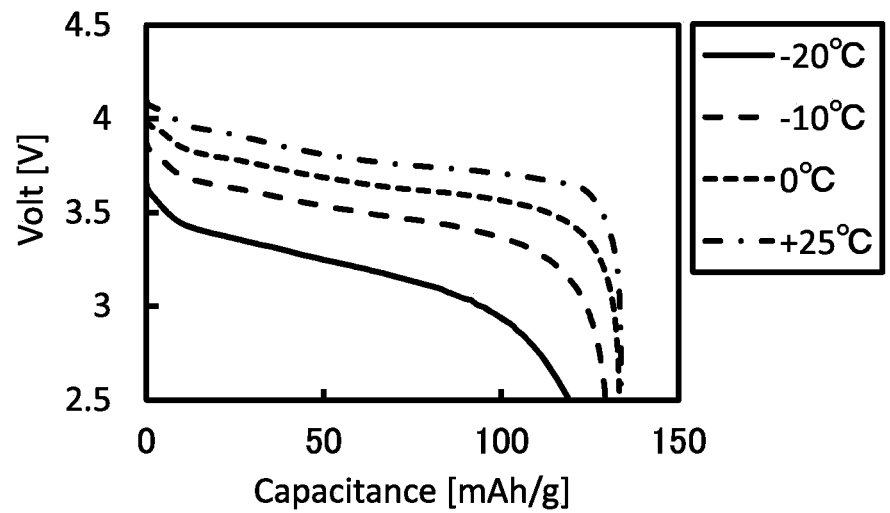

FIGS. 35A and 35B show discharge rate characteristics, and FIGS. 36A and 36B show temperature characteristics. Here, the capacity of each storage battery per unit weight of the positive electrode active material was calculated. FIG. 35A shows the rate characteristics of Cell V, and FIG. 35B shows the rate characteristics of Cell W. FIG. 36A shows the temperature characteristics of Cell V, and FIG. 36B shows the temperature characteristics of Cell W. The use of the electrode formed according to one embodiment of the present invention as the negative electrode led to the favorable rate characteristics and temperature characteristics of the storage batteries.

Example 5

In this example, storage batteries were each fabricated using the electrode of one embodiment of the present invention, and the characteristics thereof were measured.

Cells 1 to 7 in Table 7 were fabricated as the storage batteries. The positive electrode active material amounts, the negative electrode active material amounts, and the capacity ratios R are as shown in Table 7. Here, Cells 1 to 7 are thin storage batteries similar to those in FIG. 2 and FIGS. 3A and 3B in Embodiment 2.

[Fabrication of Negative Electrodes]

First, negative electrodes were fabricated. Graphite A shown in Table 1 was used as each active material. In each electrode, the ratio of graphite:VGCF-H:GMC-Na:SBR was 96:1:1:2 (weight ratio).

TABLE 7

|  | Positive electrode active mateiral amount [mg/cm$^2$] | Negative electrode active mateiral amount [mg/cm$^2$] | R [%] |
| --- | --- | --- | --- |
| Cell 1 | 7.1 | 9.5 | 29 |
| Cell 2 | 7.2 | 9.5 | 30 |
| Cell 3 | 7.2 | 7.0 | 40 |
| Cell 4 | 7.2 | 7.0 | 40 |
| Cell 5 | 9.1 | 7.6 | 47 |
| Cell 6 | 9.1 | 7.6 | 47 |
| Cell 7 | 9.2 | 5.2 | 69 |
| Cell 8 | 9.1 | 5.2 | 69 |

Slurry was formed using water as a solvent.

Mixing was performed with a planetary mixer. A container with a volume of 1.4 L was used for the mixing. First, the active material was weighed and carbon fiber powder and CMC-Na powder were added thereto.

Subsequently, water was added to the mixture and kneading was performed with a mixer for approximately 40 minutes to form paste-like Mixture 2. The amount of water added here was 24 wt % of the total weight of the mixture. Here, kneading means mixing something 80 that it has a high viscosity.

Then, an SBR aqueous dispersion liquid was added to paste-like Mixture 2, pure water was further added, and mixing was performed with a mixer. Water was further added and mixing was performed with the mixer, so that Mixture 3 was obtained.

Subsequently, obtained Mixture 3 was degassed under a reduced pressure. Through the above steps, the slurry was formed.

Subsequently, the slurry was applied to a current collector with the use of a continuous coater. An 18-nm-thick rolled copper foil was used as the current collector. The active material amounts in the active material layers were adjusted to be the values shown in Table 7.

[Fabrication of Positive Electrodes]

Next, positive electrodes were fabricated using LiFePO$_4$ as active materials.

Slurry was formed using NMP as a solvent and carbon-coated LiFePO$_4$ (hereinafter referred to as C/LiFePO$_4$), graphene oxide, and PVDF (C/LiFePO$_4$:graphene oxide:PVDF=94.2:0.8:5.0 (wt %)). The specific surface area of C/LiFePO$_4$ used was approximately 16 m$^2$/g.

The shiny was applied to each current collector with a thickness of 20 μm subjected to undercoating in advance. The active material amounts in the active material layers were adjusted to be the values shown in Table 7. Then, the solvents were volatilized by heat treatment. After that, "chemical reduction and thermal reduction" were performed, so that a positive electrode active material layer was formed over the current collector. The conditions described in Example 3 were used as the conditions for "chemical reduction and thermal reduction".

Then, pressing was performed by a roll press method. Through the above steps, the positive electrodes shown in Table 7 were obtained.

[Fabrication of Storage Batteries]

Next, Cells 1 to 8 shown in Table 7 were fabricated using the negative electrodes and the positive electrodes that were formed. Single-layer thin storage batteries were fabricated. Here, "single-layer" means a pair of positive and negative electrodes facing each other with a separator therebetween.

An aluminum film covered with a heat sealing resin was used as an exterior body. In each cell, the area of a positive electrode was 20.5 cm$^2$ and the area of the negative electrode was 23.8 cm$^2$. As each separator, 25-μm-thick polypropylene (PP) was used. As each electrolytic solution, Electrolytic Solution A described in Example 3 was used.

Then, aging was performed. The conditions for the aging are as follows. Constant current charge was performed at 0.01 C at 25° C. until the voltage increased and reached 3.2 V. Then, part of the exterior body was cut to open each cell, and degasification was performed. After that, resealing was performed. Next, constant current charge was performed at 0.1 C at 25° C. until the voltage increased and reached 4 V. After that, each cell was stored at 40° C. for 24 hours. Subsequently, constant current discharge was performed at 0.1 C at 25° C. until the voltage decreased and reached 2 V. Then, constant current charge and discharge were performed at 25° C. twice. Each constant current charge was performed until the voltage increased and reached 4 V, and each constant current discharge was performed until the voltage decreased and reached 2 V. Here, as to a rate C, 1 C corresponds to a current density per unit weight of the positive electrode active material of 170 mA/g.

[Measurement of Storage Batteries]

Next, the cycle characteristics of the fabricated thin storage batteries were measured. Initial charge and discharge were performed at a constant current of 0.2 C. Then, charge and discharge at a constant current of 0.5 C were repeated for a cycle test. The upper voltage limit and the lower voltage limit were 4.0 V and 2 V, respectively. The measurement temperature was 60° C. Charge and discharge were performed at 0.2 C in the 202th cycle and every 200 cycles after the 202th cycle.

Figure 37A:
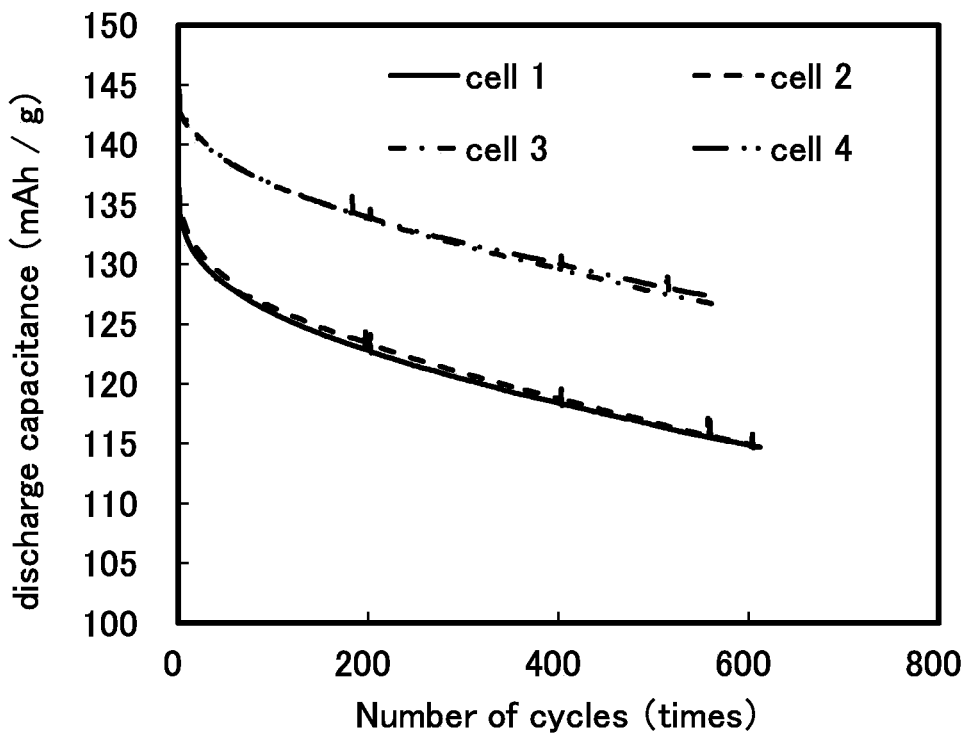
FIGS. 37A and 37B are graphs each showing the relation between charge and discharge cycles and discharge capacity.
Figure 37B:
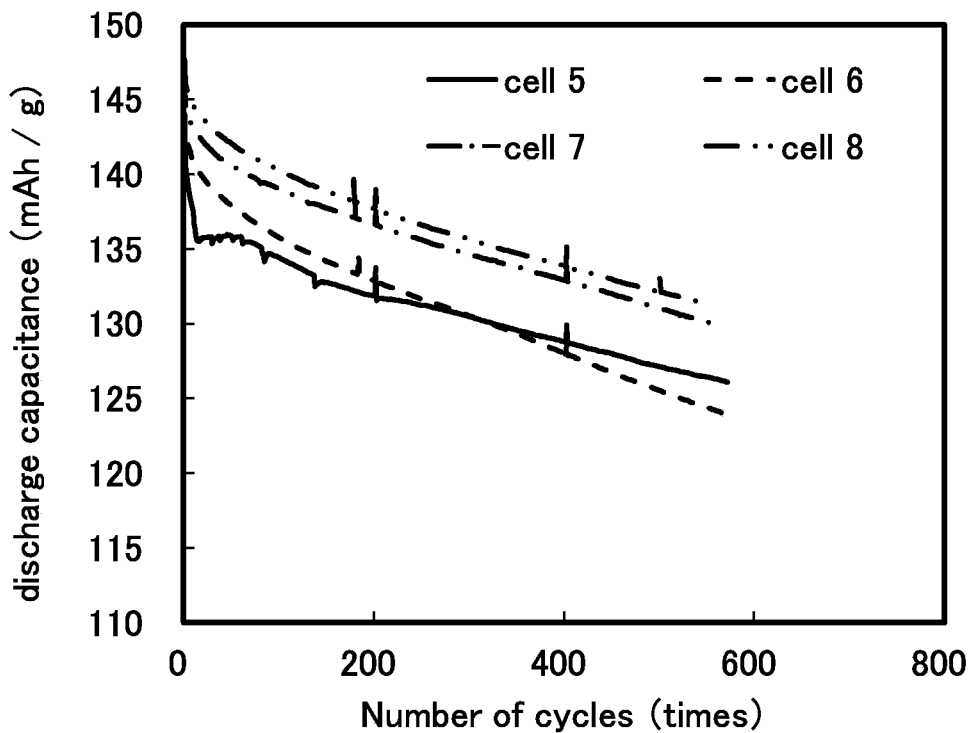

FIG. 37A is a graph where changes in capacity with increasing number of cycles of Cells 1 to 4 are plotted, and FIG. 37B is a graph where changes in capacity with increasing number of cycles of Cells 5 to 8 are plotted. Table 8 shows the discharge capacities in the second cycle, the 50th cycle, the 100th cycle, and the 300th cycle, which are referred to as C[2], C[50], C[100], and C[300], respectively. Table 9 shows the values obtained by dividing each of the discharge capacities in the 50th cycle, the 100th cycle, and the 300th cycle by the discharge capacity in the second cycle (C[50]/C[2], C[100]/C[2], and C[300]/C[2]). Here, the capacity of each storage battery per unit weight of the positive electrode active material was calculated.

TABLE 8

|  | R [%] | C[2]: [mAh/g] | C[50]: [mAh/g] | C[100]: [mAh/g] | C[300]: [mAh/g] |
| --- | --- | --- | --- | --- | --- |
| Cell 1 | 29 | 127 | 121 | 119 | 114 |
| Cell 2 | 30 | 126 | 121 | 119 | 113 |
| Cell 3 | 40 | 135 | 131 | 129 | 124 |
| Cell 4 | 40 | 134 | 131 | 129 | 124 |
| Cell 5 | 47 | 132 | 128 | 127 | 123 |
| Cell 6 | 47 | 134 | 130 | 128 | 123 |
| Cell 7 | 69 | 136 | 132 | 131 | 128 |
| Cell 8 | 69 | 138 | 134 | 132 | 127 |

TABLE 9

|  | R [%] | C[50]/C[2] | C[100]/C[2] | C[300]/C[2] |
| --- | --- | --- | --- | --- |
| Cell 1 | 29 | 0.956 | 0.937 | 0.896 |
| Cell 2 | 30 | 0.956 | 0.938 | 0.897 |
| Cell 3 | 40 | 0.967 | 0.953 | 0.924 |
| Cell 4 | 40 | 0.973 | 0.959 | 0.917 |
| Cell 5 | 47 | 0.966 | 0.956 | 0.916 |
| Cell 6 | 47 | 0.968 | 0.953 | 0.928 |
| Cell 7 | 69 | 0.974 | 0.963 | 0.929 |
| Cell 8 | 69 | 0.973 | 0.960 | 0.933 |

First, the capacity in the second cycle is low in the case where the capacity ratio is low. For example, the capacity of the cells whose capacity ratio is 30% or less (Cells 1 and 2) was lower than or equal to 127 mAh/g. The value C[100]/C[2] is small in the cells whose capacity ratio is small, and is 0.94 or less in the cells whose capacity ratio is 30% or less (Cells 1 and 2).

Figure 38:
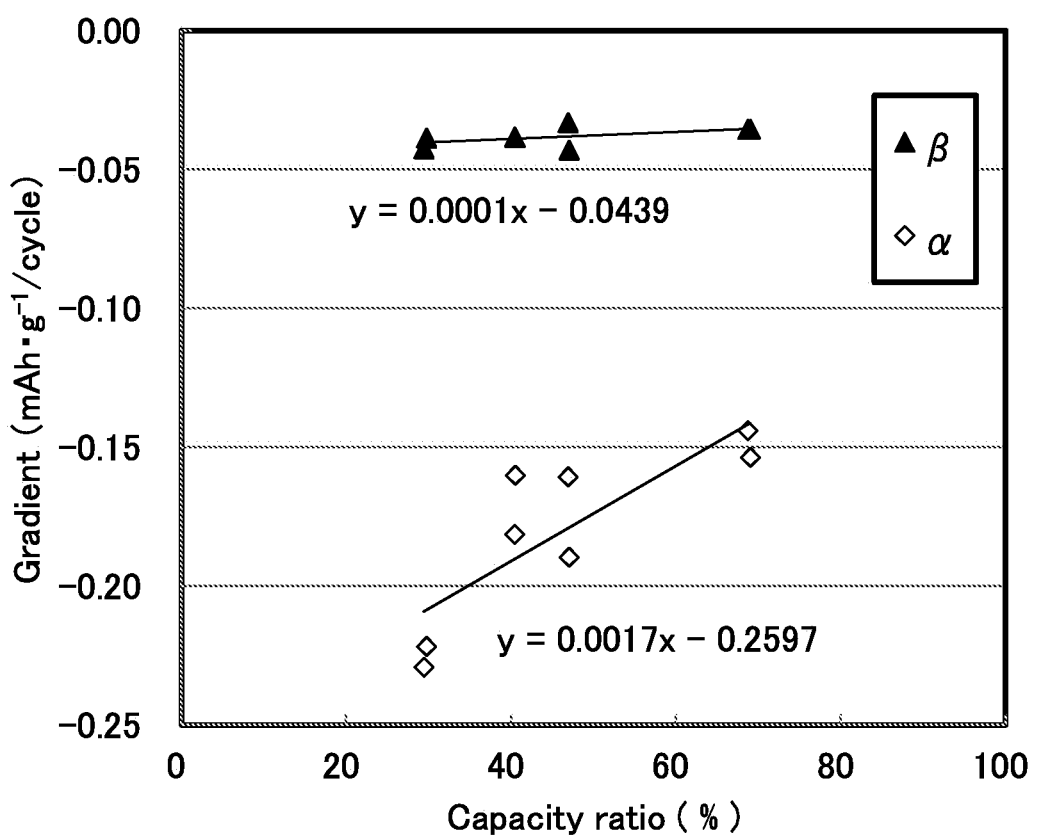
FIG. 38 is a graph showing the relation between capacity ratio and gradient.

FIG. 38 is a graph showing the relation between the gradient of a capacity decrease and the capacity ratio of each cell. Here, a gradient $\alpha$ of a capacity decrease in the 11th to 30th cycles and a gradient $\beta$ of a capacity decrease in the 281th to 300th cycles are used as data. Here, $\alpha$ is expressed by the formula (the capacity in the 30th cycle—the capacity in the 11th cycle)/20, and $\beta$ is expressed by the formula (the capacity in the 300th cycle—the capacity in the 281th cycle)/20. According to the graph, the gradient of a capacity decrease and the capacity ratio strongly correlate to each other in earlier cycles, and become less likely to correlate to each other as the number of cycles increases. This result implies that in earlier cycles, as the capacity ratio is lower (the surface area of the negative electrode active material with respect to the weight of the positive electrode active material is larger), the decomposition amount of the electrolytic solution is larger. The result also suggests that as the number of cycles increases, the cell with a high capacity ratio deteriorates by other factors such as a capacity decrease due to significant expansion and contraction of graphite as well as the decomposition of the electrolytic solution.

Example 6

In this example, a bending test was performed on the thin storage batteries described in Embodiment 2, and the charge and discharge characteristics thereof were measured.

Cells 9 and 10 shown in Table 9 were fabricated. The positive electrode active material amounts, the negative electrode names, the negative electrode active material amounts, and the capacity ratios R are as shown in Table 9. Here, Cells 9 and 10 are thin storage batteries similar to those in FIG. 2 and FIGS. 3A and 3B in Embodiment 2.

TABLE 10

|  | Positive electrode active material amount [mg/cm$^2$] | Negative electrode name | Negative electrode active material amount [mg/cm$^2$] | R [%] |
| --- | --- | --- | --- | --- |
| Cell 9 | 8.1 | Negative electrode 1 | 11.3 | 56 |
| Cell 10 | 7.0 | Negative electrode 2 | 11.0 | 64 |

[Fabrication of Negative Electrodes]

Negative Electrodes 1 and 2 shown in Table 9 were fabricated. Graphite A shown in Table 1 was used for each negative electrode. Slurry for fabricating Negative Electrode 1 was formed using graphite, VGCF-H, CMC-Na, SBR, and water. In Negative Electrode 1, the ratio of graphite:VGCF- H:CMC-Na:SBR was \$16:1:2 (weight ratio). Slurry for fabricating Negative Electrode 2 was formed using graphite, CMC-Na, SBR, and water. In Negative Electrode 2, the ratio of graphite:CMC-Na:SBR was 97:1:2 (weight ratio).

Negative Electrodes 1 and 2 were fabricated using a fabricating method similar to that of the negative electrode described in Example 5.

[Fabrication of Positive Electrodes]

Next, the positive electrodes were fabricated using LiFePO$_4$ as active materials.

Slurry was formed using NMP as a solvent and carbon-coated LiFePO$_4$ (hereinafter referred to as C/LiFePO$_4$), graphene oxide, and PVDF (C/LiFePO$_4$:graphene oxide:PVDF=94.2:0.8:5.0 (wt %)). The specific surface area of C/LiFePO$_4$ used was approximately 27 m$^2$/g.

The formed slurry was applied to each current collector with a thickness of 20 μm subjected to undercoating in advance. The active material amounts in the active material layers were adjusted to be the values shown in Table 7. Then, the solvents were volatilized by heat treatment. After that, "chemical reduction and thermal reduction" were performed, so that a positive electrode active material layer was formed over the current collector. The conditions described in Example 3 were used as the conditions for "chemical reduction and thermal reduction".

Then, pressing was performed by a roll press method. Through the above steps, the positive electrodes shown in Table 9 were obtained.

[Fabrication of Storage Batteries]

Next, Cells 1 to 8 shown in Table 7 were fabricated as layered thin storage batteries using the negative electrodes and the positive electrodes that were formed. Here, 10 pairs of positive and negative electrodes are provided. Each pair of electrodes face each other. The positive electrodes and the negative electrodes are alternately stacked and separated by a separator.

An aluminum film covered with a heat sealing resin was used as an exterior body. In each cell, the area of a positive electrode was 20.5 cm$^2$ and the area of the negative electrode was 23.8 cm$^2$. As each separator, 25-μm-thick polypropylene (PP) was used. As each electrolytic solution, Electrolytic Solution A described in Example 3 was used.

Next, aging was performed. Then, the cells were charged at 0.01 C at 25° C. until the voltage increased and reached 3.2 V, and then degasification and resealing were performed. The cells were further charged at 0.1 C until the voltage increased and reached 4 V. After that, the cells were stored at 40° C. for 24 hours. Subsequently, the cells were discharged at 0.2 C at 25° C. until the voltage decreased and reached 2 V. Then, charge and discharge were performed at 0.2 C twice.

[Measurement of Storage Batteries]

Figure 39:
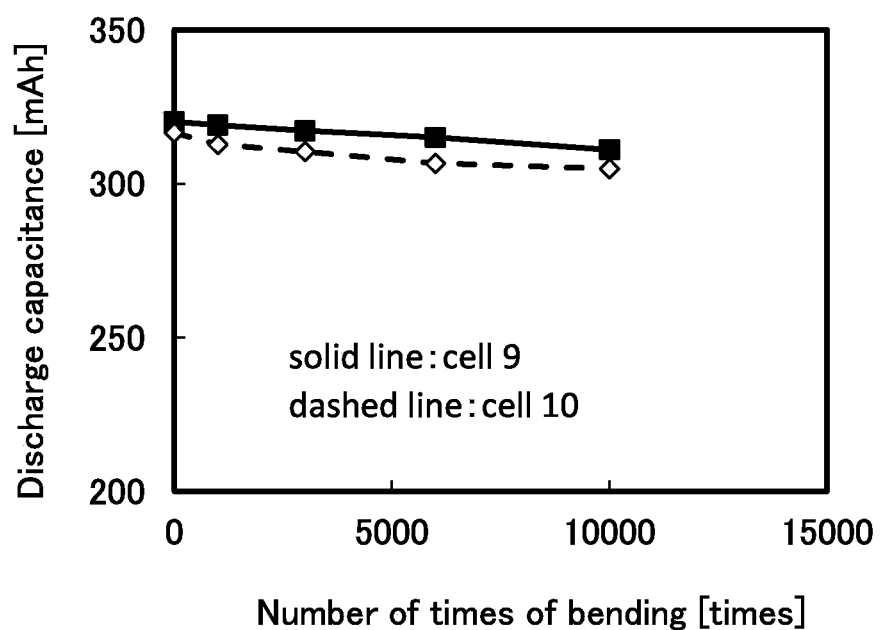
FIG. 39 is a graph showing the relation between discharge capacity and the number of times of bending of each power storage device.

Next, a bending test was performed on each of the fabricated storage batteries. Charge and discharge were performed before the bending test, after 1000 times of bending, after 3000 times of bending, after 6000 times of bending, and after 10000 times of bending. FIG. 39 shows obtained discharge capacity. The horizontal axis in FIG. 39 represents the number of times of bending.

Figure 40:
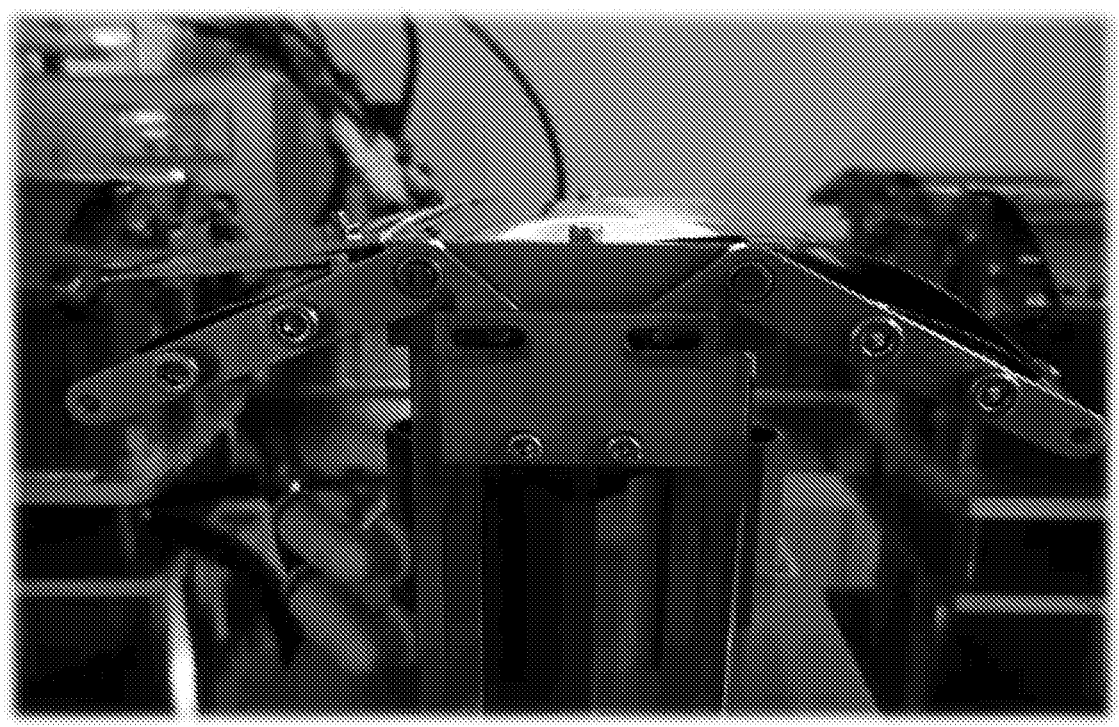
FIG. 40 is a photograph of a bend tester.

The bending test was performed using a bend tester. FIG. 40 is a photograph showing the appearance of the bend tester. The tester includes a cylindrical supporting body with a radius of curvature of 40 mm extending in the depth direction under a center portion where the storage battery is placed. The tester also includes arms extending in the right and left directions. End portions of the arms were mechanically connected to holding plates. By moving the end portions of the arms up or down, the holding plates can be bent along the supporting body. The bending test of the storage battery was performed with the storage battery sandwiched between the two holding plates. Thus, moving the end portions of the arms up or down allows the storage battery to be bent along the cylindrical supporting body. Specifically, lowering the end portions of the arms permits the storage battery to be bent with a radius of curvature of 40 mm. Since the storage battery is bent while being sandwiched between the two holding plates, unnecessary force except bending force can be prevented from being applied to the storage battery. Furthermore, bending force can be uniformly applied to the whole storage battery.

The bending test was performed in the range of radius of curvature from 40 mm to 150 mm at intervals of 10 seconds. The charge and discharge characteristics were measured at 25° C. after the storage battery was dismounted from the tester. The charge and discharge were performed at 0.2 C under the conditions that the upper voltage limit was 4.0 V and the lower voltage limit was 2 V. The measurement temperature was 25° C. Note that discharge capacity (mAh/g) is a value per unit weight of the positive electrode active material. Here, as to the rate C, 1 C corresponds to a current density per unit weight of the positive electrode active material of 170 mA/g.

FIG. 39 shows that the capacity of Cell 9 before the bending test (referred to as initial capacity) and the capacity thereof after 10000 times of bending were 320 mAh and 311 mAh (97% of the initial capacity), respectively. In addition, the initial capacity of Cell 10 and the capacity thereof after 10000 times of bending were 317 mAh and 305 mAh (96% of the initial capacity), respectively. A capacity decrease due to 10000 times of bending was small in each cell. Thus, storage batteries that can be repeatedly bent were able to be fabricated using the negative electrodes of one embodiment of the present invention. The fabricated storage batteries were found to have favorable battery characteristics even after repeated bending.

This application is based on Japanese Patent Application serial no. 2014-010689 filed with the Japan Patent Office on Jan. 23, 2014, the entire contents of which are hereby incorporated by reference.

What is claimed is:

1. A power storage device comprising:
   a positive electrode;
   a negative electrode comprising:
      a negative active material comprising an active material particle;
      a carbon fiber;
      a first film covering the active material particle, the first film comprising a first binder and a second binder; and
      a second film covering the active material particle and the first film, the second film comprising Li, F, O and C; and
   an electrolyte,
   wherein a first portion of the second film is in contact with the first film,
   wherein a second portion of the second film is in contact with the active material particle,
   wherein a surface of the carbon fiber is covered with the first binder and the second binder, and
   wherein the power storage device is capable of being repeatedly bent.

2. The power storage device according to claim 1, wherein the second binder comprises a styrene monomer unit.

3. The power storage device according to claim 1, wherein the second binder comprises a butadiene monomer unit.

4. The power storage device according to claim 1, wherein a material of the active material particle is graphite.

5. The power storage device according to claim 1, wherein the first film comprises a region with a thickness of 2 nm or more and 20 nm or less.

6. The power storage device according to claim 1, wherein the first binder is a cellulose derivative.

7. A power storage device comprising:
- a positive electrode;
- a negative electrode comprising:
  - a negative active material comprising an active material particle;
  - a carbon fiber;
  - a first film covering the active material particle, the first film comprising a first binder and a second binder; and
  - a second film covering the active material particle and the first film, the second film comprising Li, F, O and C; and
- an electrolyte,
wherein a first portion of the second film is in contact with the first film,
wherein a second portion of the second film is in contact with the active material particle,
wherein a surface of the carbon fiber is covered with the first binder and the second binder,
wherein the first binder is a water-soluble polymer,
wherein a thickness of the first portion of the second film is thinner than a thickness of the second portion of the second film, and
wherein the power storage device is capable of being repeatedly bent.

8. The power storage device according to claim 7, wherein the second binder comprises a stylene monomer unit.

9. The power storage device according to claim 7, wherein the second binder comprises a butadiene monomer unit.

10. The power storage device according to claim 7, wherein a material of the active material particle is graphite.

11. The power storage device according to claim 7, wherein the first film comprises a region with a thickness of 2 nm or more and 20 nm or less.

12. The power storage device according to claim 7, wherein the first binder is a cellulose derivative.

* * * * *